(12) United States Patent  
Mashiko et al.

(10) Patent No.: US 6,454,622 B2
(45) Date of Patent: Sep. 24, 2002

(54) EXHAUST SYSTEM FOR 4-CYCLE ENGINE OF SMALL WATERCRAFT

(75) Inventors: Tetsuya Mashiko; Masaki Takegami, both of Shizuoka (JP)

(73) Assignee: Sanshin Kogyo Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/765,052

(22) Filed: Jan. 17, 2001

(30) Foreign Application Priority Data

Jan. 17, 2000 (JP) ........................... 2000-007571
Jul. 6, 2000 (JP) ........................... 2000-204839

(51) Int. Cl.⁷ .......................................... B63H 21/38
(52) U.S. Cl. ................... 440/89; 60/312; 60/313; 60/320; 60/321; 60/323
(58) Field of Search ............... 440/89; 60/272, 60/312, 313, 320, 321, 323

(56) References Cited

U.S. PATENT DOCUMENTS

| | | | | |
|---|---|---|---|---|
| 3,470,690 A | * | 10/1969 | Thompson | 60/303 |
| 4,373,331 A | * | 2/1983 | Santiago et al. | 60/282 |
| 4,731,995 A | * | 3/1988 | McFarland, Jr. | 123/184.31 |
| 4,800,720 A | * | 1/1989 | Okada | 181/240 |
| 4,951,465 A | | 8/1990 | Torigai | |
| 5,846,102 A | * | 12/1998 | Nitta et al. | 123/196 AB |
| 5,910,095 A | * | 6/1999 | Strasser et al. | 264/86 |
| 6,055,970 A | | 5/2000 | Takahashi | |
| 6,113,446 A | | 9/2000 | Mineo | |
| 6,132,268 A | * | 10/2000 | Uchino et al. | 440/111 |
| 6,213,827 B1 | | 4/2001 | Hattori et al. | |
| 6,253,696 B1 | * | 7/2001 | Mashiko | 114/55.5 |

FOREIGN PATENT DOCUMENTS

| | | |
|---|---|---|
| JP | 2517868 | 9/1996 |
| JP | 10-246123 | 9/1998 |

OTHER PUBLICATIONS

US 6,273,014, 08/2001, Suzuki (withdrawn)*
U.S. patent application Ser. No. 09/497,569, entitled Lubrication System for Small Watercraft filed Feb. 3, 2000.
U.S. patent application Ser. No. 09/764,949, entitled Indction System for 4 Cycle Engine of Small Watercraft filed Jan. 17, 2001.
Polaris Sales Inc., 1999 Parts Manual, Pro 785 Model #B994978 in 14 Pages.
Polaris Sales Inc., 2000 Parts Manual, Pro 785, Model #W004978D, Int'l Pro 785, Model #W0049781 in 14 Pages.
English translation of Japanese Patent Laying–open No. 10–246123 disclosed on Sep. 14, 1998, 13 pages.

* cited by examiner

Primary Examiner—Sherman Basinger
(74) Attorney, Agent, or Firm—Knobbe, Martens, Olson & Bear, LLP

(57) ABSTRACT

An internal combustion engine, which can be disposed in a water vehicle, includes an exhaust system having features improving the performance, ease of manufacturing, and/or the water preclusive effects thereof. The exhaust system can include an exhaust manifold defining a plurality of exhaust runners and being made from at least two parts. The exhaust system can also include a plurality of individual exhaust passages extending from exhaust ports of the engine to a forward end of the engine. The exhaust system can also include an exhaust passage which extends from the exhaust ports to varying elevations relative to the exhaust ports, as well as other features.

55 Claims, 35 Drawing Sheets

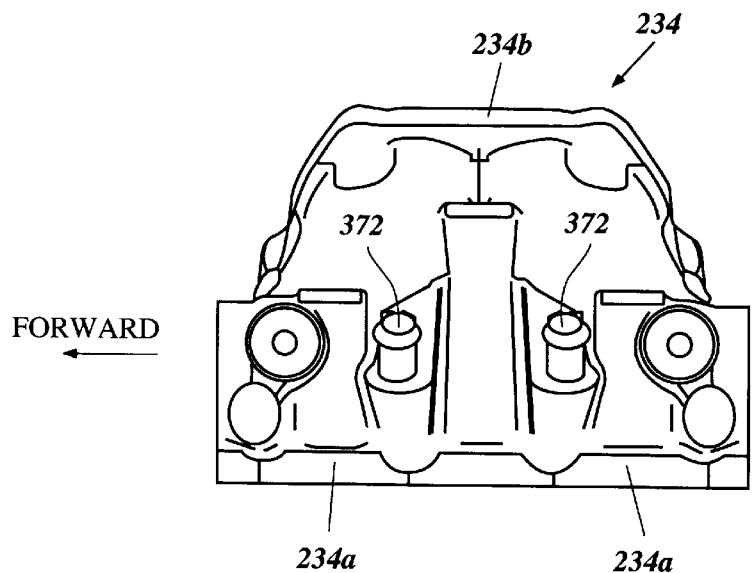
Figure 24
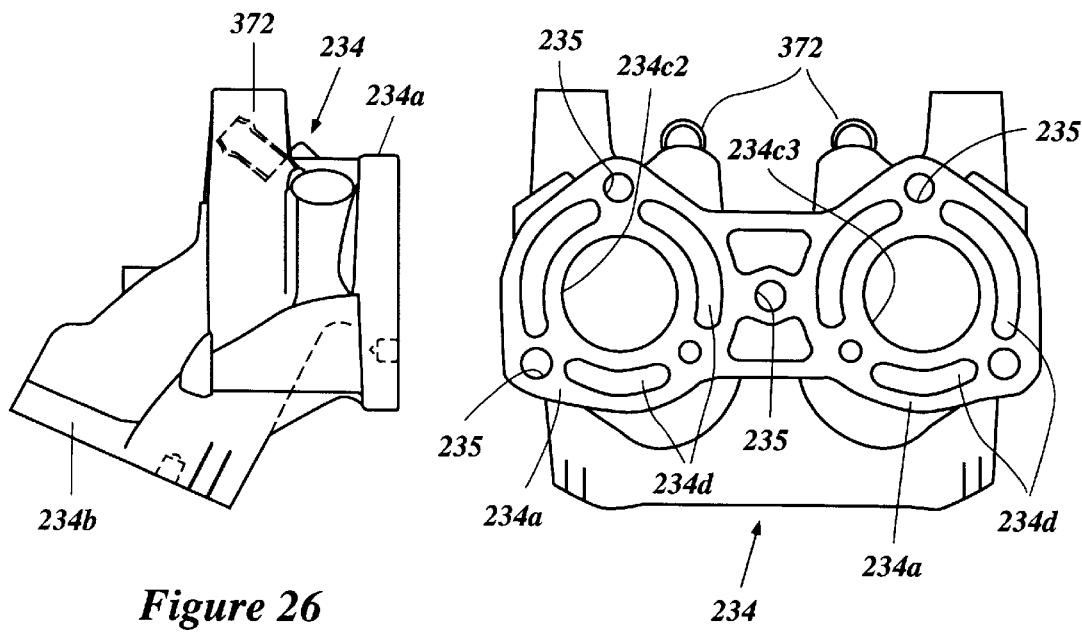
Figure 26
Figure 25

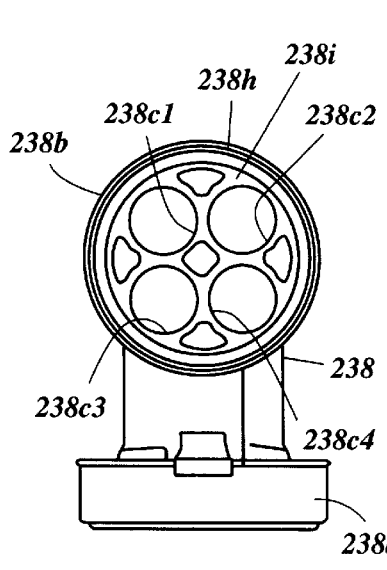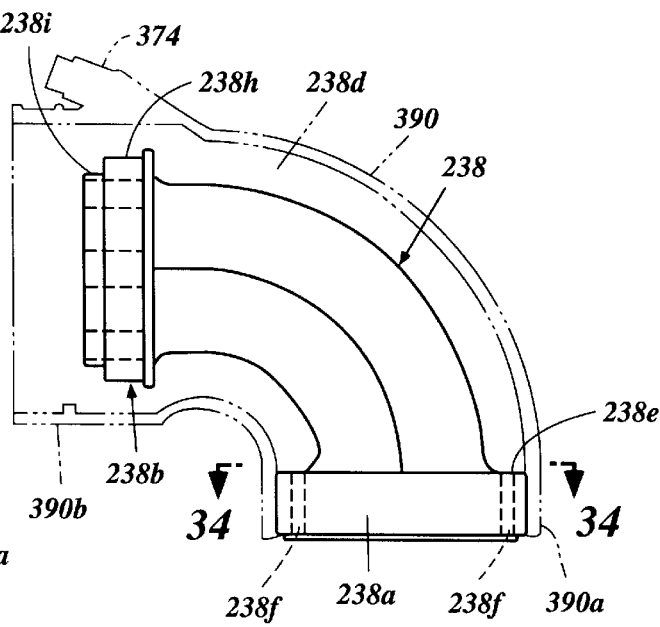
Figure 31
Figure 32
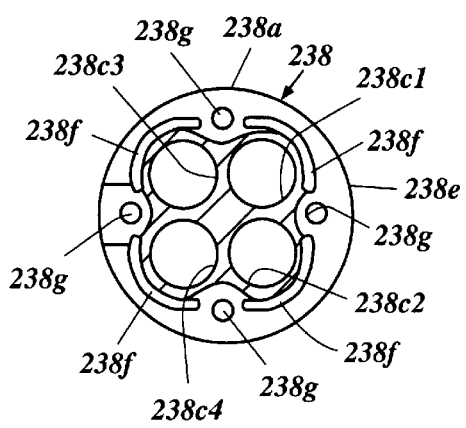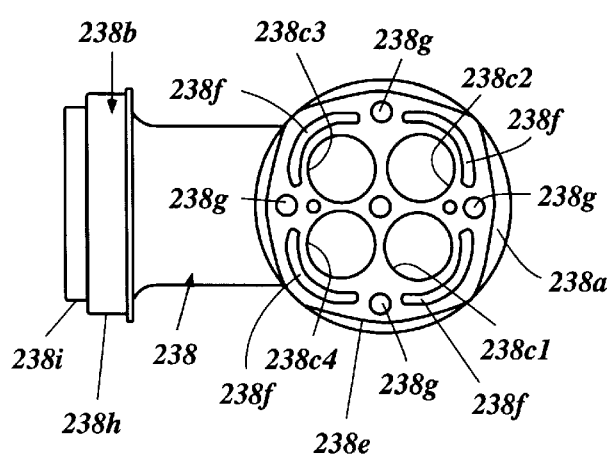
Figure 33
Figure 34

EXHAUST SYSTEM FOR 4-CYCLE ENGINE OF SMALL WATERCRAFT

PRIORITY INFORMATION

This invention is based on and claims priority to Japanese Patent Applications No. 2000-007571, filed Jan. 17, 2000, No. 2000-192251, filed Jun. 27, 2000 and No. 2000-204839, filed Jul. 6, 2000, the entire contents of which are hereby expressly incorporated by reference.

BACKGROUND OF THE INVENTION

1. Field of the Invention

This invention relates to an engine for a watercraft, and particularly to an improved exhaust system of an engine for a watercraft.

2. Description of Related Art

Personal watercraft have become very popular in recent years. This type of watercraft is quite sporting in nature and carries a rider and possibly one, two or three passengers. A relatively small hull of the personal watercraft commonly defines a riders' area above an engine compartment. An internal combustion engine frequently powers a jet propulsion unit which propels the watercraft. The engine lies within the engine compartment in front of a tunnel formed on the underside of the watercraft hull. The jet propulsion unit is located within the tunnel and is driven by a drive shaft. The drive shaft usually extends between the engine and the jet propulsion device, through a wall of the hull tunnel.

The rider's area usually includes an elongated seat that extends along a longitudinal center line of the watercraft. The seat has a bench-like shape that the rider and passengers can straddle. Foot wells extend along side the seat. The rider and passengers straddle the seat in a tandem fashion with the rider and passengers' legs positioned on the side of the seat and their feet placed within the foot areas.

Generally, the width of the seat not only provides an ample surface upon which the rider and passengers sit, but also provides space in which to locate an upper portion of the engine, including the engine's exhaust and induction systems. U.S. Pat. No. 5,536,189 illustrates an exemplary engine arrangement beneath the seat with the overall width of the seat generally matching the overall width of the engine. The cylinder head, cylinder block, exhaust manifold, exhaust expansion chamber, carburetors, and air intake are all located between the side walls of the seat and beneath the upper cushion of the seat.

While the position of the rider—with his or her feet positioned wide apart and his or her legs straddling the seat—provides good stability, this stance reduces the ability of the rider to absorb with his or her legs impact forces as the watercraft bounds over wakes. In addition, some smaller riders with less height find it uncomfortable to sit in a position with their feet widely spaced apart when straddling the seat.

Additionally, two-cycle engines commonly power personal watercraft, as these engines have the advantage of being fairly powerful and relatively light and compact. One particular disadvantage of a two-cycle engine though, is emissions content. Two-cycle engines exhaust large quantities of carbon monoxide and various hydrocarbons. However, when steps are taken to reduce the emissions content of a two-cycle engine, other generally undesirable consequences result, such as an increase in the weight of the engine, cost of manufacture, and reduction of its power output.

Thus, four-cycle engines have now been proposed as the power plant for personal watercraft. These engines have the advantage of less hydrocarbon emissions than a two-cycle engine while maintaining a relatively high power output. It is therefore desirable to provide a small watercraft with a four-cycle engine in order to reduce exhaust emissions without significantly impacting the power output of the engine that powers the watercraft, or excessively increasing a width of the engine compartment.

SUMMARY OF THE INVENTION

According to one aspect of the present invention, an exhaust manifold for an internal combustion engine includes a first exhaust runner assembly having at least two exhaust runners. Each exhaust runner includes an inlet end configured to engage a corresponding exhaust port defined on one side of the engine. The exhaust manifold also includes a second exhaust runner assembly having an inlet end configured to engage at least one exhaust port defined on the side of the engine.

By constructing the exhaust manifold with two exhaust runner assemblies, the manufacture of the exhaust manifold is made easier. In the design and manufacture of exhaust manifold, a difficultly arises in shaping the exhaust runners so as to have approximately the same length. For example, known exhaust manifolds include a plurality of exhaust runners having inlet ends connected to a plurality of exhaust ports arranged in a substantially linear fashion. However, the outlet ends of the exhaust runners merge to define a single outlet passage of the exhaust manifold. Thus, the exhaust runners desirably are shaped differently from each other so as to have approximately the same length.

An exhaust manifold having exhaust runners with varying shapes is difficult to manufacture. In particular, some exhaust manifolds are monolithically cast from metal to improve a heat-resistant characteristic. Thus, an exhaust manifold having more than two exhaust runners with varying shapes is particularly difficult to manufacture. Further, where the exhaust manifold is water-cooled, the varying shapes of the exhaust runners provides an additional difficulty in manufacturing a cooling jacket disposed thermal communication with the exhaust manifold. For example, due to the high heat environment of the exhaust manifold, an outer wall of such a cooling jacket is also made from a cast metal, monolithically formed with the exhaust manifold.

Thus, by constructing the exhaust manifold, in accordance with the present aspect of the invention, with first and second exhaust runner assemblies, the exhaust runners and any associated cooling jackets can be manufactured more easily.

According to yet another aspect of the present invention, a water vehicle includes an internal combustion engine having an engine body and a plurality of exhaust ports defined along a first side of the engine body. The water vehicle also includes an exhaust system having a plurality of individual exhaust passages extending from the exhaust ports, respectively. The individual exhaust passages terminate in the vicinity of a forward end of the engine.

As noted above, known exhaust manifolds typically include a plurality of exhaust runners having inlet ends attached to a corresponding number of exhaust ports defined in a substantially linear fashion on one side of an engine body. The outlet ends of the exhaust runners merge to define a single outlet passage of the exhaust manifold. In order to provide each of the exhaust runners with approximately the same length, the exhaust runners are shaped differently from one another. For example, an exhaust runner communicating with an exhaust port disposed adjacent a longitudinal end of the engine body can be shaped substantially linearly. An exhaust runner communicating with an exhaust port disposed near the middle of the engine body may be curved such that the overall length of the exhaust runners is approximately equal. However, some applications for internal combustion engines cannot provide large amounts of free space adjacent the desired position of the engine body.

For example, in the art of personal watercraft, the rider's seat is typically positioned directly above the engine compartment, with the rider straddling the engine compartment during operation. While the position of the rider—with his or her feet positioned wide apart and his or her legs straddling the sea —provides good stability, this stance reduces the ability of the rider to absorb with his or her legs impact forces as the watercraft bounds over wakes. In addition, some smaller riders with less height find it uncomfortable to sit in a position with their feet widely spaced apart when straddling the seat. Thus, the overall width available for the engine in such a watercraft is limited.

By providing the exhaust system of the water vehicle with a plurality of individual exhaust passages that terminate in the vicinity of a forward end of the engine, the variations in the shapes and accounts of the individual exhaust passages can be more easily accommodated. Thus, the upstream portion of the exhaust system connected to the exhaust ports, usually referred to as the exhaust manifold, can be made smaller.

According to yet another aspect of the present invention, an exhaust system for an internal combustion includes an exhaust conduit extending from the exhaust ports to an exhaust discharge for discharging exhaust gases to the atmosphere. The exhaust conduit also includes a first exhaust passage extending through a high point defining a highest elevation in the first exhaust passage. The first exhaust passage is defined by a plurality of individual exhaust passages having inlet ends configured to engage a plurality of exhaust ports defined on a first side of an engine body. The individual exhaust passages extend to the high point.

According to a further aspect of the present invention, an exhaust system for an internal combustion engine includes a first exhaust passage extending from exhaust ports of the engine and through a first elevation and a second elevation. The first elevation is lower than the exhaust ports, and the second elevation is at least as high as the exhaust ports. By configuring the exhaust passage to extend from exhaust ports of an internal combustion engine and through such a first and second elevation, the exhaust passage aids in preventing water from traveling upstream through the exhaust system to the exhaust ports.

According to another aspect of the present invention, an exhaust system for an internal combustion engine of a watercraft includes an exhaust manifold communicating with the at least one exhaust port of the engine. An exhaust conduit extends from the exhaust manifold to a first elevation defining a high point in the exhaust conduit when the watercraft is inverted. The exhaust conduit also extends to a second elevation defining a high point in the exhaust conduit when the watercraft is upright. By configuring the exhaust conduit to extend through such a first and second elevation, the exhaust system aids in preventing water from traveling upstream through the exhaust system when the watercraft is upright and inverted.

According to yet a further aspect of the present intention, an exhaust system for an internal combustion engine includes an exhaust passage having a plurality of individual exhaust gas conduits communicating with a plurality of exhaust ports of the engine. The individual exhaust gas conduits are connected to each other and include first and second ends. The exhaust system also includes a flexible cooling jacket member having first and second ends and defining a cooling jacket around an exterior of the individual exhaust gas conduits. The first end of the cooling jacket member is connected to the first end of the individual exhaust gas conduits. The second end of the cooling jacket member is not directly connected to the second end of the individual exhaust gas conduits.

By providing a flexible cooling jacket member to the exhaust system, wherein one end of the flexible cooling jacket member is connected to a portion of the exhaust system and the second end is not directly connected, assembly of the exhaust system is made easier. For example, when a technician is connecting another portion of the exhaust system to the individual exhaust gas conduits as well as the cooling jacket member, these components are aligned before fasteners can be secured. Thus, by leaving one end of the flexible cooling jacket member free from the individual gas conduits, alignment of this portion of the exhaust system with another portion is made easier.

According to another aspect of the present invention, an exhaust system for an internal combustion engine includes at least first and second exhaust passages communicating with first and second exhaust ports defined on an engine body of the engine. The first and second exhaust passages include first and second lengths, respectively. The first and second exhaust passages also have first and second diameters, respectively. The first length is greater than the second length, and the first diameter is greater than the second diameter.

According to yet another aspect of the present invention, an exhaust system for an internal combustion engine includes at least first and second exhaust passages communicating with first and second exhaust ports defined on the engine body of the engine. The first and second exhaust passages include first and second links, respectively. A first restriction is disposed at an outlet end of the first exhaust passage, and the first length is greater than the second length.

According to a further aspect of the present invention, an exhaust system for internal combustion engine includes at least first and second exhaust passages having outlet ends. The first and second exhaust passages also include inlet ends communicating with first and second exhaust ports defined by engine body of the engine Each of the first and second exhaust passages include a balance passage aperture defined between the inlet and outlet ends thereof. The exhaust system also includes a cooling jacket in thermal communication with at least the first and second exhaust passages. A balance passage connects the balance passage apertures of the each of the first and second exhaust passages. At least a portion of the cooling jacket being upstream of the balance passage.

Further aspects, features and advantages of this invention will become apparent from the detailed description of the preferred embodiments which follow.

BRIEF DESCRIPTION OF THE DRAWINGS

These and other features, aspects and advantages of the present invention will now be described with reference to the drawings of preferred embodiments which are intended to illustrate and not to limit the invention. The drawings comprise 47 figures.

FIG. 24 is a top plan view of a second exhaust manifold of the engine.

FIG. 25 is a side view of the second manifold viewed from the engine body.

FIG. 26 is a rear view of the second manifold.

FIG. 31 is a side view of a second unitary exhaust conduit viewed from an exhaust pipe. A tubular rubber member is removed.

FIG. 32 is a schematic top plan view of the second conduit. The rubber member is shown in phantom.

FIG. 33 is a front view of the second conduit. The rubber member is removed.

FIG. 34 is a cross-sectional view of the second conduit taken along the line 34—34 of FIG. 32.

DETAILED DESCRIPTION OF THE PREFERRED EMBODIMENT OF THE INVENTION

With reference to FIGS. 1 to 18, an overall configuration of a personal watercraft 30 will be described.

The watercraft 30 employs an internal combustion engine 32 configured in accordance with a preferred embodiment of the present invention. The described engine configuration has particular utility with the personal watercraft, and thus, is described in the context of the personal watercraft. The engine configuration, however, can be applied to other types of watercrafts as well, such as, for example, small jet boats.

Figure 3:
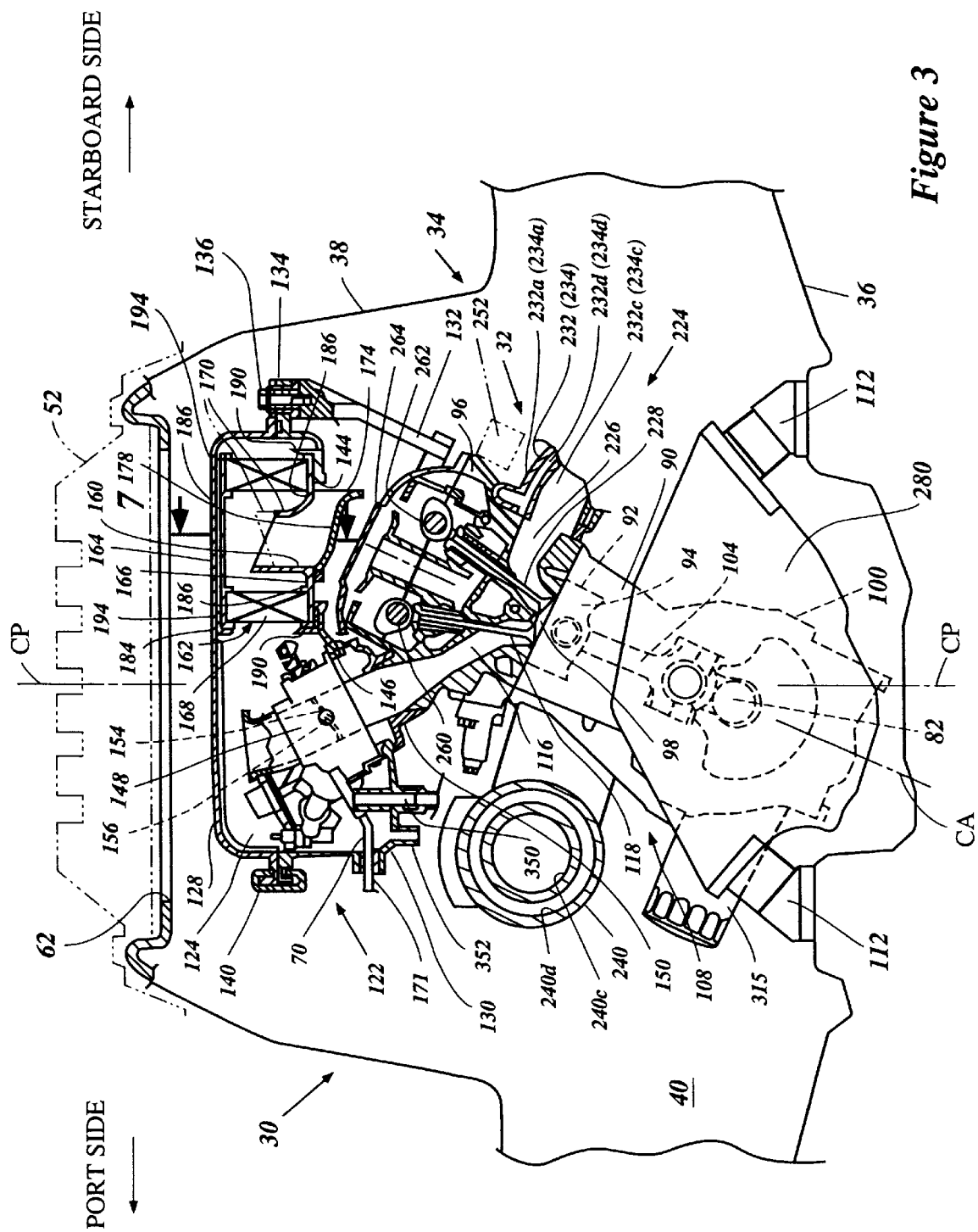
FIG. 3 is a schematic, cross-sectional rear view of the watercraft and the engine. A profile of a hull of the watercraft is shown schematically. The engine and an opening of an engine compartment of the hull are illustrated partially in section.

The personal watercraft 30 includes a hull 34 formed with a lower hull section 36 and an upper hull section or deck 38. Both the hull sections 36, 38 are made of, for example, a molded fiberglass reinforced resin or a sheet molding compound. The lower hull section 36 and the upper hull section 38 are coupled together to define an internal cavity 40 (FIG. 3). A gunnel 42 defines an intersection of both the hull sections 36, 38.

Figure 1:
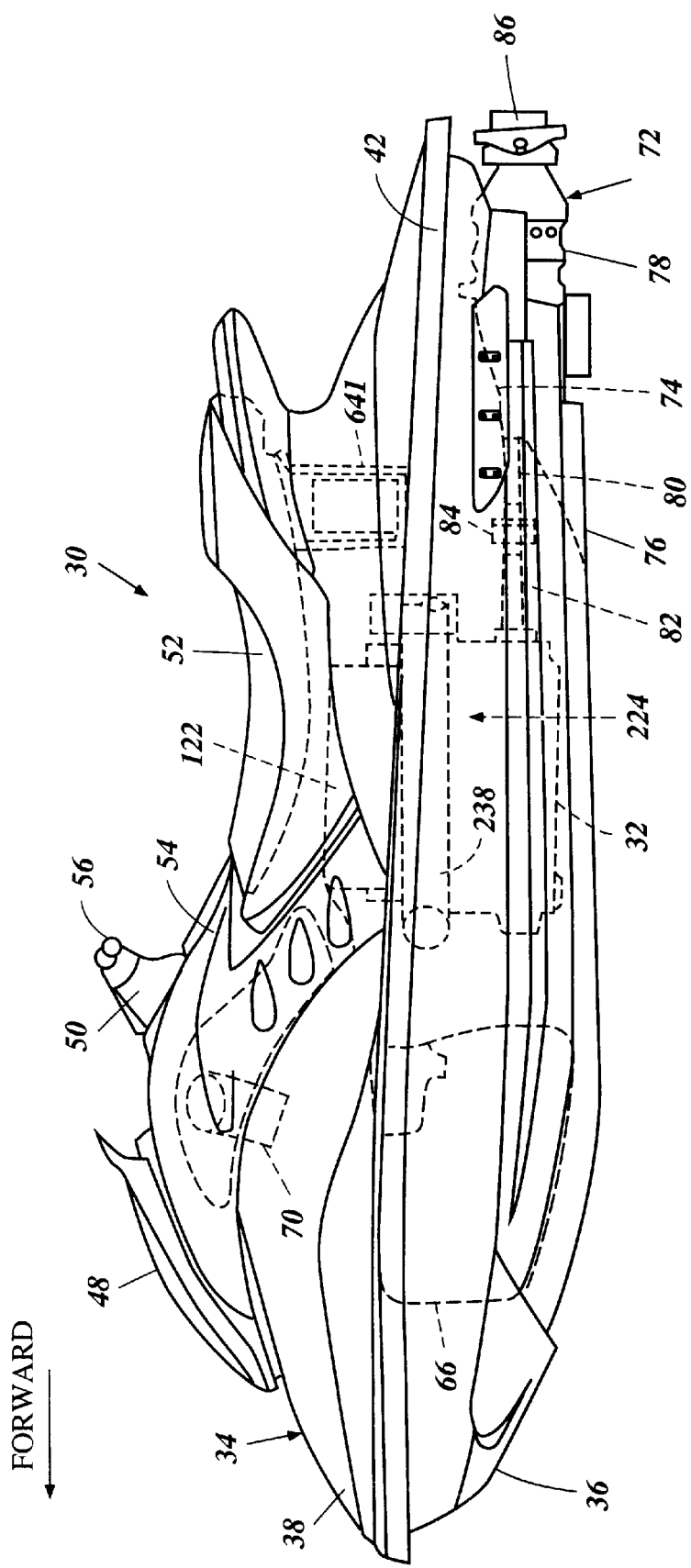
FIG. 1 is a side elevational view of a personal watercraft of the type powered by an engine configured in accordance with a preferred embodiment of the present invention. Several of the internal components of the watercraft (e.g., the engine) are illustrated in phantom.
Figure 2:
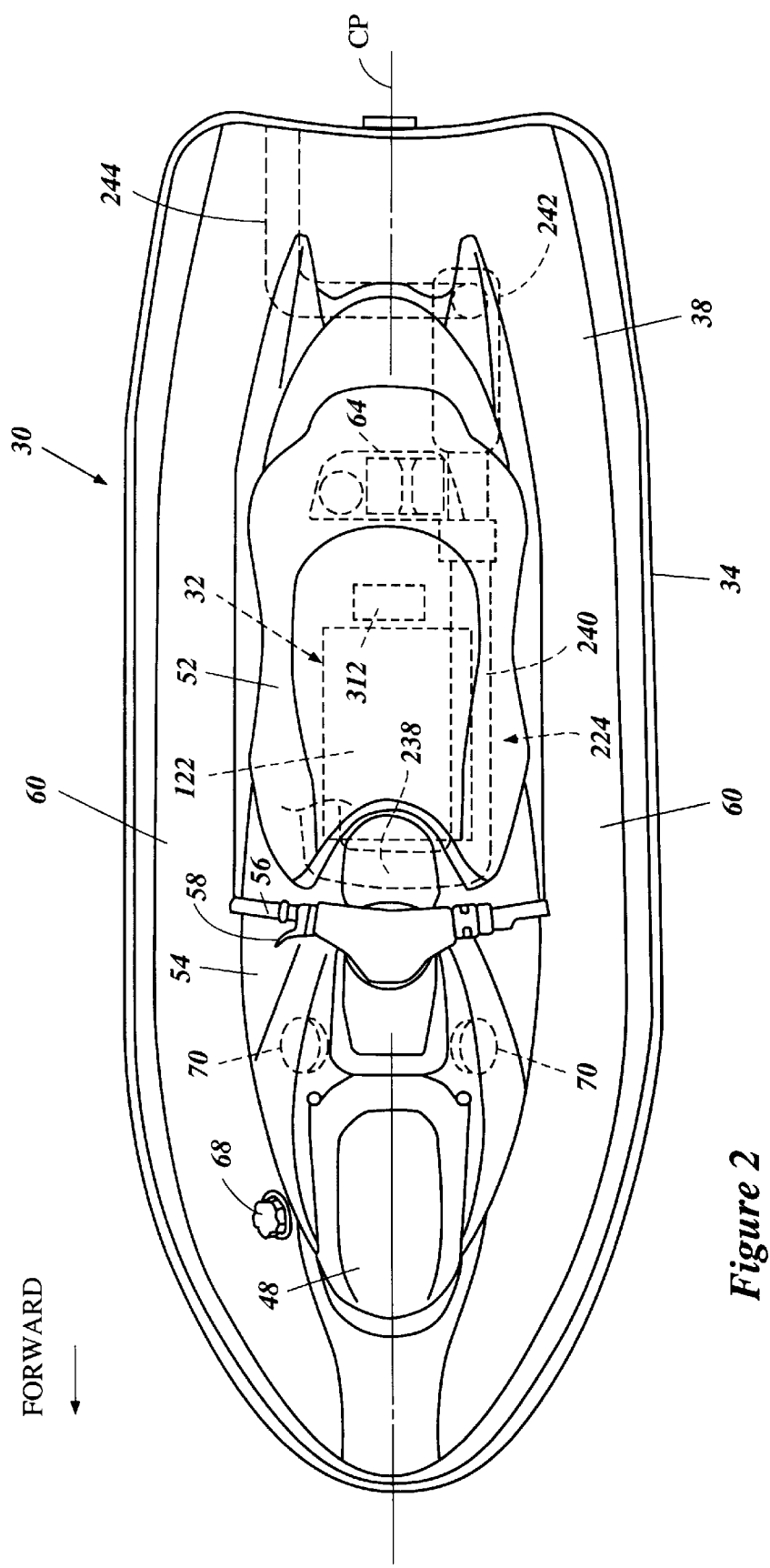
FIG. 2 is a top plan view of the watercraft.

With reference to FIGS. 2 and 3, the hull 34 defines a center plane CP that extends generally vertically from bow to stem. Along the center plane CP, the upper hull section 34 includes a hatch cover 48, a control mast 50 and a seat 52 arranged from fore to aft.

In the illustrated embodiment, a bow portion 54 of the upper hull section 38 slopes upwardly and an opening is provided through which the rider can access the internal cavity 40. The bow portion 54 preferably is provided with a pair of cover member pieces which are apart from one another along the center plane CP. The hatch cover 48 is detachably affixed (e.g., hinged) to the bow portion 54 so as to cover the opening.

The control mast 50 extends upwardly to support a handle bar 56. The handle bar 56 is provided primarily for controlling the directions in which the water jet propels the watercraft 30. Grips are formed at both ends of the bar 56 SO that the rider can hold them for that purpose. The handle bar 56 also carries other control units such as, for example, a throttle lever 58 that is used for control of running conditions of the engine 32.

The seat 52 extends along the center plane CP to the rear of the bow portion 54. The seat 52 also generally defines a rider's area. The seat 52 has a saddle shape and hence a rider can sit on the seat 52 in a straddle-type fashion. Foot areas 60 are defined on both sides of the seat 52 and at the top surface of the upper hull section 38. The foot areas 60 are formed generally flat. A cushion supported by the upper hull section 38, at least in principal part, forms the seat 52. The seat 52 is detachably attached to the upper hull section 38. An access opening 62 is defined under the seat 52 through which the rider can also access the internal cavity 40. That is, the seat 52 usually closes the access opening 62. In the illustrated embodiment, the upper hull section 38 also defines a storage box 64 under the seat 52.

A fuel tank 66 is disposed placed in the cavity 40 under the bow portion 54 of the upper hull section 38. The fuel tank 66 is coupled with a fuel inlet port positioned at a top surface of the upper hull section 38 through a duct. A closure cap 68 closes the fuel inlet port. The opening disposed under the hatch cover 48 is available for accessing the fuel tank 66.

The engine 32 is disposed in an engine compartment defined in the cavity 40. The engine compartment preferably is located under the seat 52, but other locations are also possible (e.g., beneath the control mast or in the bow). The rider thus can access the engine 32 in the illustrated embodiment through the access opening 62 by detaching the seat 52.

A pair of air ducts or ventilation ducts 70 are provided on both sides of the bow portion 54 so that the ambient air can enter the internal cavity 40 therethrough. Except for the air ducts 70, the engine compartment is substantially sealed so as to protect the engine 32 and other components from water.

A jet pump unit 72 propels the watercraft 30. The jet pump unit 72 includes a tunnel 74 formed on the underside of the lower hull section 36 which is isolated from the engine compartment by a bulkhead. The tunnel 74 has a downward facing inlet port 76 opening toward the body of water. A jet pump housing 78 is disposed within a portion of the tunnel 74 and communicates with the inlet port 76. An impeller is supported within the housing 78.

An impeller shaft 80 extends forwardly from the impeller and is coupled with a crankshaft 82 of the engine 32 by a coupling member 84. The crankshaft 82 of the engine 32 thus drives the impeller shaft 80. The rear end of the housing 78 defines a discharge nozzle and a steering nozzle 86 is affixed to the discharge nozzle for pivotal movement about a steering axis extending generally vertically. The steering nozzle 86 is connected to the handle bar 56 by a cable so that the rider can pivot the nozzle 86.

As the engine 32 drives the impeller shaft 80 and hence rotates the impeller, water is drawn from the surrounding body of water through the inlet port 76. The pressure generated in the housing 78 by the impeller produces a jet of water that is discharged through the steering nozzle 86. This water jet propels the watercraft 30. The rider can move the steering nozzle 86 with the handle bar 56 when he or she desires to turn the watercraft 30 in either direction.

Figure 14:
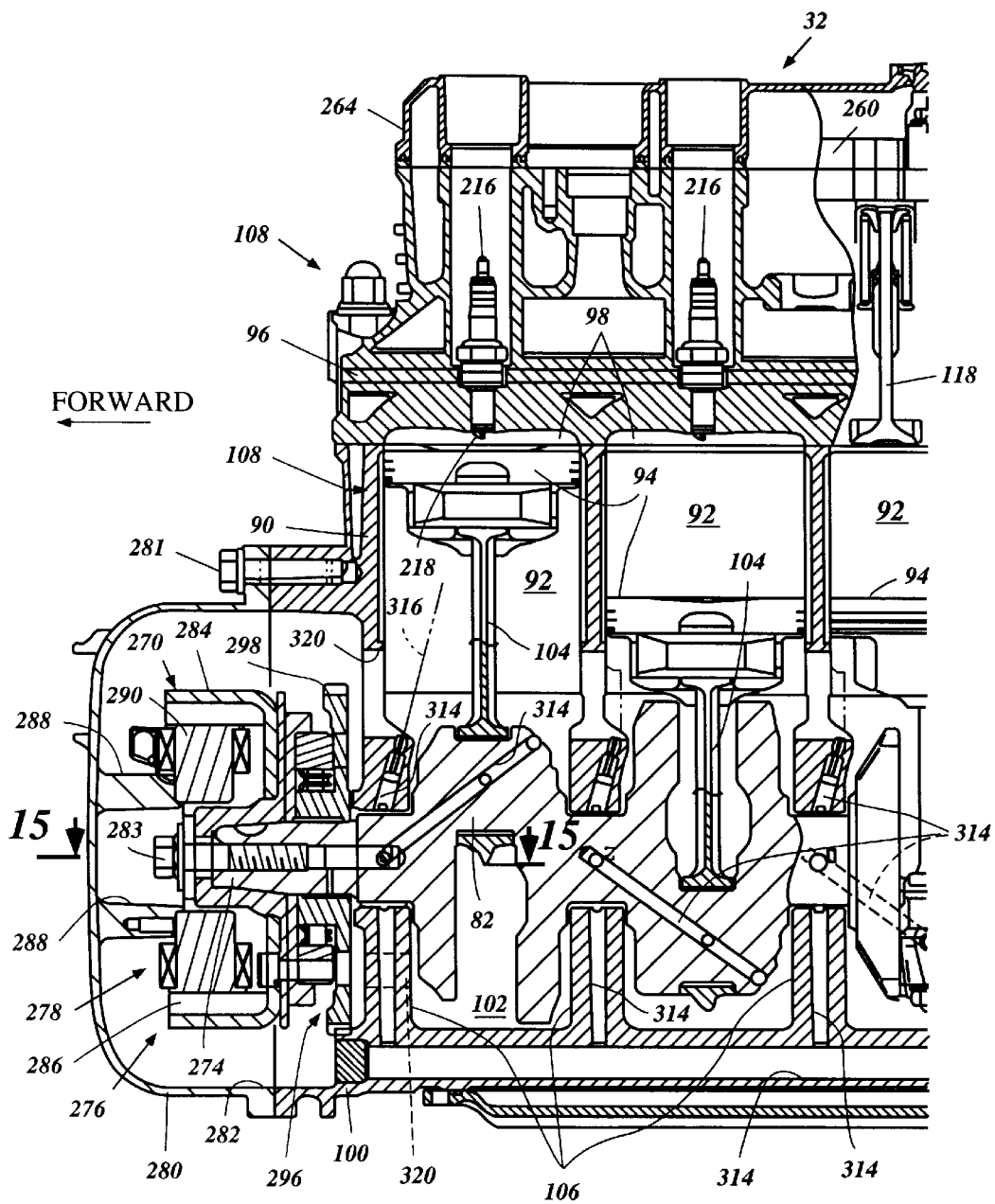
FIG. 14 is a cross-sectional view of the engine showing a front portion thereof.

The engine 32 operates on a four-stroke cycle combustion principle. With reference to FIGS. 3 and 14, the engine 32 includes a cylinder block 90. The cylinder block 90 defines four cylinder bores 92 spaced from each other from fore to aft along the center plane CP. The engine 32 thus is an L4 (in-line four cylinder) type. The illustrated engine, however, merely exemplifies one type of engine on which various aspects and features of the present invention can be used. Engines having other number of cylinders, having other cylinder arrangements, other cylinder orientations (e.g., upright cylinder banks, V-type, and W-type) and operating on other combustion principles (e.g., crankcase compression two-stroke, diesel, and rotary) are all practicable.

Each cylinder bore 92 has a center axis CA that is slanted or inclined at an angle from the center plane CP so that the engine 32 can be shorter in height. All the center axes CA in the illustrated embodiment are inclined at the same angle. Pistons 94 reciprocate within the cylinder bores 92. A cylinder head member 96 is affixed to the upper end of the cylinder block 90 to close respective upper ends of the cylinder bores and defines combustion chambers 98 with cylinder bores and the pistons 94.

A crankcase member 100 is affixed to the lower end of the cylinder block 90 to close the respective lower ends of the cylinder bores 92 and to define a crankcase chamber 102 (FIG. 14). The crankshaft 82 is rotatably connected to the pistons 94 through connecting rods 104 and is journaled by several bearings 106 (FIG. 14) formed on the crankcase member 100. That is, the connecting rods 104 are rotatably coupled with the pistons 94 and with the crankshaft 82.

The cylinder block 90, the cylinder head member 96 and the crankcase member 100 together define an engine body 108. The engine body 108 preferably is made of an aluminum based alloy. In the illustrated embodiment, the engine body 108 is oriented in the engine compartment so as to position the crankshaft 82 generally parallel to the central plane CP and to extend generally in the longitudinal direction. Other orientations of the engine body, of course, are also possible (e.g., with a transverse or vertical oriented crankshaft).

Engine mounts 112 extend from both sides of the engine body 108. The engine mounts 112 preferably include resilient portions made of, for example, a rubber material. The engine 32 preferably is mounted on the lower hull section 36, specifically, a hull liner, by the engine mounts 112 so that vibration of the engine 32 is inhibited from conducting to the hull section 36.

The engine 32 preferably includes an air induction system to introduce air to the combustion chambers 98. In the illustrated embodiment, the air induction system includes four air intake ports 116 defined in the cylinder head member 96. The intake ports 116 communicate with the associated combustion chambers 98. Intake valves 118 are provided to selectively connect and disconnect the intake ports 116 with the combustion chambers 98. That is, the intake valves 118 selectively open and close the intake ports 116.

The air induction system also includes an air intake box 122 or a "plenum chamber" for smoothing intake air and acting as an intake silencer. The intake box 122 in the illustrated embodiment is generally configured as a rectangular and defines a plenum chamber 124. Other shapes of the intake box of course are possible, but it is desired to make the plenum chamber as large as possible within the space provided in the engine compartment. In the illustrated embodiment, a space is defined between the top of the engine 32 and the bottom of the seat 52 due to the inclined orientation of the engine 32. The rectangular shape of at least a principal portion of the intake box 122 conforms to this space.

Figure 7:
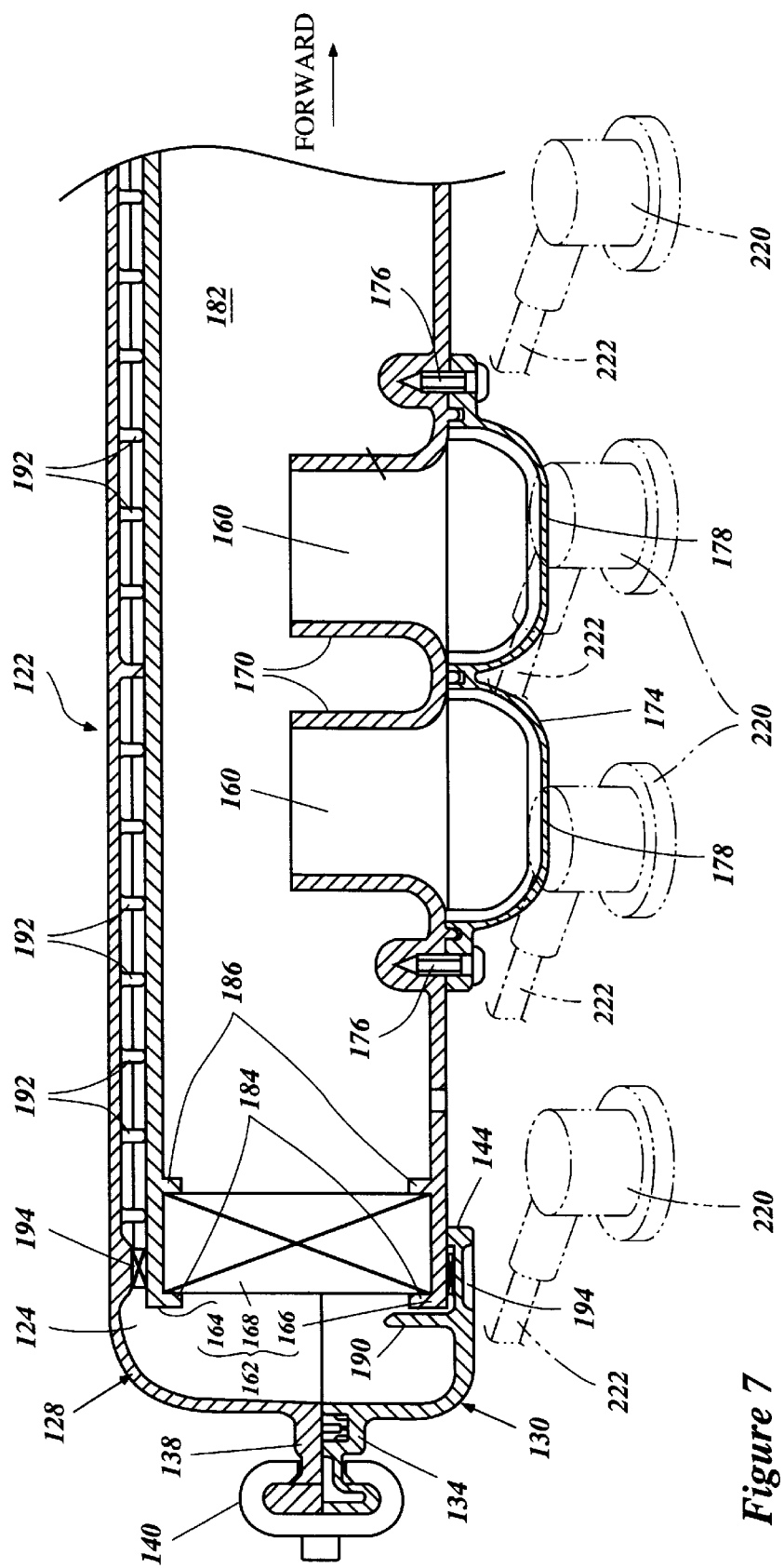
FIG. 7 is an enlarged cross-sectional view of an air intake box taken along the line 7—7 of FIG. 3.

With reference to FIGS. 3 and 7, the intake box 122 comprises an upper chamber member 128 and a lower chamber member 130. The upper and lower chamber members 128, 130 preferably are made of plastic or synthetic resin, although they can be made of metal or other material. While the illustrated embodiment involves the intake box 122 being formed by upper and lower chamber members, the chamber member can be formed by a different number of members and/or can have a different assembly orientation (e.g., side-by-side).

With reference to FIG. 3, the lower chamber member 130 preferably is coupled with the engine body 108. In the illustrated embodiment, while several stays 132 extend upwardly from the engine body 108, a flange portion 134 of the lower chamber member 130 extends generally horizontally. Several fastening members, for example, bolts 136, rigidly affix the flange portion 134 to respective top surfaces of the stays 132. The upper chamber member 128 has a flange portion 138 (FIG. 7) that abuts on the flange portion 134 of the lower member 130. Several coupling or fastening members 140, which are generally configured as a shape of the letter "C" in section, preferably put both the flange portions 134, 138 therebetween so as to couple the upper chamber member 128 with the lower chamber member 130. The intake box 122 thus is laid in a space defined between the engine body 108 and the seat 52, i.e., the rider's area of the hull 34, so that the plenum chamber 124 defines a relatively large volume therein.

Figure 8:
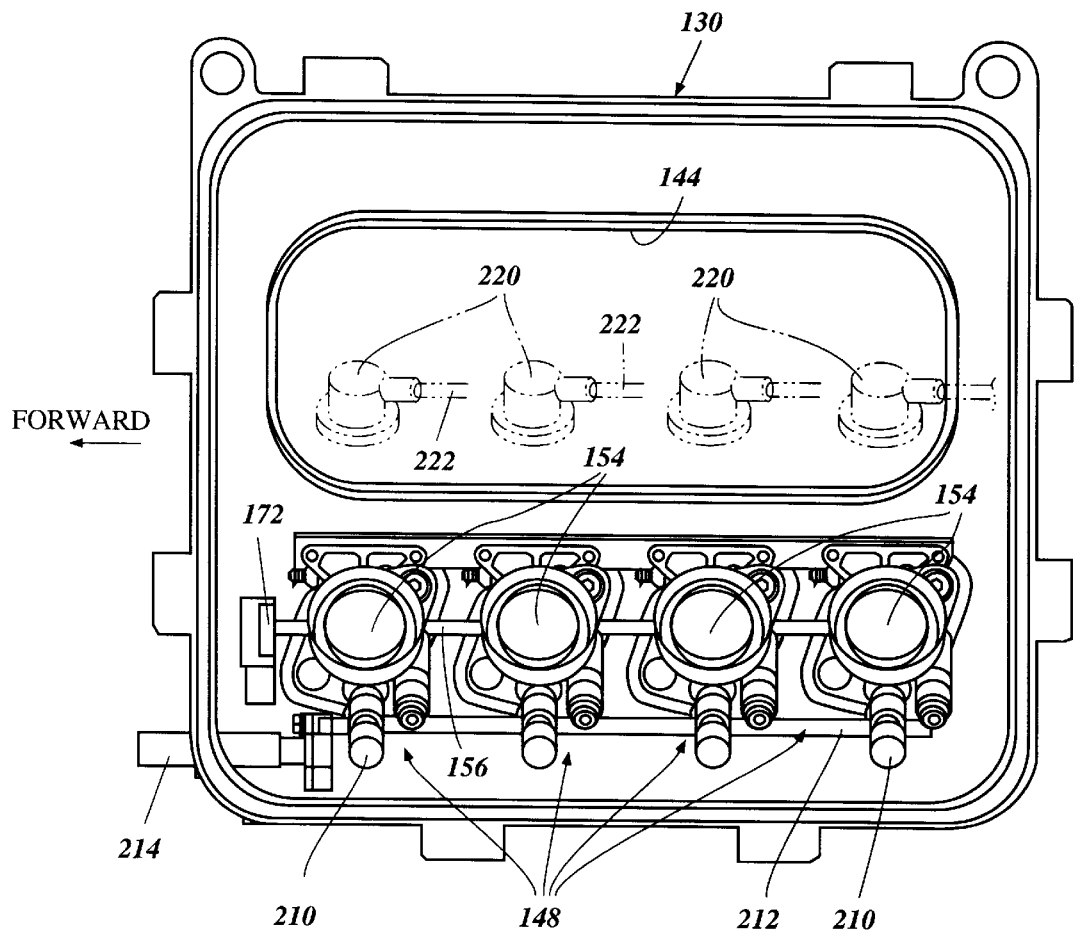
FIG. 8 is a top plan view of the intake box. An upper chamber member is detached in this figure.
Figure 12:
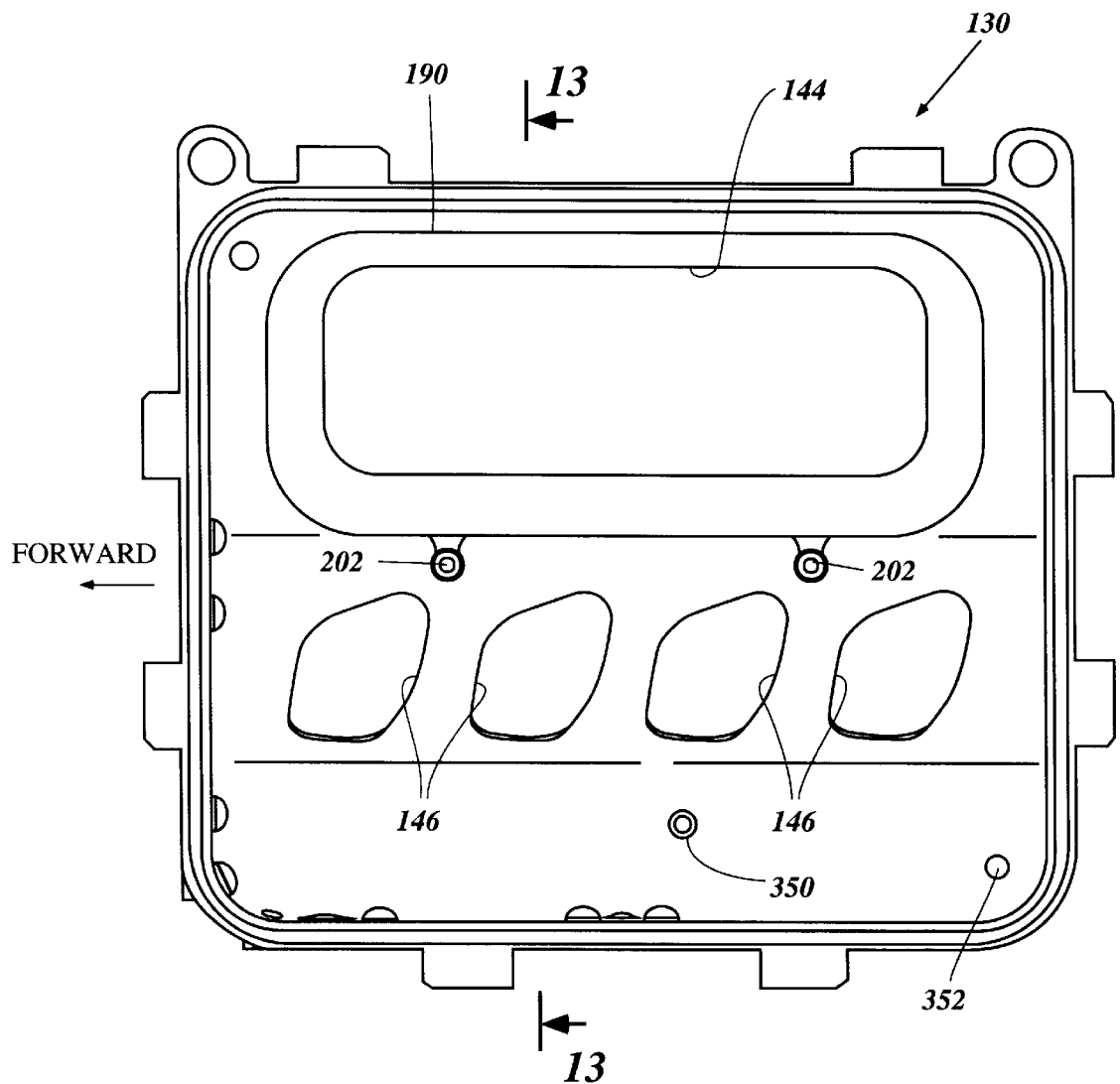
FIG. 12 is top plan view of the lower chamber member.

With reference to FIGS. 3, 7, 8, 12 and 13 and particularly in FIG. 12, the lower chamber member 130 defines an inlet opening 144 and four outlet apertures 146. With reference to FIGS. 3 and 8, four throttle bodies 148 extend through the apertures 146 and preferably are fixed to the lower chamber member 130. Respective bottom ends of the throttle bodies 148 are coupled with the associated intake ports 116. Preferably, as illustrated in FIG. 3, the position at which the apertures 146 are sealed to the throttle bodies 148 are spaced from the outlet of "bottom" ends of the throttle bodies 148. Thus, the lower member 130 is spaced from the engine 32, thereby attenuating transfer of heat from the engine body 108 into intake box 122.

With reference to FIG. 3, the throttle bodies 148 slant toward the port side oppositely the center axis CA of the engine body 108. A rubber boot 150 extends between the lower chamber member 130 and the cylinder head member 96 so as to generally surround a portion of the throttle bodies 148 which extend out of the plenum chamber 124. Respective top ends of the throttle bodies 148, in turn, open upwardly within the plenum chamber 124. Air in the plenum chamber 124 thus is drawn to the combustion chambers 98 through the throttle bodies 148 and the intake ports 116 when negative pressure is generated in the combustion chambers 98. The negative pressure is generated when the pistons 94 move toward the bottom dead center from the top dead center.

As illustrated in FIG. 8, each throttle body 148 includes a throttle valve 154. A throttle valve shaft 156 journaled for pivotal movement, links the entire throttle valves 154. Pivotal movement of the throttle valve shaft 156 is controlled by the throttle lever 58 on the handle bar 56 through a control cable that is connected to the throttle valve shaft 156. The control cable can extends into the intake box 122 through a through-hole 171 (FIG. 13) defined at a side surface of the lower chamber member 190. The rider thus can control opening amount of the throttle valves 154 by operating the throttle lever 56 so as to obtain various running conditions of the engine 32 that the rider desires. That is, an amount of air passing through the throttle bodies 148 is controlled by this mechanism and delivered to the respective combustion chambers 98. In order to sense positions of the throttle valves 154, a throttle valve position sensor 172 preferably is provided at one end of the throttle valve shaft 156.

Air is introduced into the plenum chamber 124 through a pair of air inlet ports 160. With reference to FIGS. 3 and 7, in the illustrated embodiment, a filter assembly 162 defines the inlet ports 160. The filter assembly 162 comprises an upper plate 164, a lower plate 166 and a filter element 168 interposed between the upper and lower plates 164, 166.

The lower plate 166 includes a pair of ducts 170 extends inwardly toward the plenum chamber 124. The ducts 170 form the inlet ports 160. The ducts 170 are positioned generally above the cylinder head member 96. As illustrated in FIG. 3, upper ends of the ducts 170 slant so as to face an inner wall portion of the intake box 122 existing opposite the throttle bodies 148. In the illustrated embodiment, the upper or inlet ends of the ducts 170 define a high point proximate to the outlet apertures 146 and a low point distal from the apertures 146. This is advantageous because water or water mist, if any, is likely to move toward this inner wall portion rather than toward the throttle bodies 148. If, however, a smooth flow of air is desired more than the water inhibition, the upper ends of the ducts 170 can slant toward the throttle bodies 148 as indicated by the phantom line of FIG. 3.

In the illustrated embodiment, a guide member 174 is affixed to the lower plate 166 immediately below the ducts 170 by several screws 176. The guide member 174 defines a pair of recesses 178 that are associated with the respective ducts 170. The recesses 178 open toward the starboard side. The air in the cavity 40 of the engine compartment thus is drawn into the plenum chamber 124 along the recesses 178 of the guide member 174 and then through the ducts 170.

Figure 9:
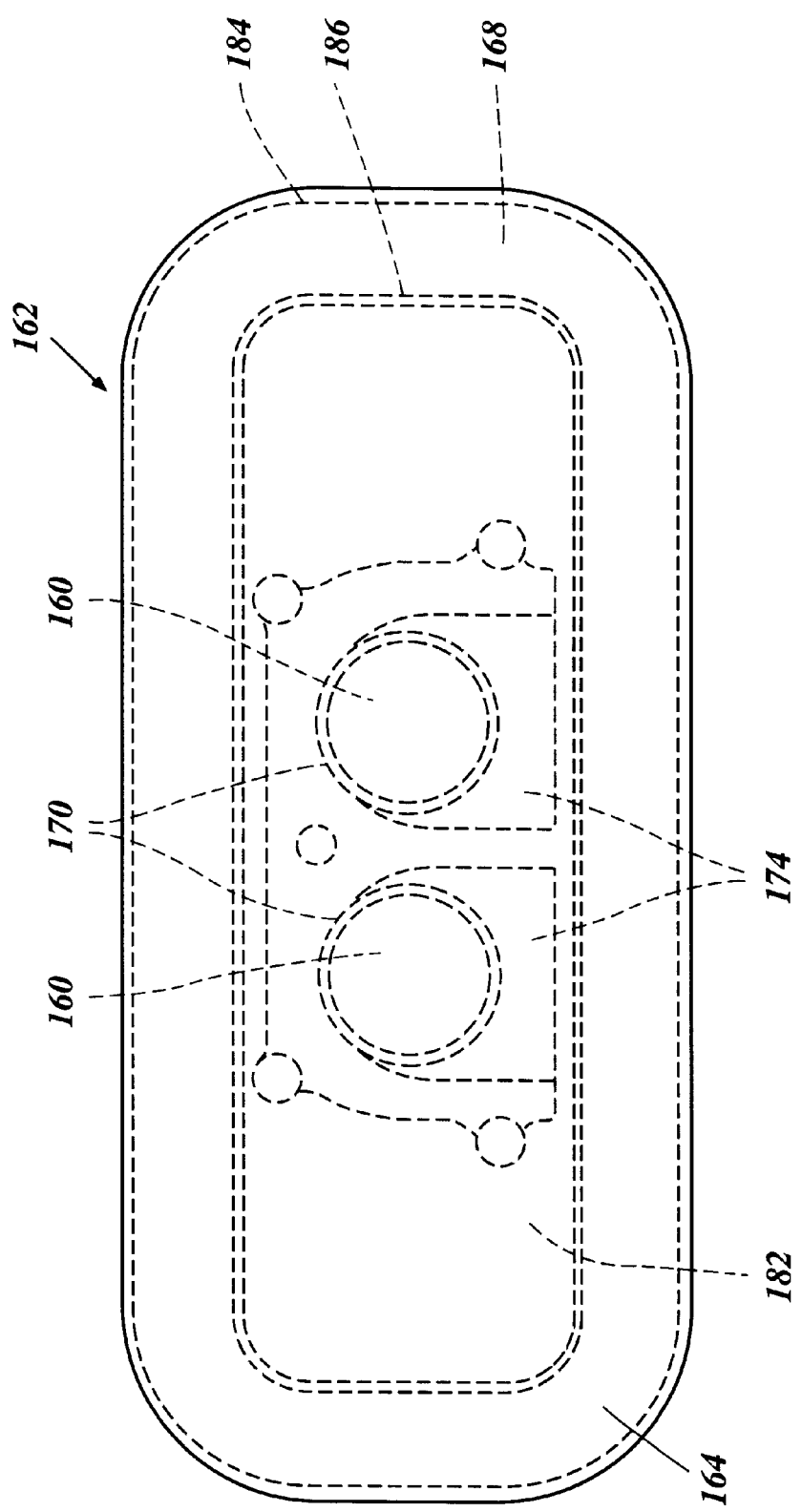
FIG. 9 is a top plan view of a filter assembly. A lower chamber member in part and an air inlet assembly are also illustrated to show a physical relationship with the filter assembly.

With reference to FIG. 9, the filter assembly 162 including the lower plate 166 is configured generally rectangular in shape in a plan view. The filter element 168 extends along a periphery of the rectangular shape so as to have a certain thickness from a peripheral edge. The ducts 170 open to a hollow 182 defined by the filter element 168. The air in this hollow 182 thus cannot reach the throttle bodies 148 unless passing through the filter element 168. Foreign substances in the air are removed by the filter element 168 accordingly.

As illustrated in FIG. 7, outer projections 184 and inner projections 186 are formed on respective opposite surfaces of the upper and lower plates 164, 166 to fixedly support the filter element 168 therebetween. The outer projections 184 extend along the outermost edges of the plates 164, 166, and the inner projections 186 extend generally parallel to the outer projections 184 at a distance slightly larger than the thickness of the filter element 168.

The filter assembly 162 in turn is also fixedly supported by the lower and upper chamber members 130, 128. The lower chamber member 130 has a projection 190 extending toward the upper chamber member 128 and around the inlet opening 144, although the projection 190 is omitted in FIG. 8. This projection 190 prevents the filter assembly 162 from slipping off the opening 144.

Figure 10:
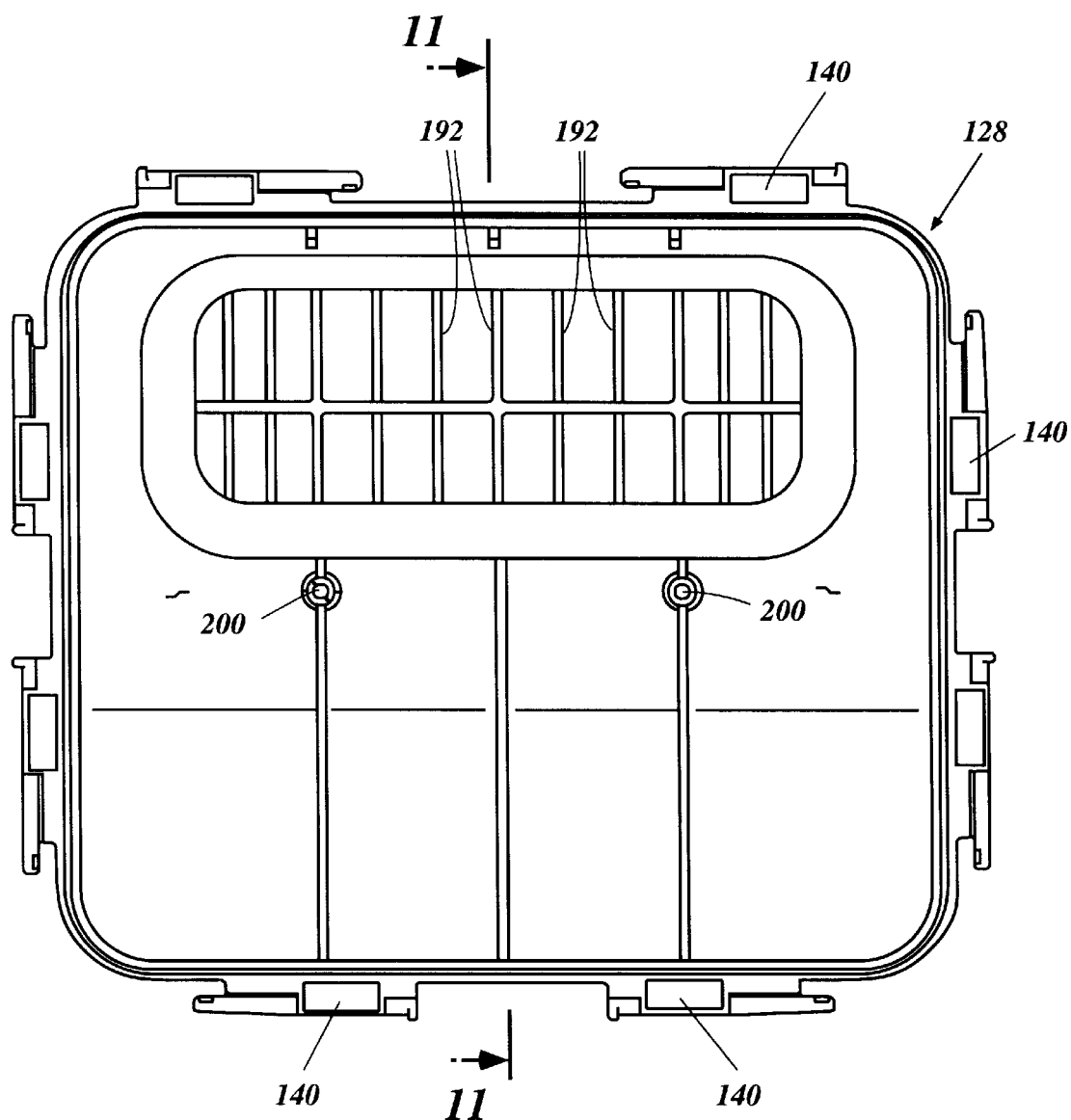
FIG. 10 is a bottom plan view of the upper chamber member.
Figure 11:
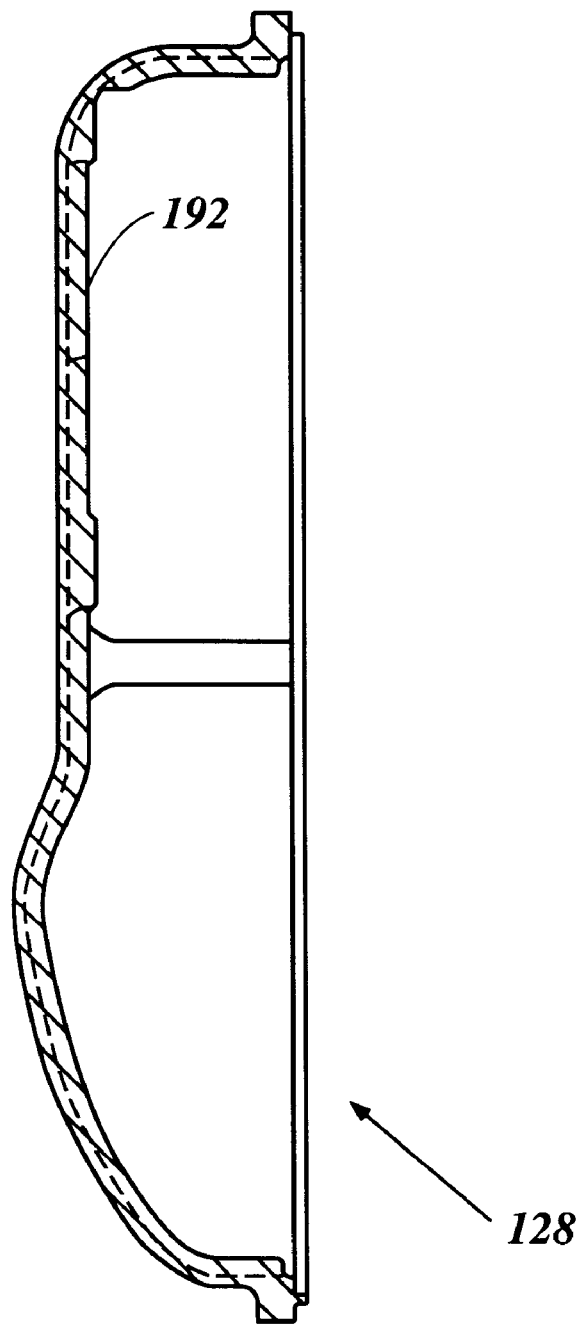
FIG. 11 is a cross-sectional view of the upper chamber member taken along the line 11—11 of FIG. 10.

In addition, with reference to FIGS. 7, 10 and 11, the upper chamber member 128 has a plurality of ribs 192 extending toward the lower chamber member 130, parallel to each other. Tip portions of the respective ribs 192 abut on an upper surface of the upper plate 164. Because a distance between the tip portions of the ribs 192 and the lower chamber plate 130 is slightly less than a distance between the upper surface of the upper plate 164 and a lower surface of the lower plate 166, the filter assembly 162 can be securely interposed between the upper and lower chamber members 128, 130 when the upper chamber member 164 is affixed to the lower chamber member 130 by the coupling members 140.

A plurality of seal members 194 preferably are positioned at outer periphery portions of the upper and lower plates 164, 166 so as to be interposed between the respective chamber members 128, 130 and the respective plates 164, 166. Thereby, the members 128, 130, can be sealedly engaged with each other. However, any known technique can be used to form a sealed enagegment between the members 128, 130, such as, for example, but without limitation, gaskets, o-rings, tongue and groove joints, adhesives and the like. Thus, air is allowed to enter the plenum chamber 124 only through the air inlet ports 160.

Figure 4:
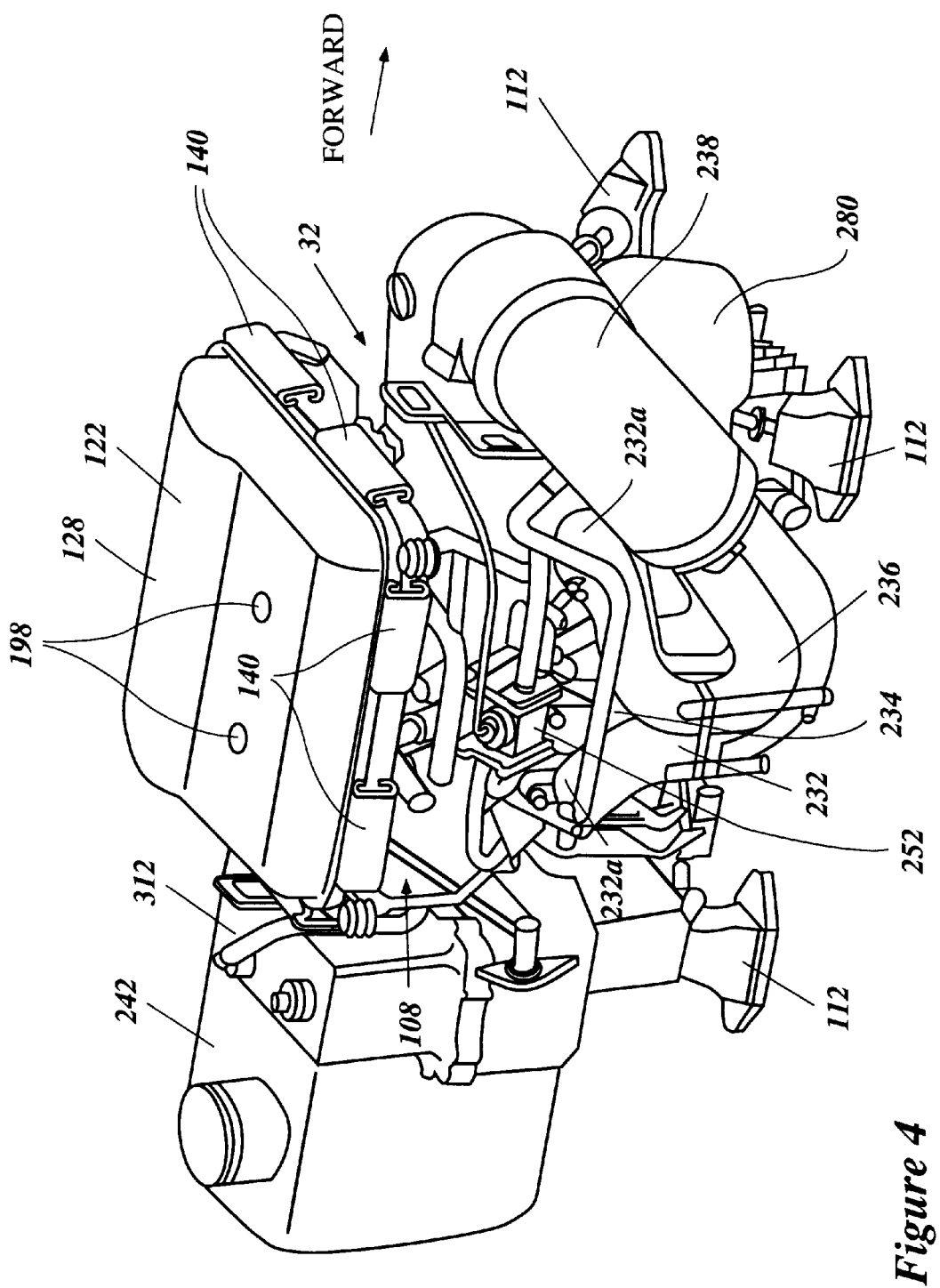
FIG. 4 is a perspective view of the engine viewed from a slightly forward location on the starboard side.
Figure 5:
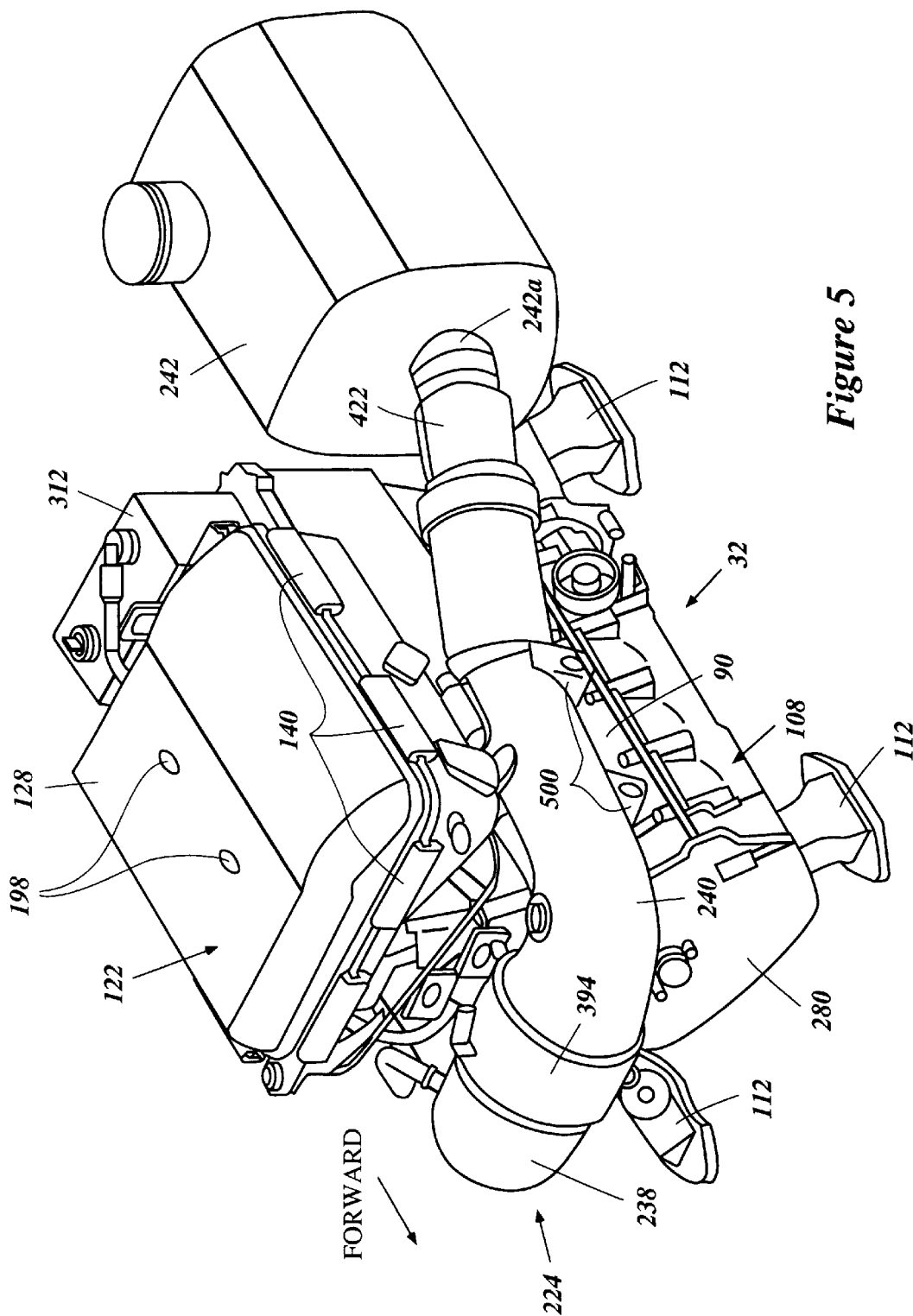
FIG. 5 is a perspective view of the engine viewed from a slightly forward location on the port side.

With reference to FIGS. 4 and 5, the upper chamber member 128 is further fixed to the lower chamber member 130 by a pair of bolts 198 which extend through bolt holes 200 (FIG. 10) of the upper chamber member 128 and bolt holes 202 of the lower chamber member 130. This additional fixing is advantageous not only for the rigid coupling of these chamber members 128, 130 but also for inhibiting noise from occurring by vibration of the upper chamber member 128.

Because the air inlet ports 160 are formed at the bottom of the intake box 122, water and/or other foreign substances are unlikely to enter the plenum chamber 124. Additionally, the filter element 168 further prevents water and foreign particles from entering the throttle bodies 148. In addition, part of inlet ports 160 are defined as the ducts 170 extending into the plenum chamber 124. Thus, a desirable length for efficient silencing of intake noise can be accommodated within the plenum chamber 128.

The engine 32 also includes a fuel supply system as illustrated in FIG. 8. The fuel supply system includes the fuel tank 66 and fuel injectors 210 that are affixed to a fuel rail 212 and are mounted on the throttle bodies 148. The fuel rail 212 extends generally horizontally in the longitudinal direction. A fuel inlet port 214 is defined at a forward portion of the lower chamber member 130 so that the fuel rail 212 is coupled with an external fuel passage. Because the throttle bodies 148 are disposed within the plenum chamber 124, the fuel injectors 210 are also desirably positioned within the plenum chamber 124. However, other types of fuel injector can be used which are not mounted in the intake box 124, such as, for example, but without limitation, direct fuel injectors and induction passage fuel injectors connected to the scavenge passages of two-cycle engines. Electrical cables for the fuel injectors 210 enter the intake box 122 through the through-hole 171 (FIGS. 3 and 13) with the control cable of the throttle shaft 156. Each fuel injector 210 has an injection nozzle directed toward the intake port 116 associated with each fuel injector 210.

The fuel supply system also includes a low-pressure fuel pump, a vapor separator, a high-pressure fuel pump and a pressure regulator, in addition to the fuel tank 66, the fuel injectors 210 and the fuel rail 212. Fuel supplied from the fuel tank 66 is pressurized by the low pressure fuel pump and is delivered to the vapor separator in which the fuel is separated from fuel vapors. One or more high pressure fuel pumps draw the fuel from the vapor separator and pressurize the fuel before it is delivered to the fuel rail 212. The pressure regulator controls the pressure of the supplied fuel, i.e., limits the fuel pressure to a preset pressure level. The fuel rail 212 can be configured to support the fuel injectors 210 as well as deliver the fuel to the respective fuel injectors 210. The fuel injectors 210 spray the fuel into the intake ports 116 at an injection timing and duration under control of an ECU (Electronic Control Unit). The ECU can control the injection timing and duration according to any known control strategy which preferably refers to a signal from at least one engine sensor, such as, for example, but without limitation, the throttle valve position sensor 172.

The sprayed fuel is delivered to the combustion chambers 98 with the air when the intake ports 116 are opened to the combustion chambers 98 by the intake valves 118. The air and the fuel are mixed together to form air/fuel charges which are then combusted in the combustion chambers 98.

The engine 32 further includes a firing or ignition system. As illustrated in FIG. 14, four spark plugs 216 are affixed to the cylinder head member 96 so that electrodes 218, which are defined at one ends of the plugs 216, are exposed to the respective combustion chambers 98. Plug caps 220 are detachably coupled with the other ends of the spark plugs 216. The plug caps 220 have electrical connection with the plugs 216 and electric power is supplied to the plugs 216 through power cables 222 and the plug caps 220. The spark plugs 216 are fired at an ignition timing under control of the ECU. The air/fuel charge is combusted during every combustion stroke accordingly.

In the illustrated embodiment, the plug caps 220 as well as the spark plugs 216 are positioned under the inlet opening 144. Thus, if both the upper chamber member 128 and the filter assembly 162 are detached from the lower chamber member 130, as illustrated in FIG. 8, the plug caps 220 are no longer covered by the induction system. A rider, user, mechanic or repairperson thus can easily access the plug caps 220 and spark plugs 216 for maintenance thereof.

The engine 32 further includes an exhaust system 224 to discharge burnt charges, i.e., exhaust gases, from the combustion chambers 98. In the illustrated embodiment, with reference to FIG. 3, the exhaust system 224 includes four exhaust ports 226. The exhaust ports 226 are defined in the cylinder head member 96 and communicate with the associated combustion chambers 98. Exhaust valves 228 are provided to selectively connect and disconnect the exhaust ports 226 with the combustion chambers 98. That is, the exhaust valves 228 selectively open and close the exhaust ports 226.

As illustrated in FIG. 4, the exhaust system includes an exhaust manifold 231. In a presently preferred embodiment, the manifold 231 comprises a first exhaust manifold 232 and a second exhaust manifold 234 coupled with the exhaust ports 226 on the starboard side to receive exhaust gases from the respective ports 226. The first exhaust manifold 232 is connected with two of the exhaust ports 226 and the second exhaust manifold 234 is connected with the other two exhaust ports 226. In a presently preferred embodiment, the first and second exhaust manifolds 232, 234 are configured to nest with each other.

Respective downstream ends of the first and second exhaust manifolds 232, 234 are coupled with a first unitary exhaust conduit 236. As seen, for example, in FIG. 5, the first unitary conduit 236 is further coupled with a second unitary exhaust conduit 238. The second unitary conduit 238 is then coupled with an exhaust pipe 240 on the rear side of the engine body 108.

The exhaust pipe 240 extends forwardly along a side surface of the engine body 108 on the port side. The exhaust pipe 240 is then connected to a water-lock 242 at a forward surface of the water-lock 242. With reference to FIG. 2, a discharge pipe 244 extends from a top surface of the water-lock 242 and transversely across the center plane CP. The discharge pipe 244 then extends rearwardly and opens at a stern of the lower hull section 36 in a submerged position. The water-lock 242 inhibits the water in the discharge pipe 244 from entering the exhaust pipe 240.

The exhaust system 224 is described in greater detail below with reference to FIGS. 19–47.

The engine 32 further includes a cooling system configured to circulate coolant into thermal communication with at least one component within the watercraft 30. Preferably, the cooling system is an open type cooling system, circulating water from the body of water in which the watercraft 30 is operating, into thermal communication with heat generating components within the watercraft 30. However, other types of cooling systems can be used, such as, for example, but without limitation, closed-type liquid cooling systems using lubricated coolants and air-cooling types.

The cooling system includes a water pump arranged to introduce water from the body of water surrounding the watercraft 30, and a plurality of water jackets defined, for example, in the cylinder block 90 and the cylinder head member 96. The jet propulsion unit preferably is used as the water pump with a portion of the water pressurized by the impeller being drawn off for the cooling system, as known in the art. Although the water is primarily used for cooling these engine portions, part of the water is used also for cooling the exhaust system 224. That is, the engine 32 has at least an engine cooling system and an exhaust cooling system. The water directed to the exhaust cooling system preferably passes through a separate channel apart from the channel connected to the engine cooling system. The exhaust components 232, 234, 236, 238 and 240 are formed as dual passage structures in general. More specifically, water jackets are defined around respective exhaust passages. The water cooling system will also be described later in connection with the exhaust system 224.

Figure 6:
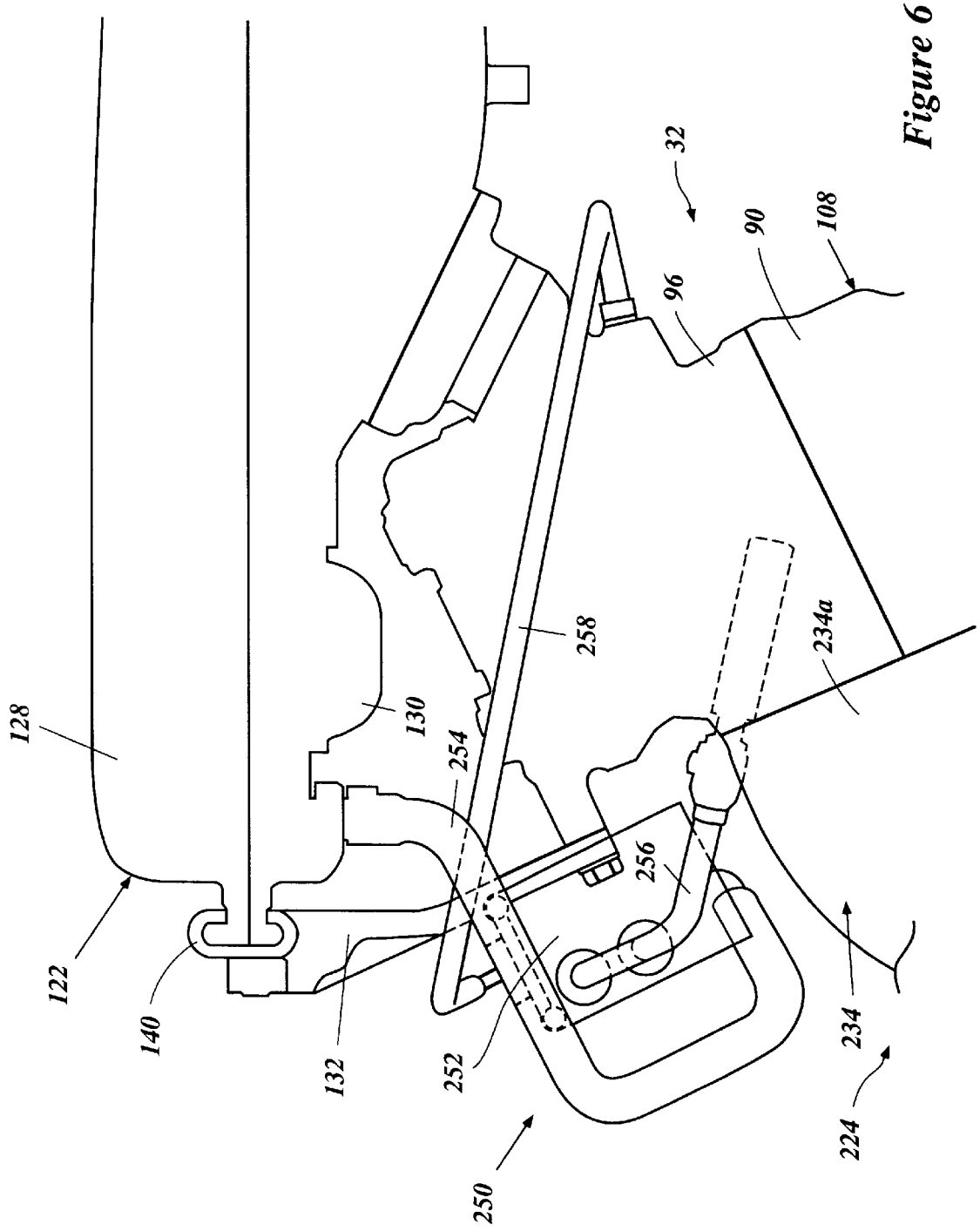
FIG. 6 is a schematic front view showing an arrangement of a secondary air induction system.
Figure 19:
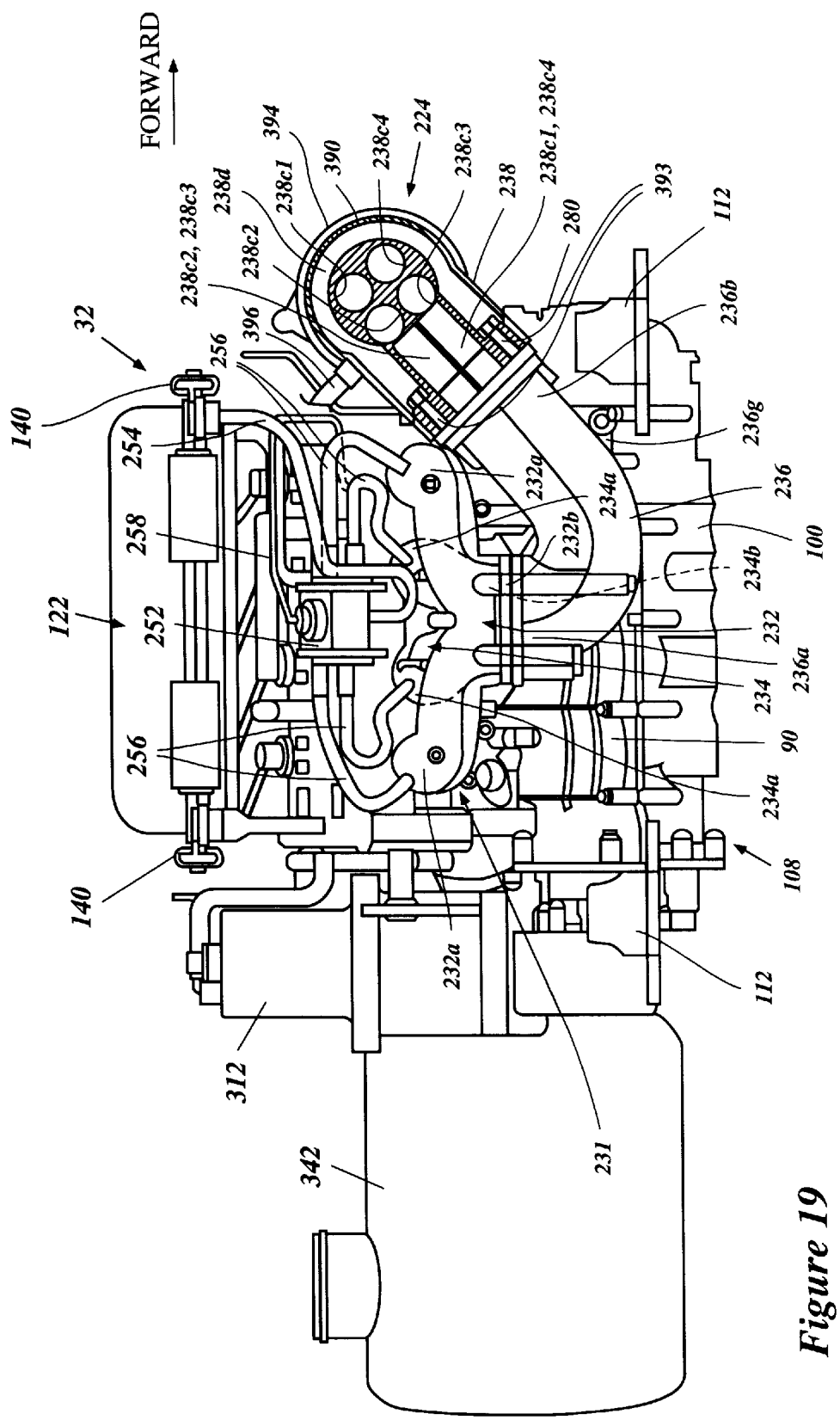
FIG. 19 is a side elevational view of the engine on the starboard side. A second unitary exhaust conduit of the engine is shown in section.
Figure 20:
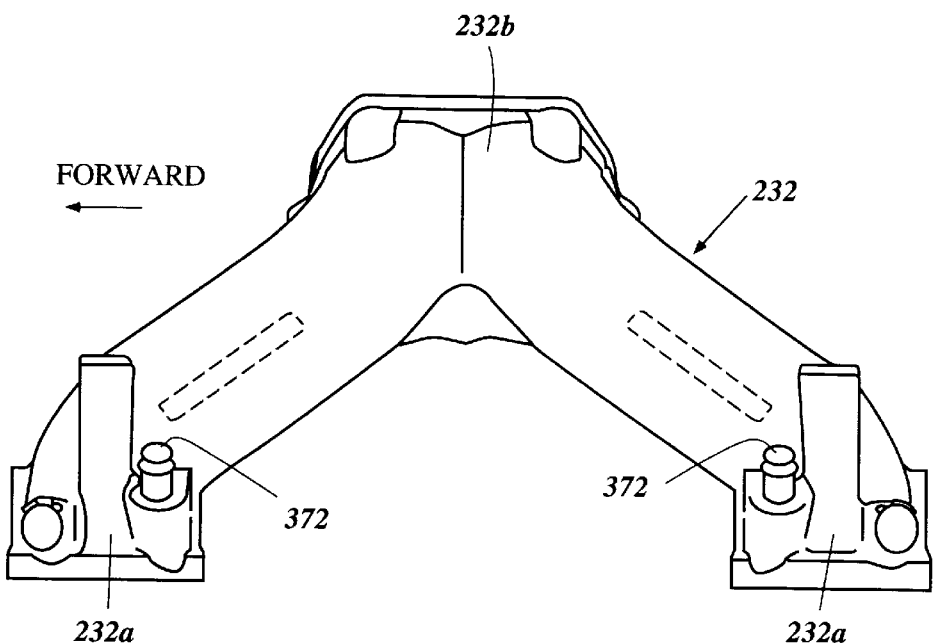
FIG. 20 is a top plan view of a first exhaust manifold of the engine.

With reference to FIGS. 3 and 6 and additionally to FIG. 19, the engine 32 preferably includes a secondary air supply system 250 that supplies air from the air induction system to the exhaust system 224. More specifically, for example, hydro carbon (HC) and carbon monoxide (CO) components of the exhaust gases can be removed by an oxidation reaction with oxygen ($O_2$) that is supplied to the exhaust system 224 from the air induction system.

With reference to FIGS. 3 and 6, a secondary air supply device 252 is disposed next to the cylinder head member 96 on the starboard side. The air supply device 252 defines a closed cavity therein and contains a control valve therein. The air supply device 252 is affixed to the engine body 108 together with one of the stays 132 that supports the air intake box 122. A single upstream air conduit 254 extends from a bottom portion of the lower chamber member 130 to a lower portion of the air supply device 252, and four downstream air conduits 256 extend from an upper portion of the air supply device 252 to the respective first and second exhaust manifolds 232, 234. That is, the respective downstream conduits 256 are allotted to respective passages of the manifolds 232, 234. In addition, a vacuum line 258 extends from a top portion of the air supply device 252 to one of the air intake ports 116.

The control valve controls a flow of air from the upstream conduit 254 toward the downstream conduits 256 in accordance with a condition of the negative pressure. If the negative pressure is greater than a predetermined negative pressure, the control valve permits the air flow to the downstream conduits 256. However, if the negative pressure is less than the predetermined negative pressure, then the control valve precludes the air from flowing to the downstream conduits 256. Air supplied from the air supply device 252 thus allows air to pass to the exhaust system preferably under a relatively high speed and/or high load condition because greater amounts of hydrocarbon (HC) and carbon monoxide (CO) are more likely to be present in the exhaust gases under such a condition.

With reference to FIGS. 3 and 14, the engine 32 has a valve cam mechanism for actuating the intake and exhaust valves 118, 228. In the illustrated embodiment, a double overhead camshaft drive is employed. That is, an intake camshaft 260 actuates the intake valves 118 and an exhaust camshaft 262 separately actuates the exhaust valves 228. The intake camshaft 260 extends generally horizontally over the intake valves 118 from fore to aft in parallel to the center plane CP, and the exhaust camshaft 262 extends generally horizontally over the exhaust valves 228 from fore to aft also in parallel to the center plane CP.

Both the intake and exhaust camshafts 260, 262 are journaled by the cylinder head member 96 with a plurality of camshaft caps. The camshaft caps holding the camshafts 260, 262 are affixed to the cylinder head member 96. A cylinder head cover member 264 extends over the camshafts 260, 262 and the camshaft caps, and is affixed to the cylinder head member 96 to define a camshaft chamber. The stays 132 and the secondary air supply device 252 are preferably affixed to the cylinder head cover member 264. Additionally, the air supply device 252 is desirably disposed between the intake air box and the engine body 108.

The intake camshaft 260 has cam lobes each associated with a respective intake valves 118, and the exhaust camshaft 262 also has cam lobes associated with respective exhaust valves 228. The intake and exhaust valves 118, 228 normally close the intake and exhaust ports 116, 226 by a biasing force of springs. When the intake and exhaust camshafts 260, 262 rotate, the cam lobes push the respective valves 118, 228 to open the respective ports 116, 228 by overcoming the biasing force of the spring. The air thus can enter the combustion chambers 98 when the intake valves 118 open. In the same manner, the exhaust gases can move out from the combustion chambers 98 when the exhaust valves 228 open.

The crankshaft 82 preferably drives the intake and exhaust camshafts 260, 262. The respective camshafts 260, 262 have driven sprockets affixed to ends thereof The crankshaft 82 also has a drive sprocket. Each driven sprocket has a diameter which is twice as large as a diameter of the drive sprocket. A timing chain or belt is wound around the drive and driven sprockets. When the crankshaft 82 rotates, the drive sprocket drives the driven sprockets via the timing chain, and thus the intake and exhaust camshafts 260, 262 also rotate. The rotational speed of the camshafts 260, 262 are reduced to half as the rotational speed of the crankshaft 82 because of the differences in diameters of the drive and driven sprockets.

Ambient air enters the internal cavity 40 defined in the hull 34 through the air ducts 70. The air is then introduced into the plenum chamber 124 defined by the intake box 122 through the air inlet ports 160 and drawn into the throttle bodies 148. The air filter element 168, which preferably comprises a water-repellent element and an oil resistant element, filters the air. The majority of the air in the plenum chamber 124 is supplied to the combustion chambers 98. The throttle valves 154 in the throttle bodies 148 regulate an amount of the air permitted to pass to the combustion chambers 98. The opening angles of the throttle valves 154 are controlled by the rider with the throttle lever 58 and thus controls the airflow across the valves. The air hence flows into the combustion chambers 98 when the intake valves 118 open. At the same time, the fuel injectors 210 spray fuel into the intake ports 116 under the control of ECU. Air/fuel charges are thus formed and delivered to the combustion chambers 98.

The air/fuel charges are fired by the spark plugs 216 under the control of the ECU. The burnt charges, i.e., exhaust gases, are discharged to the body of water surrounding the watercraft 30 through the exhaust system 224. A relatively small amount of the air in the plenum chamber 124 is supplied to the exhaust system 224 through the secondary air supply system 250 so as to aid in further combustion of any unburnt fuel remaining in the exhaust gases.

The combustion of the air/fuel charges causes the pistons 94 reciprocate and thus causes the crankshaft 82 to rotate. The crankshaft 82 drives the impeller shaft 80 and the impeller rotates in the hull tunnel 74. Water is thus drawn into the tunnel 74 through the inlet port 76 and then is discharged rearward through the steering nozzle 86. The rider steers the nozzle 86 by the steering handle bar 56. The watercraft 30 thus moves as the rider desires.

Figure 15:
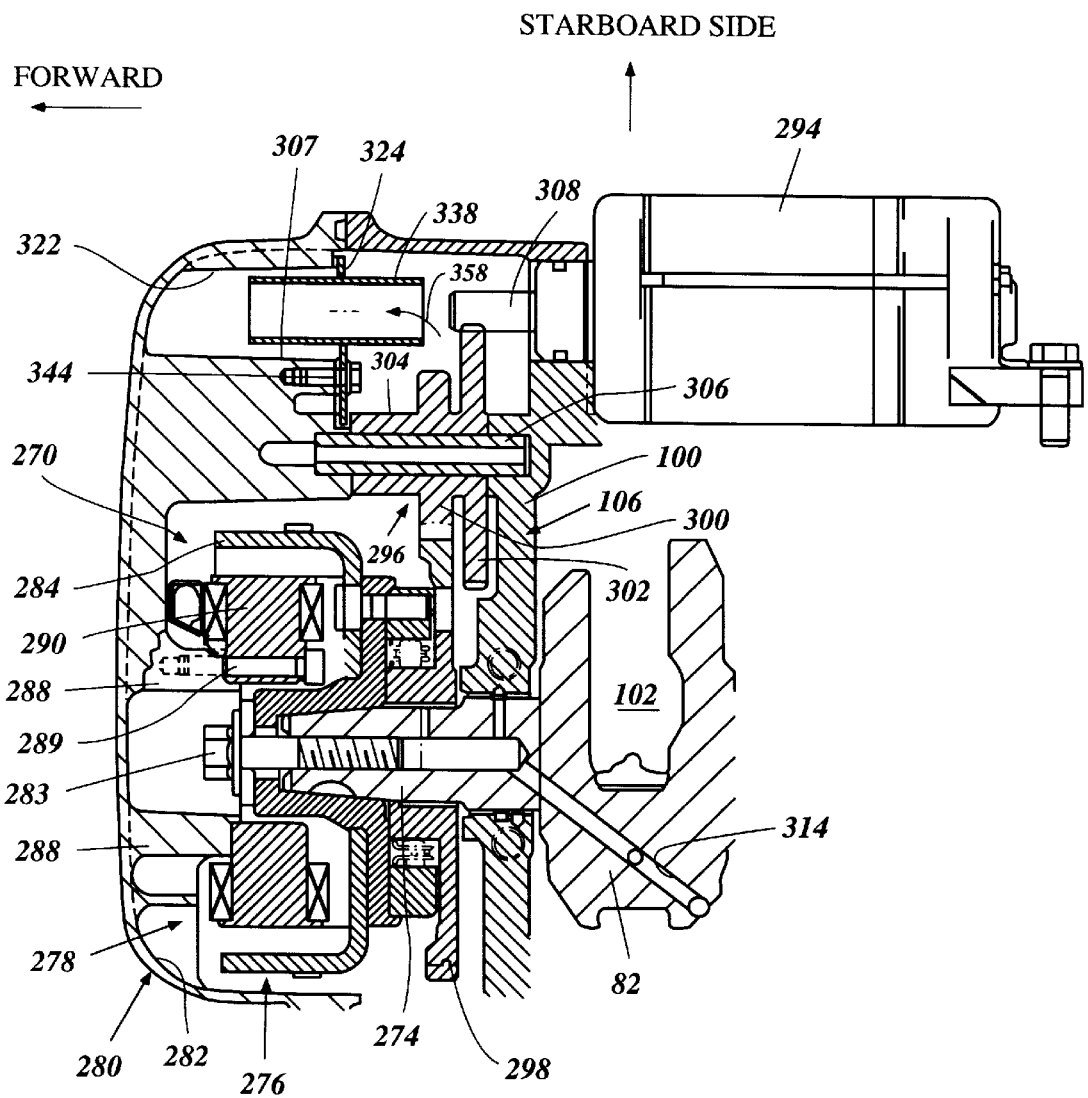
FIG. 15 is a partial cross-sectional view of the engine taken along the line 15—15 of FIG. 14.

The engine 32 also includes other components relating to the engine operations. With reference to FIGS. 14 and 15, the engine employs a flywheel magneto or AC generator 270 as one of such engine components. The flywheel magneto 270 generates electric power that is used for the engine operation as well as for electrical accessories associated with the watercraft 30.

A forward end 274 of the crankshaft 82 extends beyond forward end surface of the crankcase member 100, i.e., the forwardmost bearing 106. A flywheel magneto cover member 280 is affixed to the cylinder block 90 and the crankcase member 100 by bolts 281 so as to define a flywheel chamber 282 at the forward ends of the cylinder block 90 and the crankcase member 100. Seal members are provided to seal the flywheel chamber 282 in a substantially air-tightly manner. The flywheel magneto 270 is formed at the forward end of the crankshaft 82 and thus is disposed in the flywheel chamber 282. With reference to FIGS. 3–5, two of the foregoing engine mounts 112 preferably extend from the flywheel cover member 280.

The flywheel magneto 270 comprises a rotor assembly 276 and a stator assembly 278. The rotor assembly 276 is affixed to the forward end 274 of the crankshaft 82 by a bolt 283 so as to rotate with the crankshaft 82. The rotor assembly 276 includes a rotor 284 which is configured with a cup-like shape. The cup-like rotor 284 has a plurality of magnets 286 affixed to an inner surface thereof. The stator assembly 278 is affixed to an inner surface of the flywheel cover member 280. A plurality of stays 288 extends from the inner surface of the cover member 280 and the stator assembly 278 is affixed to the stays by bolts 289 (FIG. 15). The stator assembly 278 includes a plurality of electrical coils 290 which are positioned in the cup-like shape of the rotor 284 to face the magnets 286.

The rotor assembly 276 rotates around the stator assembly 278 with the rotation of the crankshaft 82. The magnets 286 thus repeatedly approach to and depart from the coils 290. The coils 290 induce electrical current by the electromagnetic mutual effect accordingly. In other words, the flywheel magneto 270 generates AC power. This AC power is rectified and regulated by a rectifier-regulator and then is accumulated in a battery as DC power. The DC power of the battery or AC power directly is used for the engine operations and for other needs of the watercraft 30.

Figure 16:
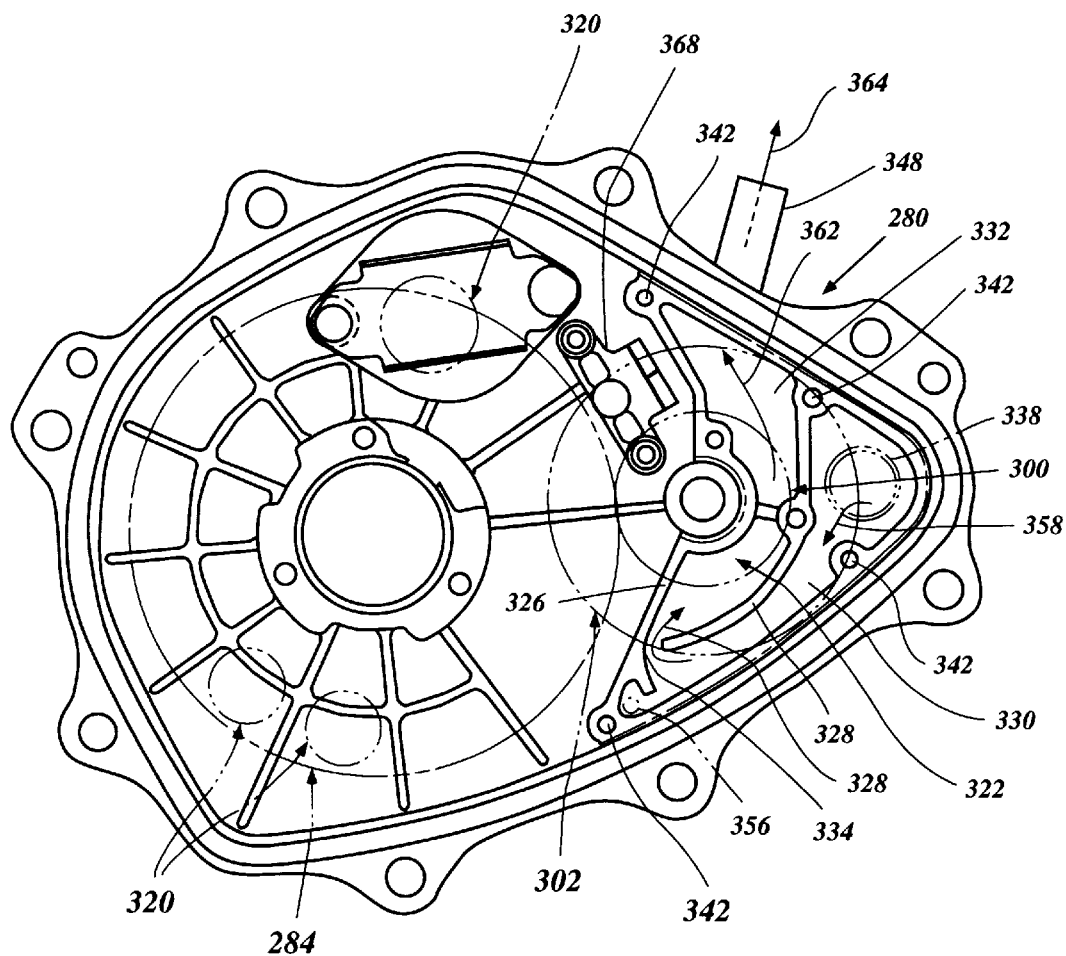
FIG. 16 is a rear (inside) view of a flywheel magneto cover that is attached to the engine.
Figures 17, 18:
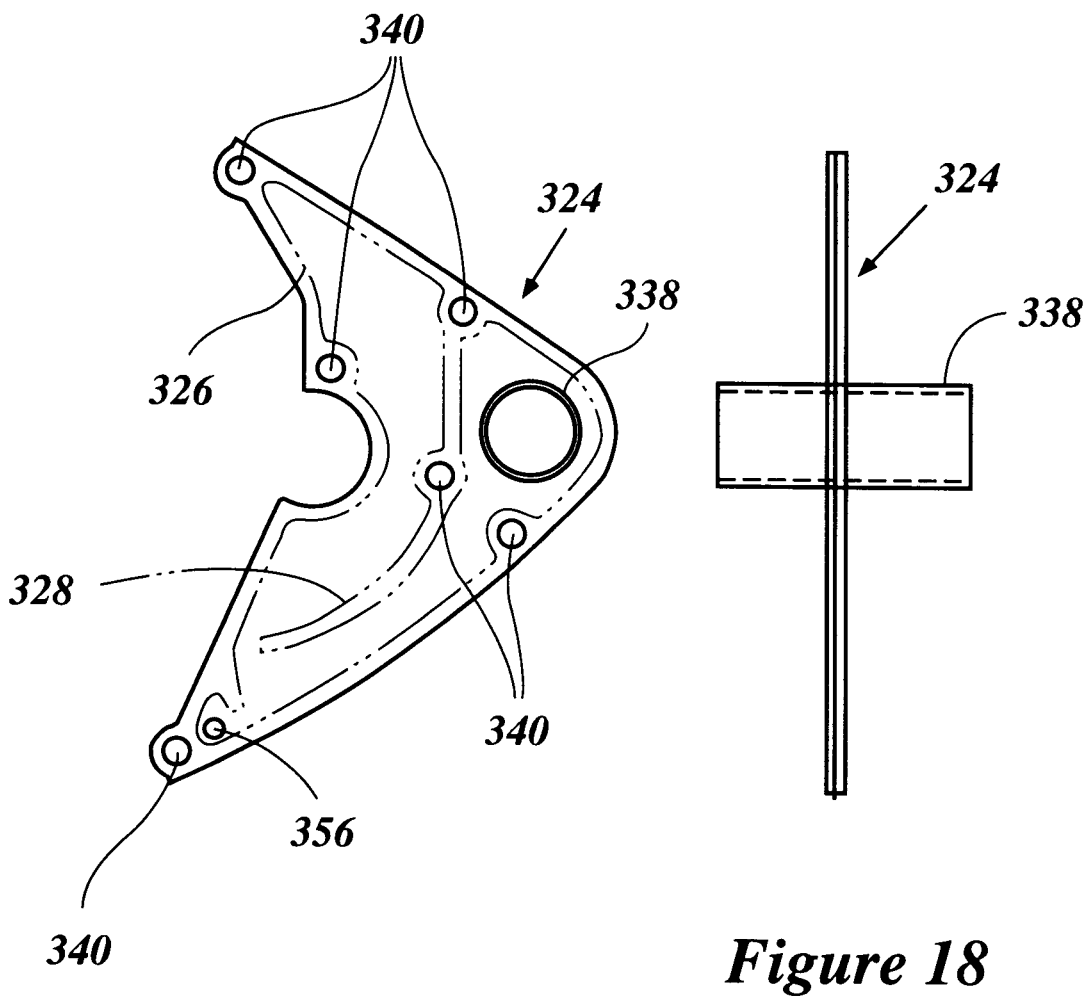
FIG. 17 is a rear (inside) view of a baffle plate that defines a breather chamber.
FIG. 18 is a side view of the baffle plate.

With reference to FIG. 14 and additionally to FIGS. 15 and 16, a stator motor 294 is coupled with the crankshaft 82 through a gear train 296. The starter motor 294 is positioned on the starboard side and affixed to the crankcase member 100. The gear train 296 comprises a first gear 298, a second gear 300, and a third gear 302. The first gear 298 is interposed between the forwardmost bearing 106 and the rotor assembly 276 and is mounted on the crankshaft 82 for rotation with the crankshaft 82 through, for example, a splined connection. The second and third gears 300, 302 are formed on a common intermediate shaft 304 and journaled on a sleeve 306 that extends between the cylinder block 90 and the flywheel cover member 280. One end of the sleeve 306 is supported by the cylinder block 90 and the other end thereof is supported by the cover member 280. The second gear 300 has a diameter less than a diameter of the third gear 302 and meshes with the first gear 298. The third gear 302, which has the greater diameter, meshes with a geared shaft 308 of the stator motor 294.

When a rider actuates a starter motor switch, the shaft 308 of the starter motor 294 rotates because the electric power is supplied to the motor 294 from the battery. This rotation of the stator motor 294 drives the crankshaft 82 through the gear train 296 in a reduced speed and with an increased torque because of the difference in the diameters of the second and third gears 300, 302. The engine 32 starts the operation accordingly. Since the starter motor 294 includes a one-way clutch mechanism, the rotation of the crankshaft 82 does not drive the shaft 308 of the starter motor 294 conversely so as to prevent a breakage of the stator motor 294. The intermediate shaft 304 with the second and third gears 300, 302 idles under this condition.

The engine 32 preferably includes a lubrication system that delivers lubricant oil to engine portions for inhibiting frictional wear of such portions. In the illustrated embodiment, a dry-sump lubrication system is employed. This system is a closed-loop type and includes an oil reservoir 312 as illustrated in FIGS. 2, 4 and 5.

An oil delivery pump is provided within a circulation loop to deliver the oil in the reservoir 312 to the engine portions that are to be lubricated, for example, but without limitation, the pistons 94 and crankshaft bearings 106. The delivery pump preferably is driven by the crankshaft 82 or one of the camshafts 260, 262. With reference to FIG. 14, oil galleries 314 are defined in the crankcase member 100, crankshaft bearings 106 and the crankshaft 82 itself. The oil is pressurized by the delivery pump to flow through these galleries 314. Before entering the galleries 314, the oil passes through an oil filter 315 (FIG. 3) which removes foreign substances from the oil. The oil filter 315 is disposed at a side surface of the engine body 108 on the port side. The oil comes out and/or is sprayed to the portions from the galleries 314. FIG.

14 illustrates exemplary oil injection indicated by the reference numeral 316 that is directed toward the pistons 94 from the oil gallery 314 of the bearings 106. A return pump is also provided in the system to return the oil that has dropped down to an inner bottom portion of the crankcase member 100 back to the oil reservoir 312. The return pump is preferably driven by the crankshaft 82 or one of the camshafts 260, 262 also.

The engine 32 also includes a blow-by gas and oil mist collection system that is illustrated in FIGS. 14–18. Although several piston rings disposed around the respective pistons 94 substantially prevent the air/fuel charges from leaking to the crankcase chamber 102 from the combustion chambers 98, part of the charges nevertheless pass through the seal due to the tremendous pressure in the combustion chambers 98. The air/fuel charges that have leaked form the combustion chambers 98 form blow-by gases and drift into the crankcase chamber 102. In addition, the lubricant oil in the crankcase chamber 102 can form oil mist due to rapid rotation of the crankshaft 82 and the oil mist also drifts within the crankcase chamber 102. The blow-by gas and oil mist collection system thus collects such gases and mist, separates liquid components from gaseous components and then guides the separated liquid components to the lubrication system and the gaseous components to the air induction system.

With reference to FIGS. 14 and 16, the flywheel chamber 282 communicates with the crankcase chamber 102 through three apertures 320 and hence the blow-by gases and oil mist can move into the flywheel chamber 282 from the crankcase chamber 102. The blow-by gases and oil mist together are referred to as "blow-by gases" or "blow-by gas" herein unless otherwise described.

A breather compartment or oil separator 322 (FIG. 16) is further defined in the flywheel chamber 282. A breather plate 324, a circumferential rib 326 and a baffle rib 328 form the breather compartment 322. The circumferential rib 326 is configured generally as the same shape as the plate 324 and extends from the flywheel cover member 280.

With reference to FIG. 16, the baffle rib 328 extends generally downwardly from a top portion of the circumferential rib 326 but is not coupled with any other portions so as to define a first breather passage 330 and a second breather passage 332 communicating with one another through a channel 334 formed between the baffle rib 328 and a lower portion of the circumferential rib 326. The breather plate 324 has a breather pipe 338 provided so that the first breather passage 330 communicates with the rest part of the flywheel chamber 282. The breather plate 324 has six bolt holes 340 and the ribs 326, 328 of the flywheel cover member 280 also has six bolt holes 342 corresponding to the bolt holes 340. The breather plate 324 is affixed to the ribs 326, 328 by bolts 344 (FIG. 15) to complete the breather compartment 322.

Figure 13:
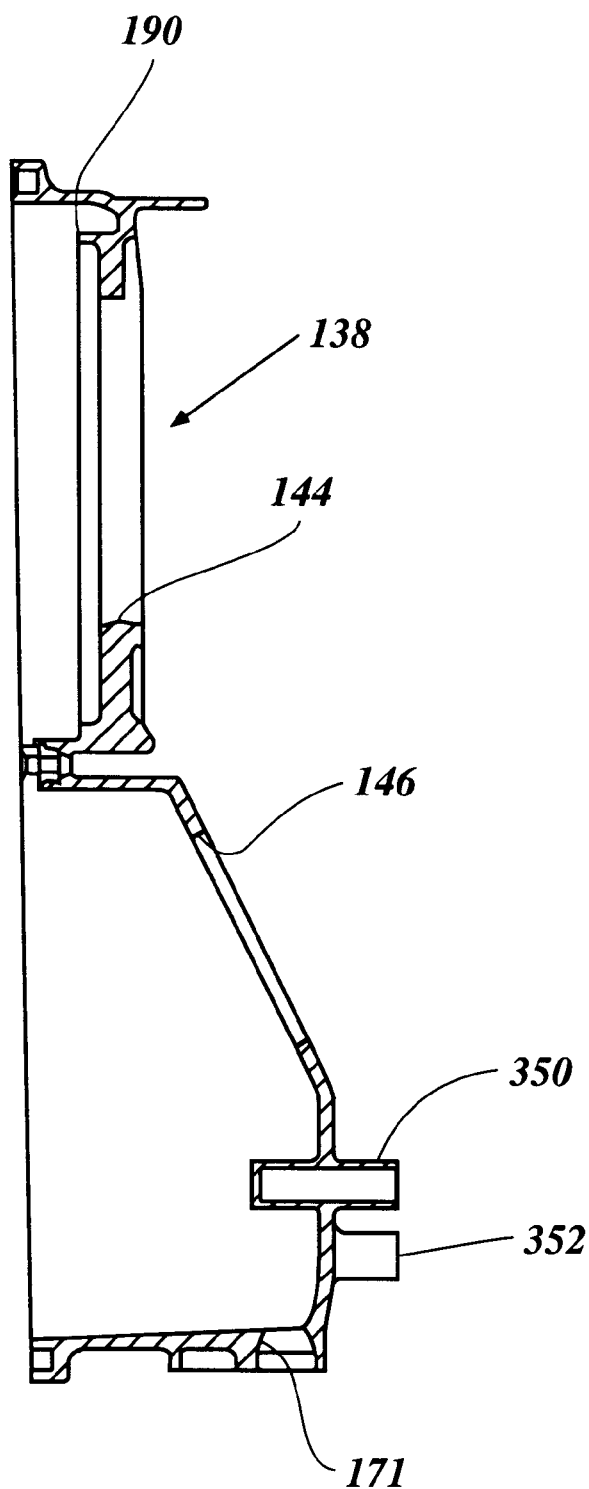
FIG. 13 is a cross-sectional view of the lower chamber member taken along the line 13—13 of FIG. 12.

With reference to FIG. 16, the flywheel cover member 280 has a blow-by gas outlet port 348 which communicates with the second breather passage 332 of the breather compartment 322. An external blow-by gas conduit connects the outlet port 348 with the plenum chamber 124 of the air intake box 122. As illustrated in FIGS. 3, 12 and 13, the lower chamber member 130 of the intake box 122 has a blow-by gas inlet port 350 next to one of the apertures 148 through which the throttle bodies 148 are furnished, and the external conduit is connected to the inlet port 350. A water discharge hole 352 is provided in the close proximity to the inlet port 350 to discharge water accumulating in the plenum chamber 124. The water discharge hole 352 can have a one-way valve that allows the accumulating water to move out but inhibits water existing outside from entering.

The breather plate 324 has an oil outlet port 356 at the lowermost portion of the breather compartment 322. The breather compartment 322 again communicates with the main flywheel chamber 282 through the oil outlet port 356.

With reference to FIG. 16, during operation. the blow-by gases, which are gaseous components, and oil components in the flywheel chamber 282 are drawn to the first breather passage 330 of the breather compartment 322 through the breather pipe 338 as indicated by the arrow 358. The blow-by gases and oil components together move down to the bottom of the breather compartment 322 along the first passage 330 because the baffle rib 328 prevents the gases from directly moving to the second breather passage 332. At the bottom of the first passage 330, the blow-by gases enter the second passage 332 through the channel 334 as indicated by the arrow 360 of FIG. 16. The oil components, however, do not enter the second passage 332 due to heavier weight thereof. That is, the oil is separated at this bottom portion of the breather compartment 322.

The separated oil returns to the crankcase chamber 102 so as to merge with other oil in the lubrication system again. The blow-by gases go up through the second passage 332 to the outlet port 348 as indicated by the arrow 362 and then move to the plenum chamber 124 through the external conduit as indicated by the arrow 364. The blow-by gases then merge with fresh air that is drawn into the plenum chamber 124 and are introduced into the combustion chambers 98 for combustion therein. The flow of the blow-by gases is due to the pressure in the intake box 122 which is always less than the pressure in the flywheel chamber 282 and in the breather compartment 322 under the engine running conditions.

The engine 32 preferably includes a crankshaft angle position sensor 368 which is associated with the crankshaft 82 and, when measuring crankshaft angle versus time, outputs a crankshaft rotational speed signal or engine speed signal that is sent to the ECU, for example. The sensor 368 preferably comprises a pulsar coil positioned adjacent to the outer surface of the rotor 284 and a projection or cut formed on the rotor 284. The pulsar coil generates a pulse when the projection or cut passes proximate the pulsar coil. In one arrangement, the number of passes can be counted. The sensor 368 thus can sense not only a specific crankshaft angle but also a rotational speed of the crankshaft 82. Of course, other types of speed sensors also can be used. The signal is sent to the ECU to be used for the engine control.

Because the breather compartment 322 is defined in the flywheel cover member 280 in this embodiment, no space is necessary outside the engine body 108 and less parts and members are needed for building the breather compartment 322.

The breather compartment 322 can be formed using a dead space next to the starter motor 294. In addition, the gear train 296 can act as a baffle and hence the oil components are more likely to be separated.

Because the breather pipe 338 is positioned generally at a middle height portion of the flywheel cover member 282, lubricant oil accumulating in the flywheel chamber 282 does not enter the breather compartment 322 and further the plenum chamber 140 through the breather pipe 338 even if the watercraft 30 capsizes.

Primarily with reference to FIGS. 19–47 and to FIGS. 1–6 and 14, the exhaust system 224 is described in greater detail below.

Figure 30:
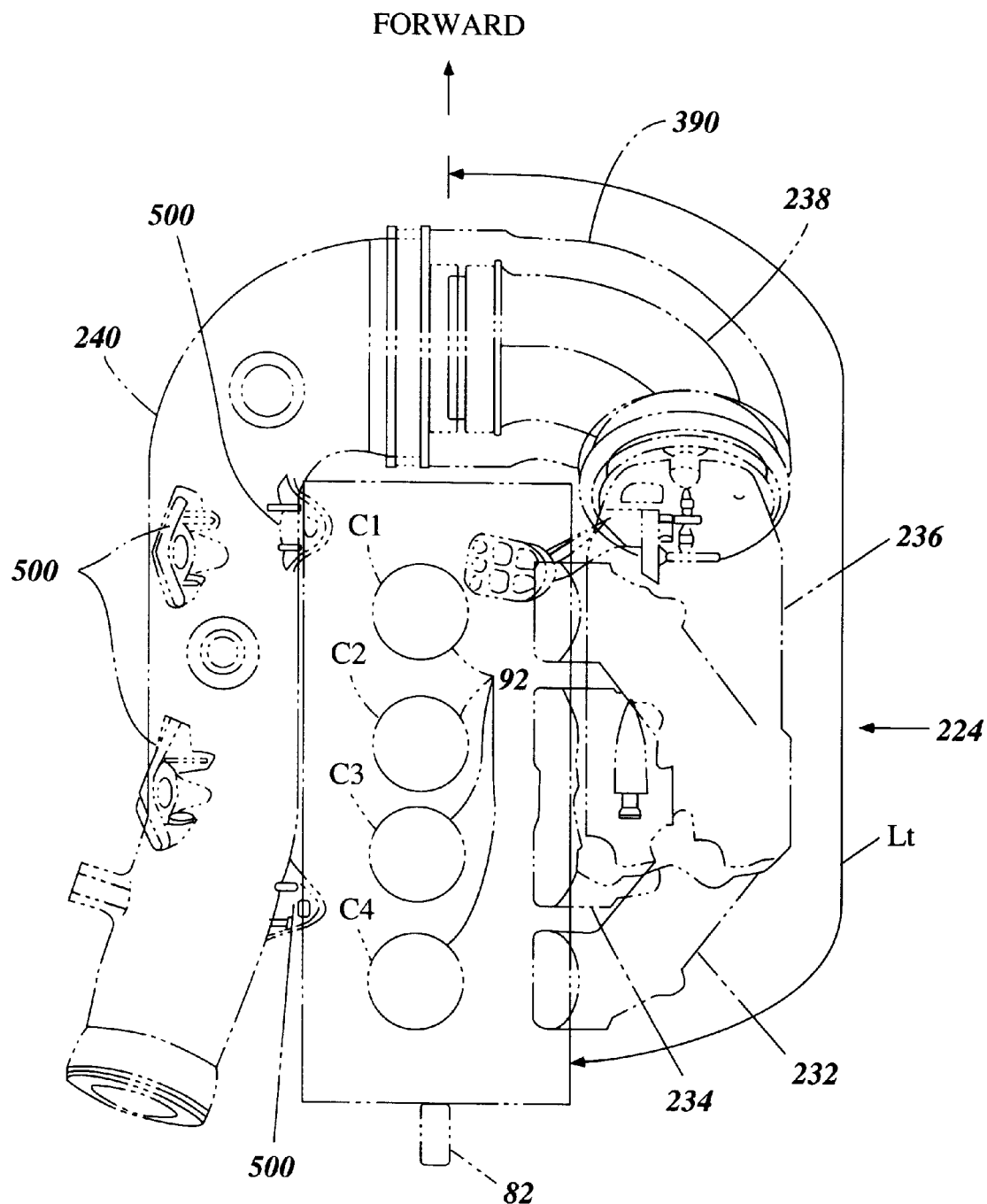
FIG. 30 is a schematic top plan view showing a relationship between the engine body and an exhaust system in phantom.
Figure 35:
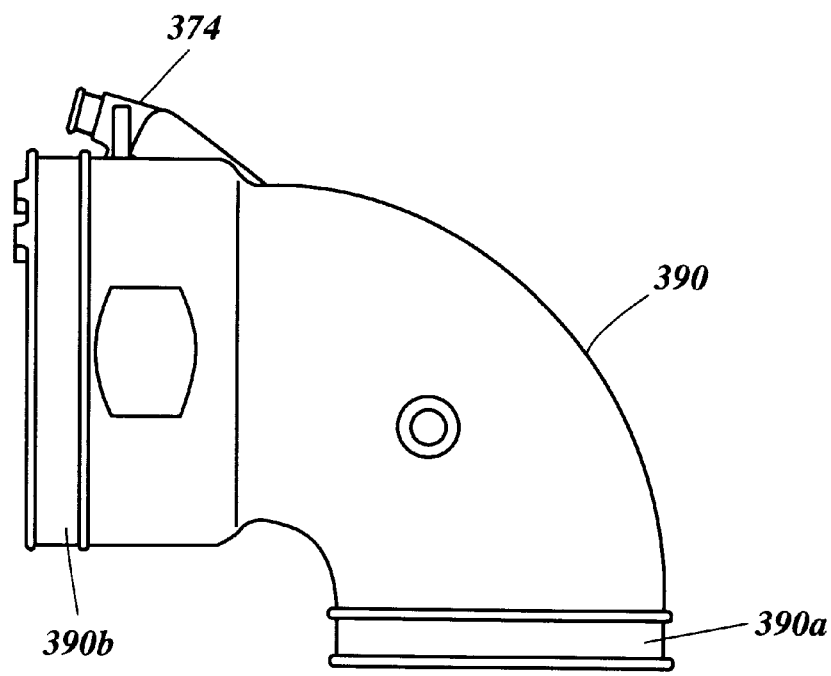
FIG. 35 is a top plan view of the rubber member.
Figure 43:
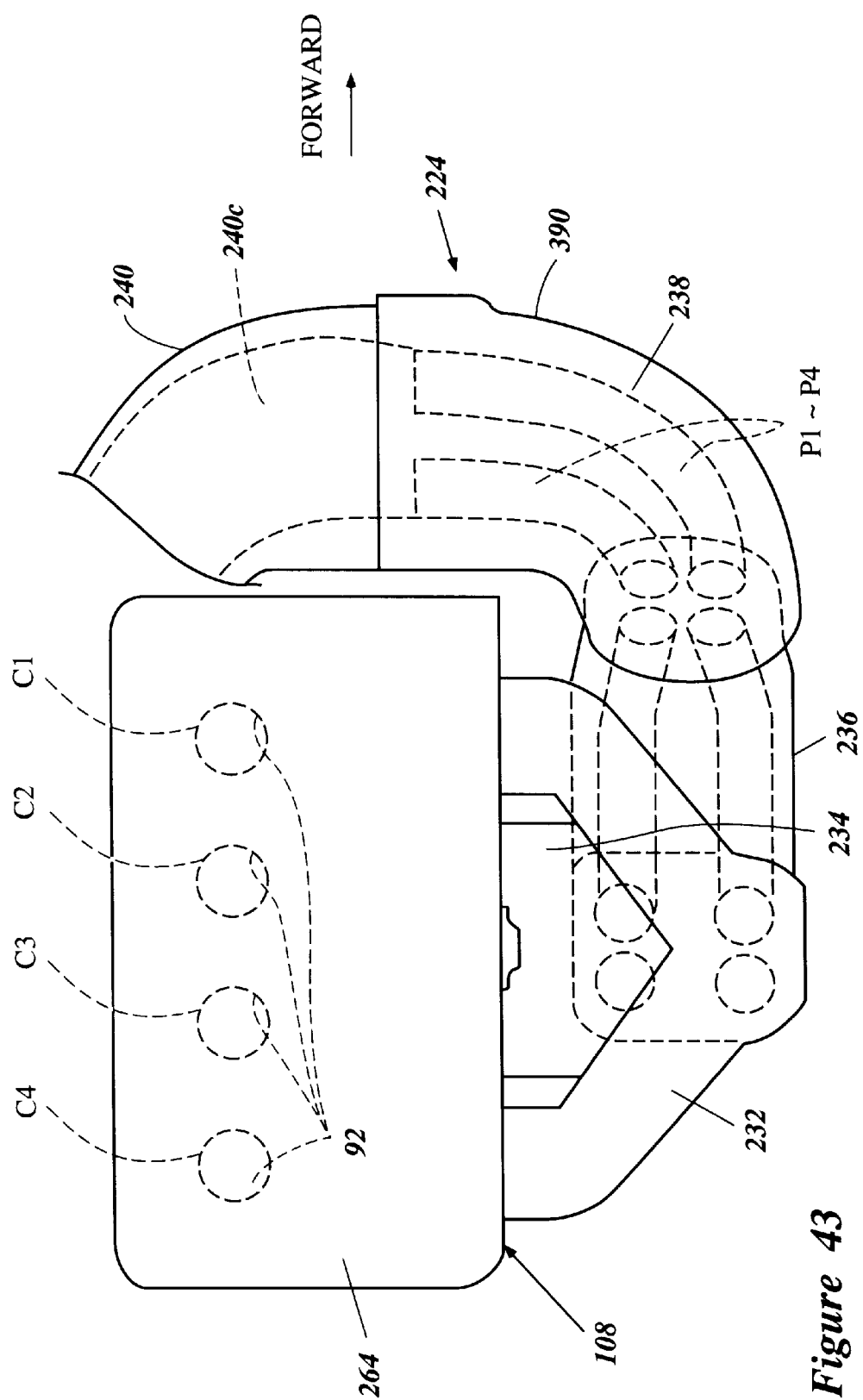
FIG. 43 is a schematic top plan view of the engine body and the exhaust system particularly showing relationships between respective external exhaust conduits and internal exhaust passages thereof.
Figure 44:
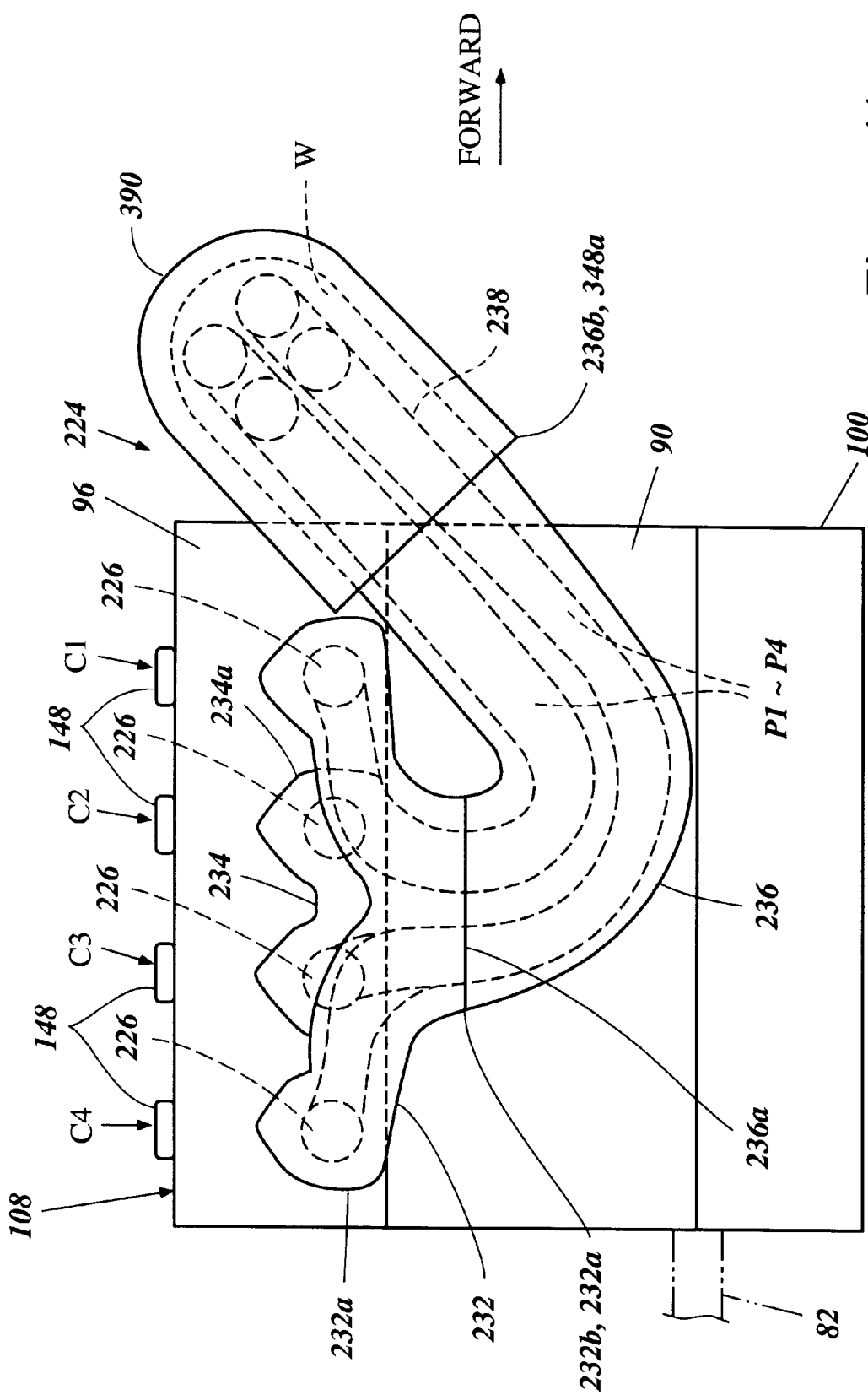
FIG. 44 is a schematic side view of the engine body and the exhaust system showing the relationships in this view.

As schematically illustrated in FIGS. 30, 43 and 44, the cylinder bores 92 are aligned along the center plane CP fore to aft. The throttle bodies 148 are similarly aligned. As used through the following description, therefore, the terms "first cylinder C1," "second cylinder C2," "third cylinder C3" and "fourth cylinder C4" mean a cylinder having a cylinder bore 92 and the throttle body 148 at the most forward position, a cylinder having a cylinder bore 92 and the throttle body 148 second from the first cylinder C1, a cylinder having a cylinder bore 92 and the throttle body 148 third from the first cylinder C1 and a cylinder having a cylinder bore 92 and the throttle body 148 fourth from the first cylinder C1, respectively.

Figure 21:
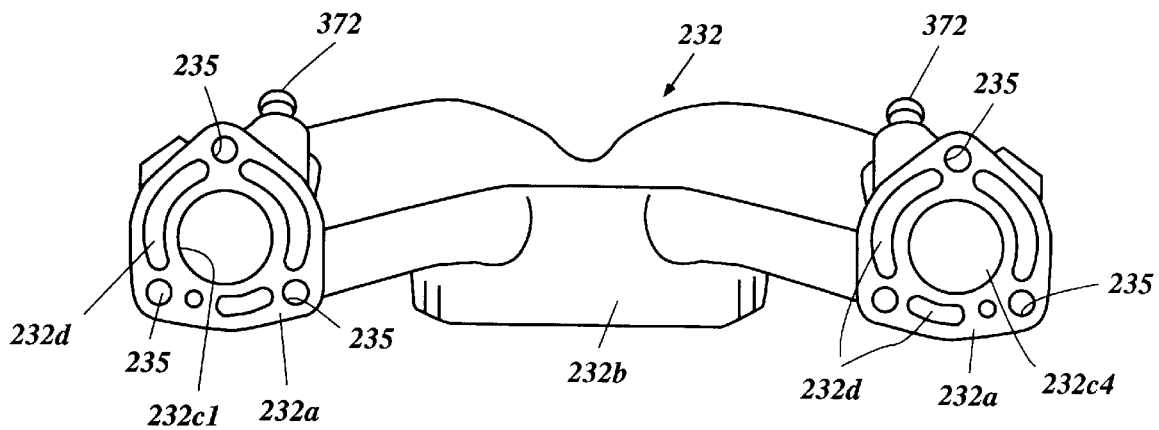
FIG. 21 is a side view of the manifold viewed from an engine body.
Figure 22:
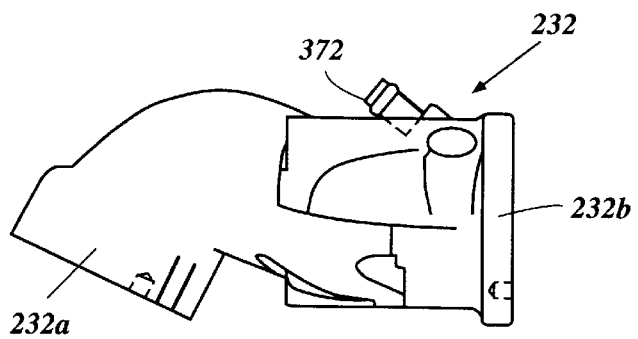
FIG. 22 is a rear view of the manifold.

The first and second exhaust manifolds 232, 234 are affixed to the cylinder head member 96 on the starboard side by bolts. The first exhaust manifold 232 and the second exhaust manifold 234 have upstream ends 232a, 234a and downstream ends 232b, 234b. The first manifold 232 defines two exhaust passages 232c1, 232c4, and the second manifold 234 also defines two exhaust passages 234c2, 234c3. The exhaust passages 232c1, 232c4 of the first manifold 232 communicate with exhaust ports 226 of the first and fourth cylinders C1, C4, respectively, at the upstream ends 232a. The exhaust passages 234c2, 234c3 of the second manifold 234 communicate with exhaust ports 226 of the second and third cylinders C2, C3, respectively, at the upstream ends 234a. The first and second manifolds 232, 234 bifurcates symmetrically. A distance between both of the upstream ends 232a of the first manifold 232 are longer than a distance between both of the upstream ends 234a of the second manifold 234, and both of the upstream ends 234a are interposed between the respective upstream ends 232a. Bolt holes 235 for coupling the respective upstream ends 232a, 234a with the cylinder head member 96 are illustrated in FIGS. 21 and 25.

The downstream ends 232b, 234b converge so that the downstream ends 232b, 234b are directed downwardly. The downstream ends 232b of the second manifold 234 are positioned between the downstream ends 232b of the first manifold 232 and the engine body 108.

As noted above, the engine 32 includes an exhaust cooling system as well as an engine cooling system. The first and second manifolds 232, 234 also define water jackets 232d, 234d as part of the exhaust cooling system around the exhaust passages 232c1, 232c4, 234c2, 234c3. In the illustrated embodiment, the cooling water used for the exhaust cooling system is introduced into the system through water inlet ports 370 (FIG. 29) which is disposed at the lowermost portion of the first unitary conduit 236. External water conduits preferably couple the inlet ports 370 with the jet pump housing 78 downstream of the impeller so as to deliver water that is pressurized by the rotation of the impeller in the pump housing 78.

The first unitary conduit 236, described in more detail below, also defines a water jacket 236d therein. Due to a mechanism, which is also described in more detail below, the majority of the water that is introduced through the inlet port 370 flows through part of the water jacket 236d and then the water jackets 232d, 234d in a direction that is opposite to the direction in which the exhaust gases flow. The first and second manifolds 232, 234 have four water outlet ports 372. Two of them are positioned at the respective uppermost portions of the first manifold 232, while the other two are positioned at the respective uppermost portions of the second manifold 232. The outlet ports 372 are coupled with another water inlet port 374 (FIGS. 32, 35 and 36) of a tubular rubber member 390, which is described in more detail below, through another external water conduit. This external water conduit has four inlet branch passages connected to the outlet ports 372 and a single outlet passage connected to the inlet port 374.

In the illustrated embodiment, as illustrated in FIGS. 21 and 25, the water jackets 232d, 234d open at the upstream ends 232a, 234a of the first and second manifolds 232a, 234a when cast. Gaskets are affixed to these upstream ends 232a, 234a to close these ends 232a, 234a except for the exhaust passages 232c, 234c and bolt holes 235.

The secondary air supply device 252 is disposed adjacent to the manifolds 232, 234. Thus the water cools not only the manifolds 232, 234 but also the ambient air around the manifolds 232, 234. The secondary air supply device 252 thus can be positioned as closer to the manifolds 232, 234.

The first and second manifolds 232, 234 preferably are made of an aluminum based alloy and are produced by a casting method such as a shell mold casting. Any conventional casting method, however, can be applied.

As described above, in the illustrated embodiment, two exhaust manifolds 232, 234 are provided for four exhaust ports 226. This arrangement is advantageous because the combination of the manifolds 232, 234 occupies a smaller space than exhaust manifolds entirely separately formed for the respective ports and also because molding and casting are simpler and easier than an exhaust manifold entirely unitarily formed. In addition, by constructing the manifold 231 from two pieces, the design and manufacture of the cooling jackets in thermal communication therewith is made easier.

The two piece design of the manifold 231 allows greater flexibility in shaping the first and second manifolds 232, 234 to achieve a uniform length for each of the exhaust runners defined therein, while minimizing the overall dimensions of the manifold 231. For example, the distance Df (FIG. 23) of the downstream end 232b of the first manifold 232 and the distance Ds (FIG. 27) of the downstream end 234b of the second manifold 234 are shorter than those of manifolds which are unitarily formed.

Figure 23:
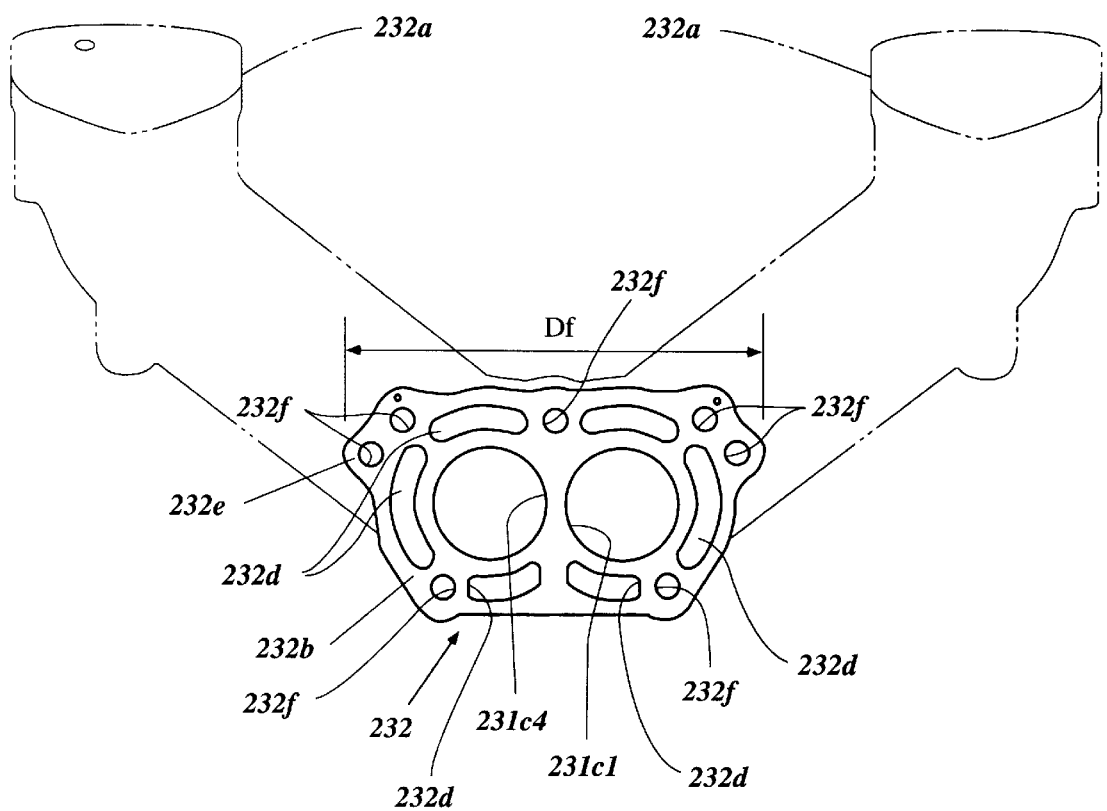
FIG. 23 is a downstream end view of the manifold. A pair of conduit portions thereof are shown in phantom.
Figure 27:
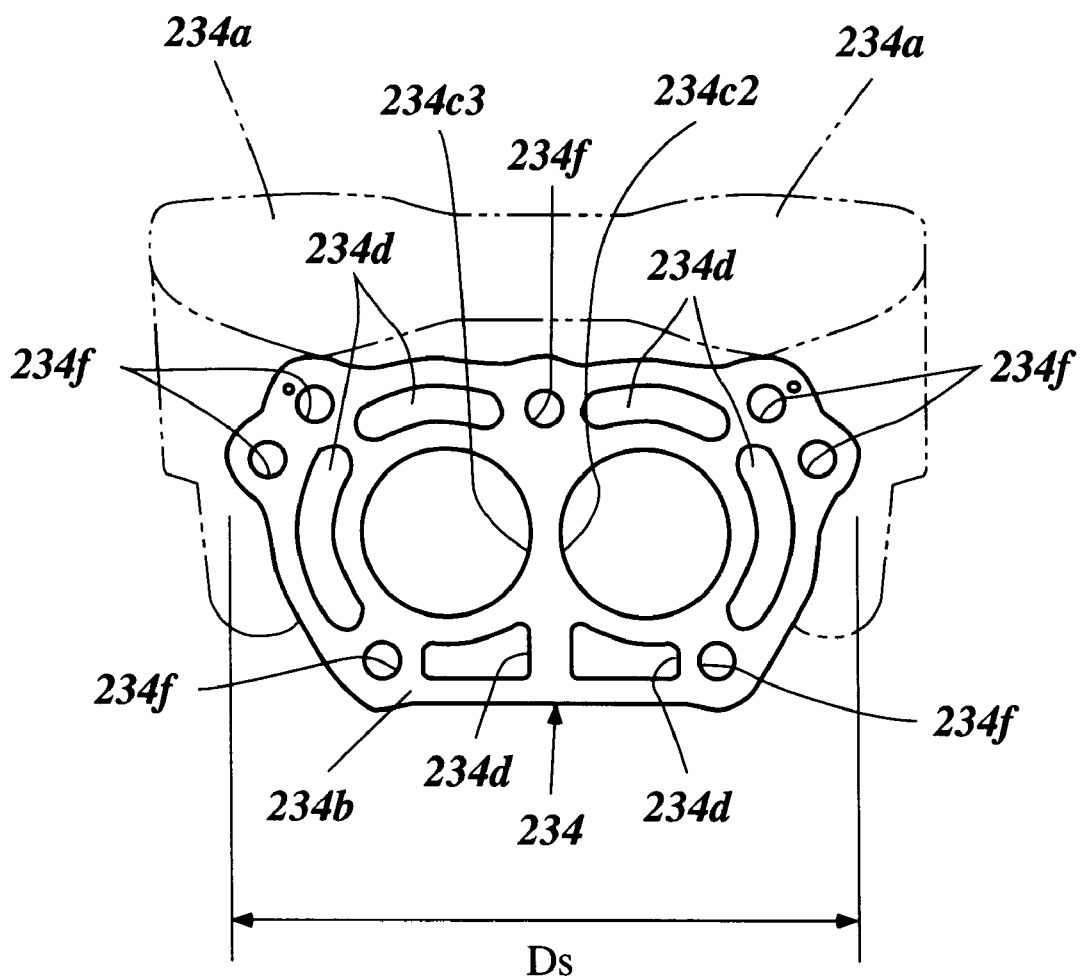
FIG. 27 is a downstream end view of the second manifold. A pair of conduit portions thereof are shown in phantom.

Further, the unitary arrangement allows numbers of water paths of the jacket to be decreased which contributes to making the manifolds 231 more compact. For example, as illustrated in FIG. 23, no water path is defined between the exhaust passages 232c1, 232c4.

Additionally, by configuring the first and second manifolds 232, 234 to nest with each other, the manifold 231 further provides a more compact arrangement which is more easily accommodated in the limited space available in the engine compartment of personal watercraft. Further, because of the symmetrical configurations, lengths of the respective exhaust passages 232c1, 232c4 are equal to each other, and lengths of the respective exhaust passages 234c2, 234c3 are also equal to each other. Flow states of exhaust gases thus can be generally equalized in every passage under each running condition of the engine.

Both the first and second exhaust manifolds 232, 234 are coupled with the first unitary exhaust conduit 236 at the respective downstream ends 232b, 234b. The respective downstream ends 232b, 234b define flange portions 232e, 234e and a plurality of bolt holes 232f, 234f are provided there for the coupling.

The first unitary conduit 236 has a curved configuration and is oriented such that one end, i.e., the upstream end 236a, is directed upwardly, and the other end, i.e., the downstream end 236b, is directed forwardly and upwardly. That is, a curved portion is placed at the lowermost position and the downstream end 236b is slanting. The first unitary conduit 236 extends generally along a side surface of the engine body 108.

Figure 28:
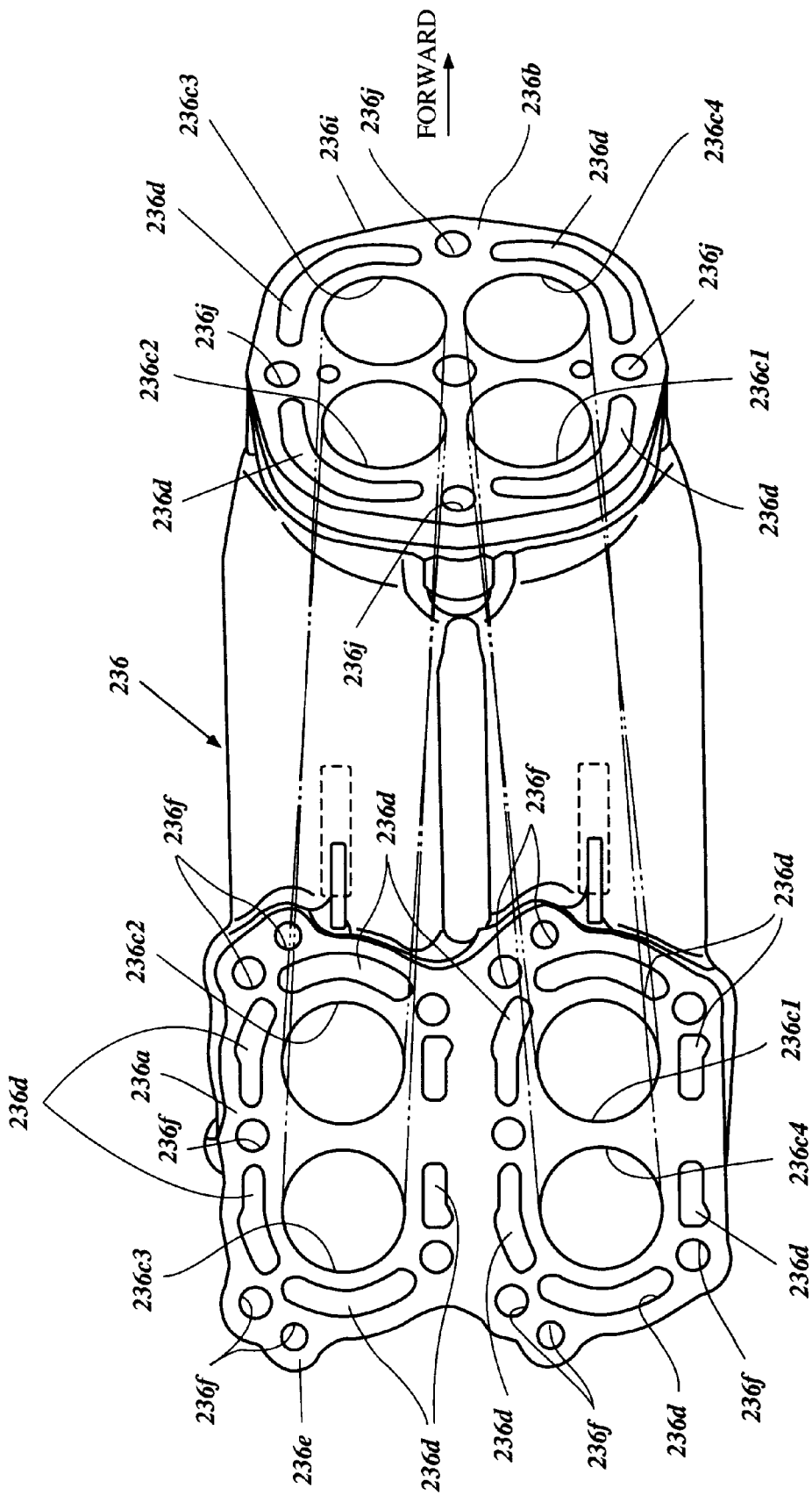
FIG. 28 is a bottom view of the first unitary exhaust conduit viewed from the first exhaust manifold. Inner exhaust passages are shown in phantom.
Figure 29:
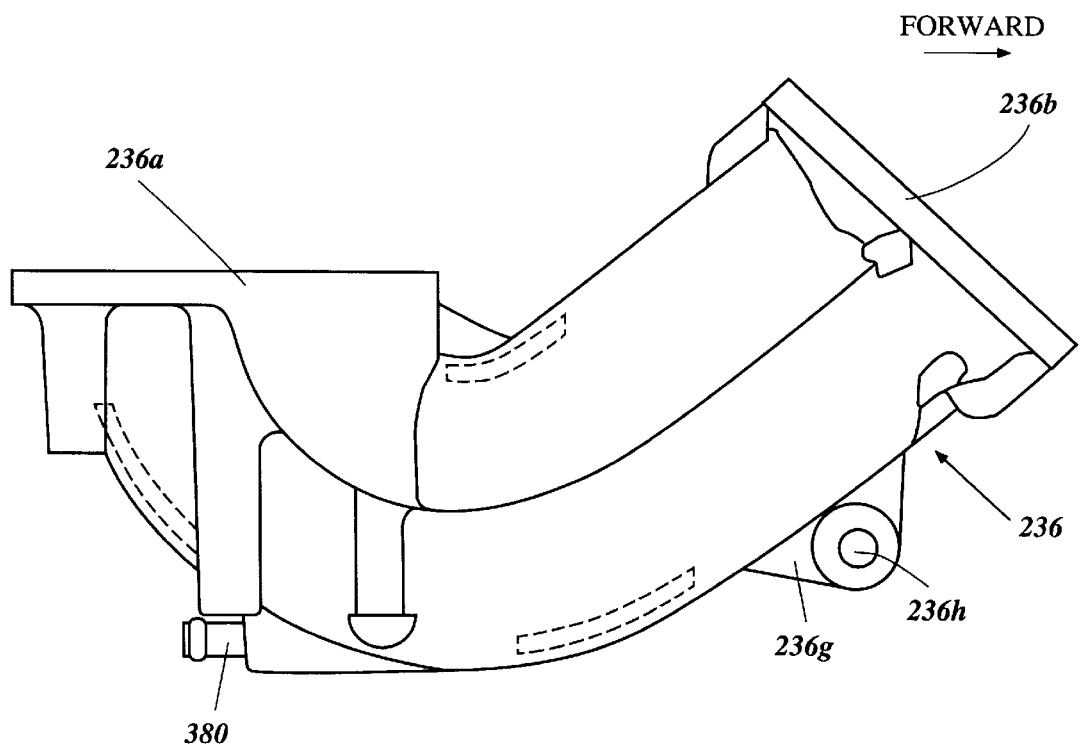
FIG. 29 is an outside appearance view of the conduit generally viewed from the starboard side.

With reference to FIG. 28, the first conduit 236 has four exhaust passages 236c1, 236c2, 236c3, 236c4. The exhaust passages 236c1, 236c4 are juxtaposed and communicate with the exhaust passages 232c1, 232c4 of the first manifold 232. The exhaust passages 236c2, 236c3 are, in turn, are juxtaposed and communicate with the exhaust passages 234c2, 234c3 of the second manifold 234. The set of the exhaust passages 236c1, 236c4 is positioned outside of the set of the exhaust passages 236c2, 236c3.

The upstream end 236a of the first unitary conduit 236 defines a flange portion 236e and a plurality of bolt holes 236f are provided there. The flange portion 236e abuts on the flange portions 232e, 234e of the first and second manifolds and affixed thereto by bolts. The first unitary conduit 236 has a bracket 236g (FIG. 29) at a lower portion thereof. A bolt hole 236h is also provided there and the bracket 236g is affixed to a side surface portion of the engine body 108.

The first unitary exhaust conduit 236 is also made of an aluminum based alloy and is produced by a casting method such as a shell mold casting, although any conventional cast method can be applied.

The first unitary exhaust conduit 236 is coupled with the second unitary exhaust conduit 238 at the downstream end 236b. The downstream end 236b defines a flange portion 236i and four bolts holes 236j are provided there for the coupling.

As noted above, the first unitary exhaust conduit 236 also defines the water jacket 236d coupled with the water jackets 232d, 234d of the first and second manifolds 232, 234. The water jacket 236d are disposed around the exhaust passages 236c1, 236c4, 236c2, 236c3. Because the water is introduced into the water jacket 236d through the water inlet port 370, the water is likely to move to the downstream end 237b and not likely to move to the upstream end 236a unless a mechanism that blocks this water flow is provided.

In the illustrated embodiment, a gasket is provided so as to define such a mechanism. The gasket has apertures that are smaller than openings of the water jackets 236d at the downstream end 236b so as to only allow a reduced water flow to a next water jacket, which is described in more detail below in connection with the second unitary conduit 238. Accordingly, the majority of the water moves to the upstream end 236a and further to the water jackets 232d, 234d of the first and second manifolds 232, 234.

As illustrated in FIG. 32, the second unitary conduit 238 also has a curved configuration. The second unitary conduit 238 is oriented such that one end, i.e., the upstream end 238a, is directed rearwardly and downwardly, then the other end, i.e., downstream end 238b, is directed laterally. That is, the upstream end 238a is slanting with an angle that is the same as the angle of the downstream end 236b of the first unitary conduit 236. The first unitary conduit 236 thus extends contiguously from the first unitary conduit 236 and generally upwardly and forwardly. With reference to FIG. 30, the downstream end 238b is positioned on the rear side of the engine body 108 and, as illustrated in FIG. 19, is placed at the uppermost position of the exhaust system 224.

With reference to FIGS. 19, 31 33 and 34, the second unitary conduit 238 has four exhaust passages 238c1, 238c2, 238c3, 238c4 which communicate with the exhaust passages 236c1, 236c2, 236c3, 236c4, respectively. Like the exhaust passages 236c1, 236c2, 236c3, 236c4 of the first unitary conduit 236, the exhaust passages 238c1, 238c2, 238c3, 238c4 are disposed radially.

Figure 36:
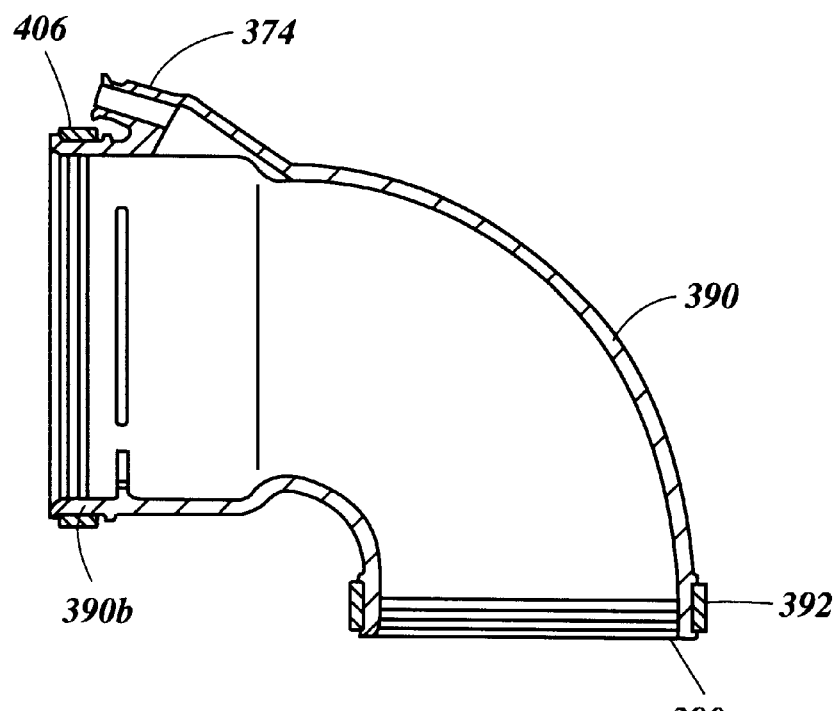
FIG. 36 is a cross-sectional view of the rubber member.

The second unitary conduit 238 has a water jacket 238d externally except for the upstream end 238a. The upstream end 238a defines a flange portion 238e. Four slits 238f pass through the flange portion 238e so as to form four water passages 238f that communicate with the water jacket 236d of the first unitary conduit 236 and the water jacket 238d. As described above, however, the gasket that has the smaller apertures is interposed between the downstream end 236b of the first unitary conduit 236 and the upstream end 238a of the second unitary conduit 238 and acts as a baffle. A relatively small water flow thus is allowed from the water jacket 236d of the first unitary conduit 236 to the water jacket 238d. A heat-resistant, tubular rubber member 390 is disposed over the second unitary conduit 238 to define the external water jacket 238d between an outer surface of the second conduit 238 and an inner surface of the tubular rubber member 390. The water inlet port 374 is provided at the tubular rubber member 390 so as to deliver the water that has come from the water jackets 232d, 234d of the first and second manifolds 232, 234 to the external water jacket 238d. This water substantially occupies the water jacket 238d. With reference to FIG. 36, an upstream end 390a of the tubular member 390 is sealingly affixed to the flange portion 238e by a band member 392. The downstream end 390b is not directly connected to the second unitary member 238.

The flange portion 238e also has four bolt holes 238g. The flange portion 238e abuts on the flange portion 236i of the first unitary conduit 236 which is affixed thereto by bolts 393. With reference to FIG. 5, a band member 394 holds the coupled portion of the first and second unitary conduits 236, 238. A stay extends from the engine body 108 to hang the band member 394 so that the middle portion of the exhaust system 224 is supported by the engine body 108.

The second unitary exhaust conduit 238 is also made of an aluminum based alloy and is produced by a casting method such as a shell mold casting, although any conventional casting method can be applied.

As described above, individual exhaust passages extend from the exhaust ports 226 through the first and second exhaust manifolds 232, 234, and the first and second unitary exhaust conduits 236, 238. For example, known exhaust manifolds are sized such that the included exhaust runners are sized so as to attenuate interference caused by exhaust pulses exiting adjacent exhaust runners. The total lengths Lt (FIG. 30) of the individual exhaust passages are long enough to accommodate preferred tuning of the exhaust system and thus improves performance of the engine 32.

The unitary arrangement of the first and second conduits 236, 238 is advantageous because a compact and simple nature is ensured. In other words, the first and second conduits 236, 238 can be placed in a relatively narrow space and can be produced easily. In addition, because the water jackets extend entirely and evenly through the first and second conduits 236, 238, every exhaust passage is cooled effectively and substantially equally.

The second unitary exhaust conduit 238 is coupled with the exhaust pipe 240 at the downstream end 238b. The downstream end 238b defines a coupling portion 238h and a coupling portion 238i. The coupling portion 238i has an outer diameter smaller than a diameter of the coupling portion 238i and extends outward from the coupling portion 238h.

The other end, i.e., downstream end 390b, of the tubular member 390 is coupled with the exhaust pipe 240 at another portion. The downstream end 390b extends beyond the coupling portion 238i further for defining a coupling portion thereof.

With reference to FIGS. 37–40, the exhaust pipe 240 is generally a tubular member having a single exhaust passage 240c which communicates with the exhaust passages 238c1, 238c2, 238c3, 238c4 of the second unitary conduit 238. The sectional area of the exhaust pipe 240 preferably is greater than the total sectional areas of the exhaust passages 238c1, 238c2, 238c3, 238c4. The exhaust pipe 240 extends from the second unitary conduit 238 to the water-lock 242 along a side the engine body 108 on the port side. In a side view, as illustrated in FIG. 5, the exhaust pipe 240 extends generally horizontally and then gradually downwardly to the forward portion of the water-lock 242 from the uppermost position where the second unitary conduit 238 is coupled. A downstream portion of the exhaust pipe 240 is coupled with the forward portion of the water-lock 242.

The exhaust pipe 240 also defines a water jacket 240d around the exhaust passage 240c so as to form a dual pipe structure. That is, the exhaust passage 240c is defined within an inner tube portion, while the water jacket 240d is defined between the inner tube portion and an outer tube portion.

Figure 37:
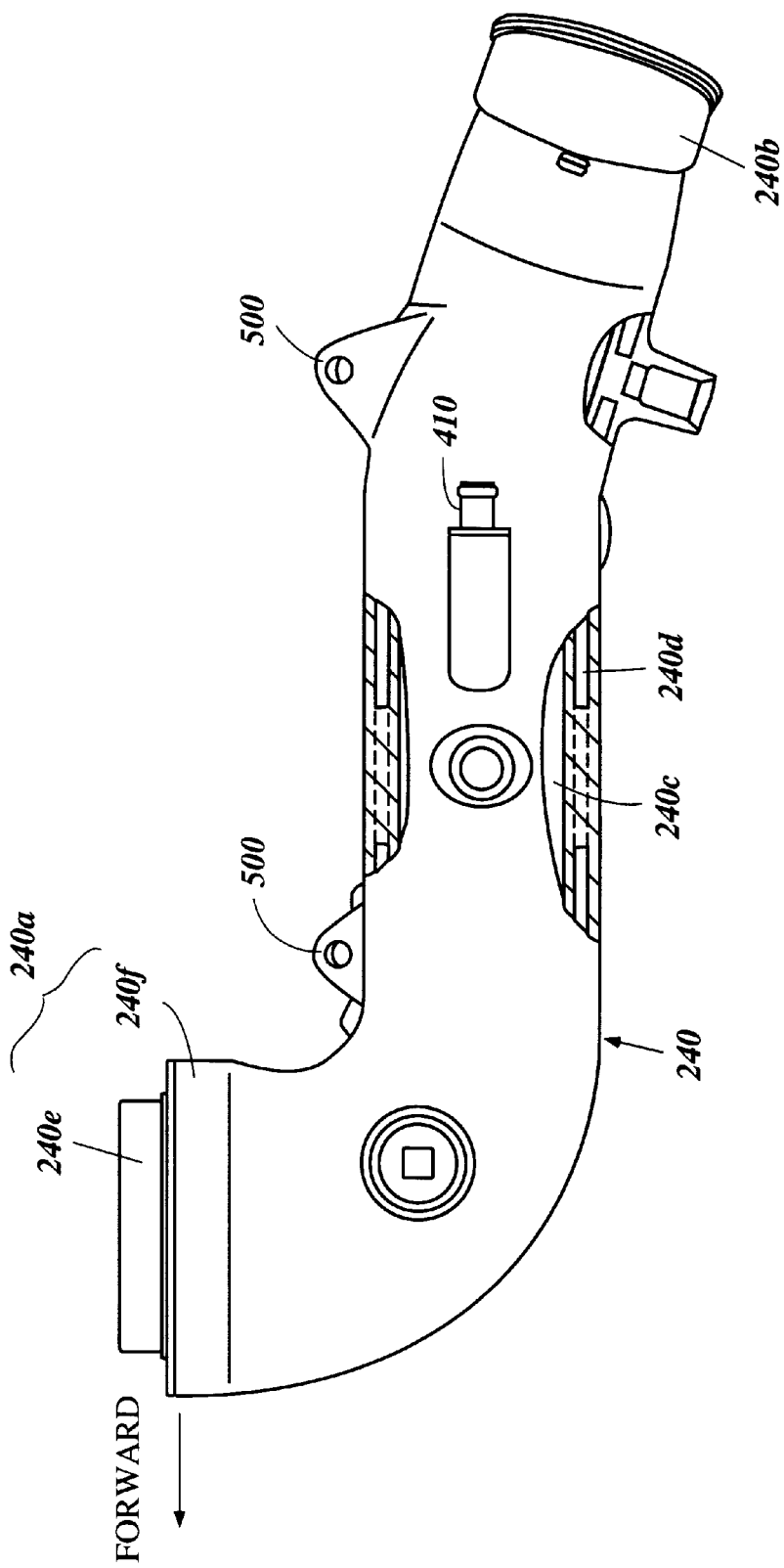
FIG. 37 is a partially sectioned bottom plan view of the exhaust pipe.

With reference to FIG. 37, at the upstream portion 240a, the inner tube portion extends beyond the outer tube portion to form a coupling portion 240e for the second unitary conduit 238. The outer tube portion, in turn, forms a coupling portion 240f for the tubular rubber member 390. Water inlets 240j are defined at the upstream end of the water jacket 240d.

Figure 41:
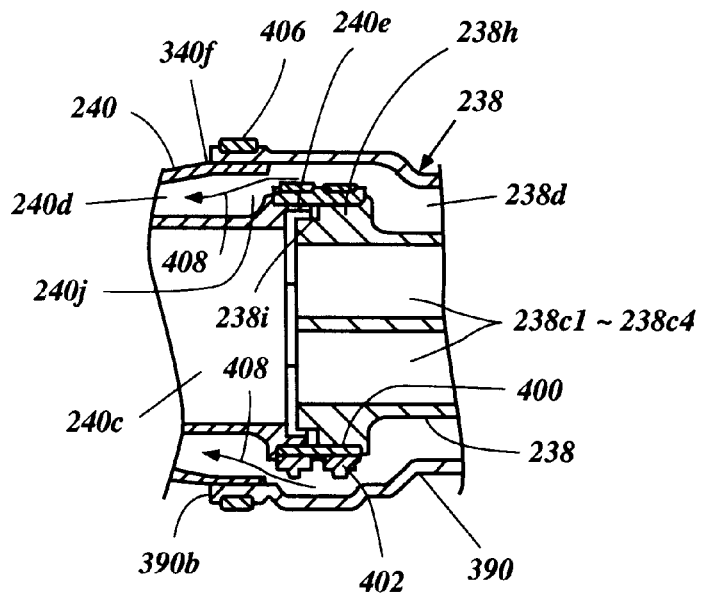
FIG. 41 is a partial cross-sectional view showing a coupling portion of the second unitary exhaust conduit with the exhaust pipe.

FIG. 41 illustrates a coupling arrangement of the exhaust pipe 240 with the second unitary conduit 238 and also with the tubular member 390.

The coupling portion 240e of the exhaust pipe 240 has an inner diameter larger than the outer diameter of the coupling portion 238i of the second unitary conduit 238. The coupling portion 238i is thus fitted into the coupling portion 240e and the coupling portion 238h is leveled off with the coupling portion 240e. A coupling member 400 is disposed around both the coupling portion 238h of the second unitary conduit 238 and the coupling portion 240e of the exhaust pipe 240 to sealingly connect them together. The coupling member 400 preferably is a rubber bellow so as to allow discrepancy due to tolerances or acceptable errors between the couplings 238h, 240e. A pair of band members 402 are further wound around the coupling member 400 for fastening them up tightly.

The coupling portion 240f of the exhaust pipe 240, in turn, has an outer diameter smaller than an outer diameter of the downstream end 390b of the tubular rubber member 390. The coupling portion 240f is thus fitted into the downstream end 390b. A band member 406 is disposed around the downstream end 390b so as to sealedly engage the downstream end 390b to the coupling portion 240f.

Accordingly, the exhaust passage 240c communicates with the exhaust passages 238c1, 238c2, 238c3, 238c4 and the water jackets 240d also communicate with the water jacket 238d. The cooling water thus flows continuously to the water jackets 240d from the water jacket 238d as indicated by the arrows 408 of FIG. 41.

Figure 38:
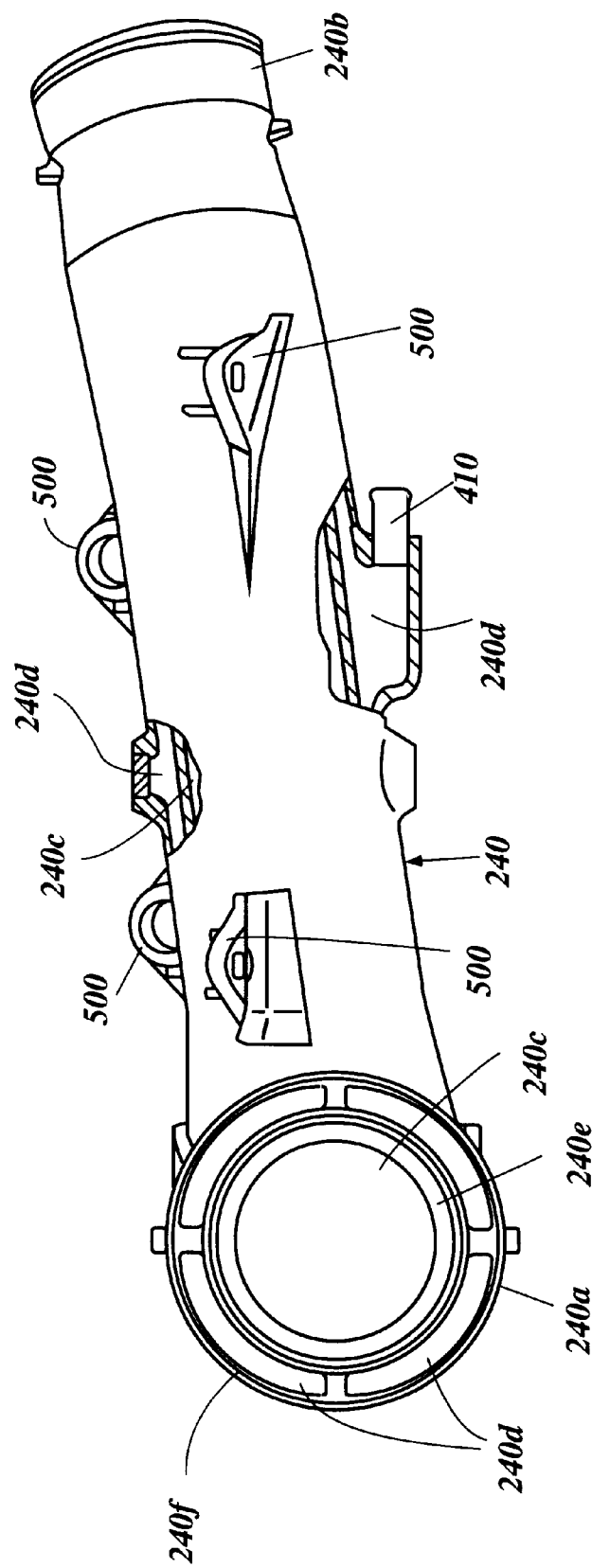
FIG. 38 is a side view of the exhaust pipe viewed form the port side.
Figure 39:
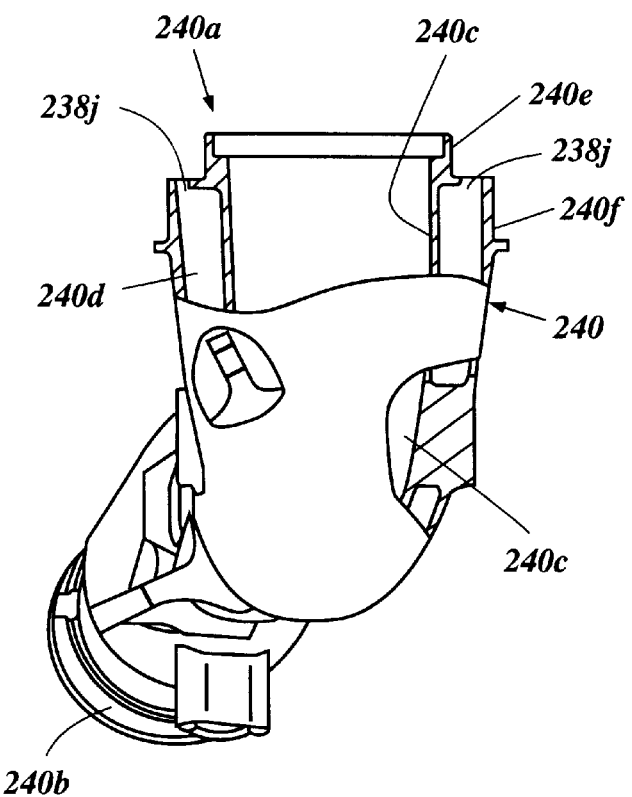
FIG. 39 is a partially sectioned front view of the exhaust pipe.
Figure 40:
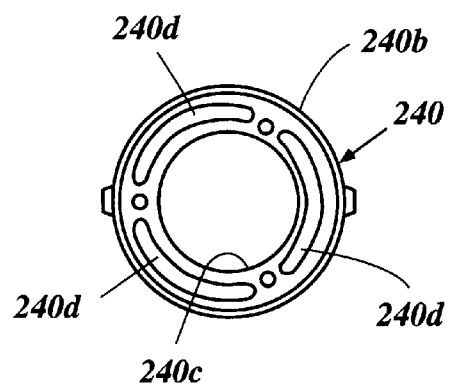
FIG. 40 is a downstream end view of the exhaust pipe.

With reference to FIGS. 37 and 38, the exhaust pipe 240 has a water outlet port 410 branched off and extending from a middle portion of the exhaust pipe 240. An external water conduit couples the outlet port 410 with a water discharge portion formed on the jet pump housing 72. Some of the water flowing through the exhaust jacket 240c moves to the water discharge portion through the external conduit from the outlet port 410, and the rest of the water further flows down to the downstream end 240b through the water jacket 240d.

Four brackets 500 extend toward the engine body 108 from the exhaust pipe 240. Two of the brackets 500 preferably are affixed to the cylinder head member 96 and the other two are affixed to the cylinder block 90 so that the exhaust pipe 240 is supported generally by the engine body 108.

The exhaust pipe 240 is preferably made of an aluminum based alloy and is produced by a casting method such as a shell mold casting, although any conventional casting method can be applied.

As described above, the tubular rubber member 390 forms the water jacket 238d of the second unitary conduit 238 and is coupled with the exhaust pipe 240 directly without being connected to any downstream portion of the second conduit 238. This is advantageous because the rubber member 390 can absorb discrepancy due to tolerances between the second unitary conduit 238 and the exhaust pipe 240.

Figure 42:
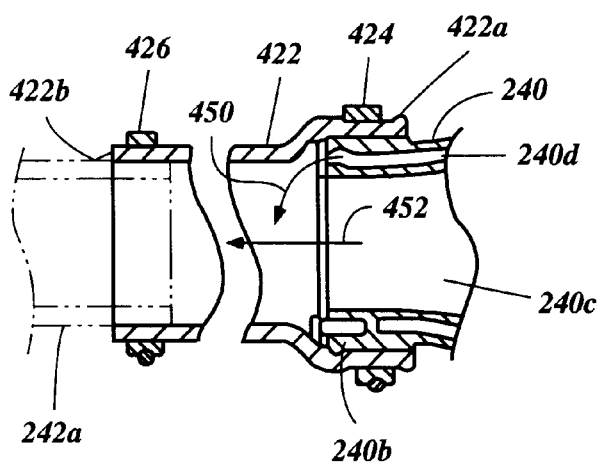
FIG. 42 is a partial cross-sectional view showing a coupling portion of the exhaust pipe and a water-lock. An inlet port of the water-lock is shown in phantom.

The exhaust pipe 240 is coupled with the water-lock 242 at the downstream end 240b. FIG. 42 illustrates a coupling arrangement of the exhaust pipe 240 with the water-lock 240b.

An inlet port 242a of the water-lock 242 is spaced apart from the downstream end 240b. A rubber hose 422 is fitted onto either outer surface of the downstream end 240b and the inlet port 242a. A band 424 is disposed around an upstream portion 422a of the rubber hose 422 to fasten the portion 422a to the downstream end 240b of the exhaust pipe 240. Another band 426 is disposed around a downstream portion 422b of the rubber hose 422 to fasten the portion 422a to the inlet port 242a of the exhaust pipe 240.

Because no specific water jacket is defined in both the rubber hose 422 and the inlet port 242a, the water coming from the water jacket 240d of the exhaust pipe 240 merges with exhaust gases discharged from the exhaust passage 240c within the rubber hose 422 as indicated by arrows 450, 452. The water then moves downstream and enters the water-lock 242 together with the exhaust gases.

In summary, the exhaust gases of the respective combustion chambers 98 move to the associated exhaust ports 226 and then go to the first or second exhaust manifolds 232, 234 which are associated with the respective exhaust ports 226. The exhaust gases then pass through the associated exhaust passages of the first and second unitary exhaust conduits 236, 238. The exhaust gases coming from the respective cylinders C1, C2, C3, C4 are separated from each other until they reach the downstream end 238b of the second unitary conduit 238. The exhaust gases merge together when moving into the exhaust pipe 240 from the second unitary conduit 238. The exhaust gases flow through the exhaust pipe 240 and then enter the water-lock 242. The exhaust gases move to the discharge pipe 244 from the water-lock 242 and are finally discharged to the body of water at the stern of the lower hull section 36 in a submerged position. The water-lock 242 primarily inhibits the water in the discharge pipe 244 from entering the exhaust pipe 240. Because the water-lock 242 has a relatively large volume, it may function as an expansion chamber also.

One aspect of the cooling system, discussed in more detail below, the exhaust system comprises at least one exhaust conduit extending from the exhaust port to an exhaust gas discharge configured to discharge exhaust gases in a downstream direction from the exhaust port to the atmosphere. The cooling system includes at least one cooling jacket disposed in thermal communication with the at least one exhaust conduit. The cooling jacket includes a coolant inlet disposed adjacent to a first portion of the exhaust conduit which is downstream from the exhaust port and a first coolant outlet disposed at a position generally between the coolant inlet and the exhaust port.

For example, cooling water is drawn into the water inlet ports 370 positioned at the lowermost portion of the first unitary conduit 236. The majority of the water moves toward the water jackets 232d, 234d of the first and second exhaust manifolds 232, 234 through part of the water jacket 236d of the first unitary exhaust conduit 236. After flowing through the water jackets 232d, 234d, the water is discharged from the outlet ports 372 provided at the upstream ends 232a, 234a of the first and second manifolds 232, 234 and moves to the inlet port 374 of the tubular rubber member 390. The water then enters the water jacket 238d defined between the outer surface of the second unitary conduit 238 and the inner surface of the tubular rubber member 390 and fills the water jackets 238d.

A relatively smaller amount of water is allowed to move into the water jacket 238d from the water jacket 236d of the first unitary conduit 236 through the gasket. Then, the water in the water jacket 238d moves into and flows through the water jacket 240d of the exhaust pipe 240. Some of the water is discharged out from the outlet port 410 through the external water conduit toward the discharge portion of the jet pump housing 78. The rest of the water flows to the downstream end 240b of the exhaust pipe 240 and merges with the exhaust gases in the rubber hose 422. The water then moves to the water-lock 242 and further to the discharge pipe 244 together with the exhaust gases and is finally discharged to the body of water. As such, the water removes heat from the exhaust system 224 efficiently.

In the illustrated exhaust system 224, the middle portion of the first unitary exhaust conduit 236 is placed at a lowermost elevation in the portion of the exhaust system upstream from the waterlock 242. The coupling portion of the second unitary conduit 238 with the exhaust pipe 240 is placed at an uppermost elevation in the portion of the exhaust system upstream from the waterlock 242. Moreover, the exhaust pipe 240 is coupled to the forward portion of the water-lock 242, which is positioned lower than a top portion of the water-lock 242, and the discharge pipe 242 extends from the top portion of the water-lock 242. The water outside, if entering into the discharge pipe 242, will never enter the waterlock 242. Even if water flows upstream from the water-lock 242, such water would be inhibited from moving to the engine body 108 due to the elevation of the coupling portion of the second unitary conduit 238. If the watercraft 30 capsizes, the inlet port 242a of the water-lock 242 and the middle portion of the first unitary conduit 236 prevent backward flow of the water instead of the forgoing portions because those portions are positioned higher than the foregoing portions. In particular, the middle portion defines an uppermost elevation in the portion of the exhaust system upstream from the waterlock 242 when the watercraft 30 is capsized or inverted.

It is to be noted, however, that the water outlet ports 372 of the first and second exhaust manifolds 232, 234 can be inlet ports of the water cooling system. In this alternative, the gasket interposed between the first and second unitary exhaust conduits 236, 238, the inlet port 380 of the first unitary conduit 236 and the inlet port 374 of the tubular rubber member 390 is not necessary. Rather, in operation, cooling water from the jet pump enters the ports 372, and cools the exhaust system while flowing generally toward the downstream direction of the exhaust system.

As described above with the associated figures and again schematically shown in FIGS. 43 and 44, the respective exhaust passages corresponding to the respective cylinders C1–C4, which are now indicated with the reference numerals P1–P4 in FIGS. 43 and 44, are independent from one another in the first and second exhaust manifolds 232, 234 and in the first and second unitary exhaust conduits 236, 238. Also, the respective water jackets, which are now indicated by the reference mark W in FIG. 44, surround the exhaust passages P1–P4 all the way from the upstream ends 232a, 234a of the first and second manifolds 232, 234 to the downstream end 238b of the second unitary conduit 238.

Such relatively long exhaust passages P1–P4 can greatly improve the engine performance because exhaust pulsation can be effectively used to increase charging efficiency of the air that is drawn into the combustion chambers. In addition, the cooling performed by the water flowing through the water jackets W can contribute to the improvement of the engine performance. This is because frequency of the exhaust pulsation changes under influence of circumferential temperature as well as the temperature of the exhaust gases themselves and the cooling system can control the temperature to be held within a preset temperature.

Figure 45:
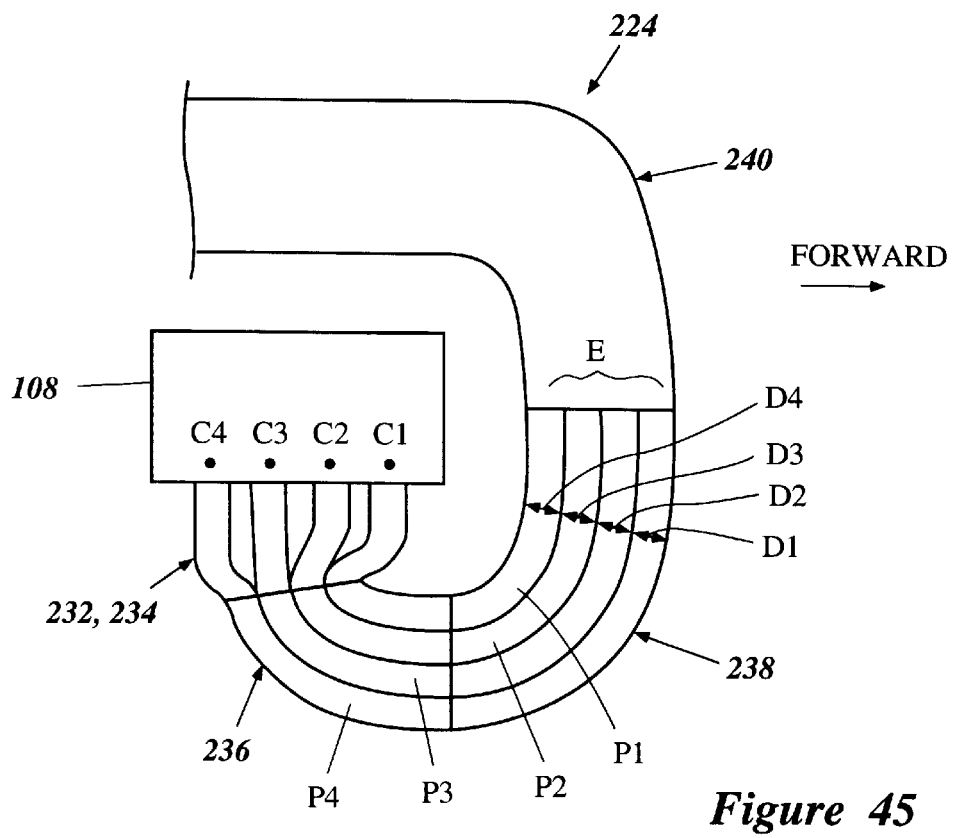
FIG. 45 is a schematic top plan view showing one preferred arrangement of the exhaust system.

However, as also schematically shown in FIG. 45, respective lengths of the exhaust passages P1–P4 are different from each other, although the length of the exhaust passage P1 is generally equal to the length of the exhaust passage P3. Provided that each length of the exhaust passages P1–P4 is L1–L4, respectively, the relationship of the respective lengths can be designated as follows:

$$L2<L1=L3<L4 \qquad (1)$$

Because of the differences in length, respective output of the cylinders C1–C4 is also different from each other. In order to compensate for the variations in length and equalize the magnitude and timing of exhaust pulses, one preferred arrangement, shown in FIG. 45, includes varying inner diameters D1–D4 corresponding to the exhaust passages P1–P4, respectively. That is, the longer the length, the larger the inner diameter. Under the condition given by the relationship in the formula (1), the relationship of the respective diameters can be designated as follows:

$$D2<D1=D3<D4 \qquad (2)$$

According to this arrangement, the larger the inner diameter, the faster the speed of the exhaust gas pulses. Thus, the exhaust pulsations in the respective exhaust passages P1–P4 reach the downstream end E of the multiple exhaust passages P1–P4 in substantially the same amount of time as one another. Thus, the exhaust passages P1–P4 perform as if they were the same length. The respective cylinders C1–C4 therefore can provide generally the same performance.

Figure 46:
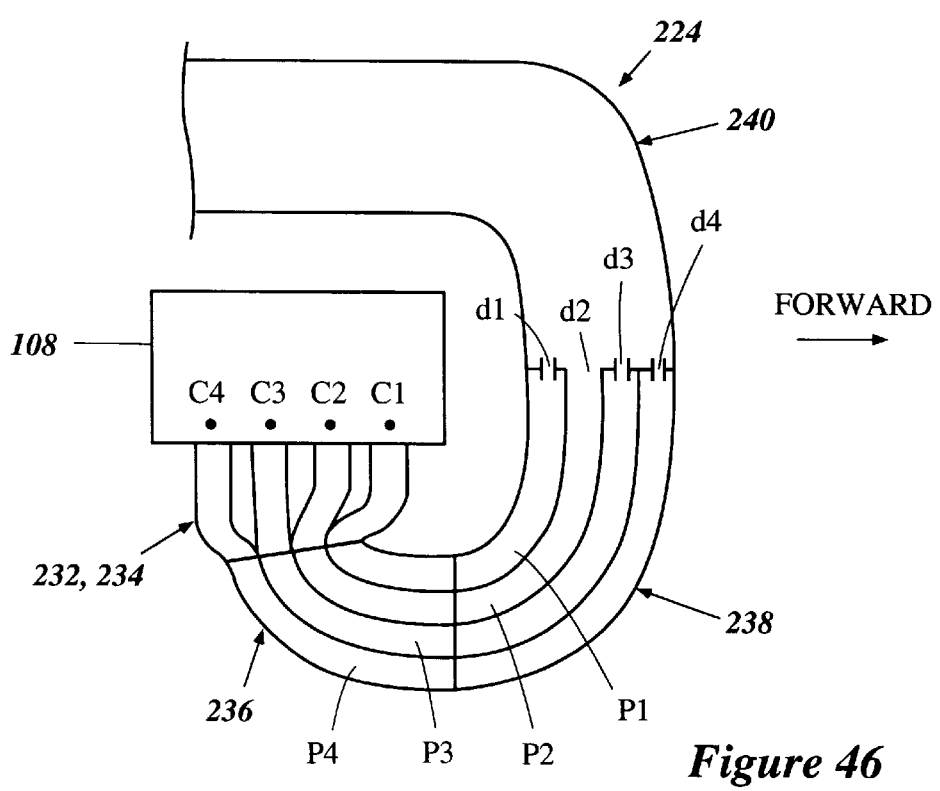
FIG. 46 is a schematic top plan view showing a modification of the arrangement of the exhaust system shown in FIG. 45.

FIG. 46 illustrates another arrangement for the same purpose.

In this arrangement, respective downstream orifices are made narrower than the exhaust passages P1–P4 except for the orifice of the exhaust passage P2 and each orifice has a different diameter d1–d4 from one another. That is, the longer the length, the smaller the diameter. Under the condition given by the relationship in the formula (1), the relationship of the respective diameters can be designated as follows:

$$d4<d1=d3<d2 \qquad (3)$$

According to this arrangement, the larger the diameter, the smaller the magnitude of reflected pulsation wave. In general a reflected pulsation wave, or "rarefation" developed in an exhaust passage, can draw or urge the discharge of the exhaust gases from the combustion chamber during the next stroke. All the exhaust passages P1–P4 thus can perform as if they were the same length and the respective cylinders C1–C4 can provide substantially the same performance. The respective inner diameters of the exhaust passages C1–C4 can be either equal or different with one another.

Figure 47:
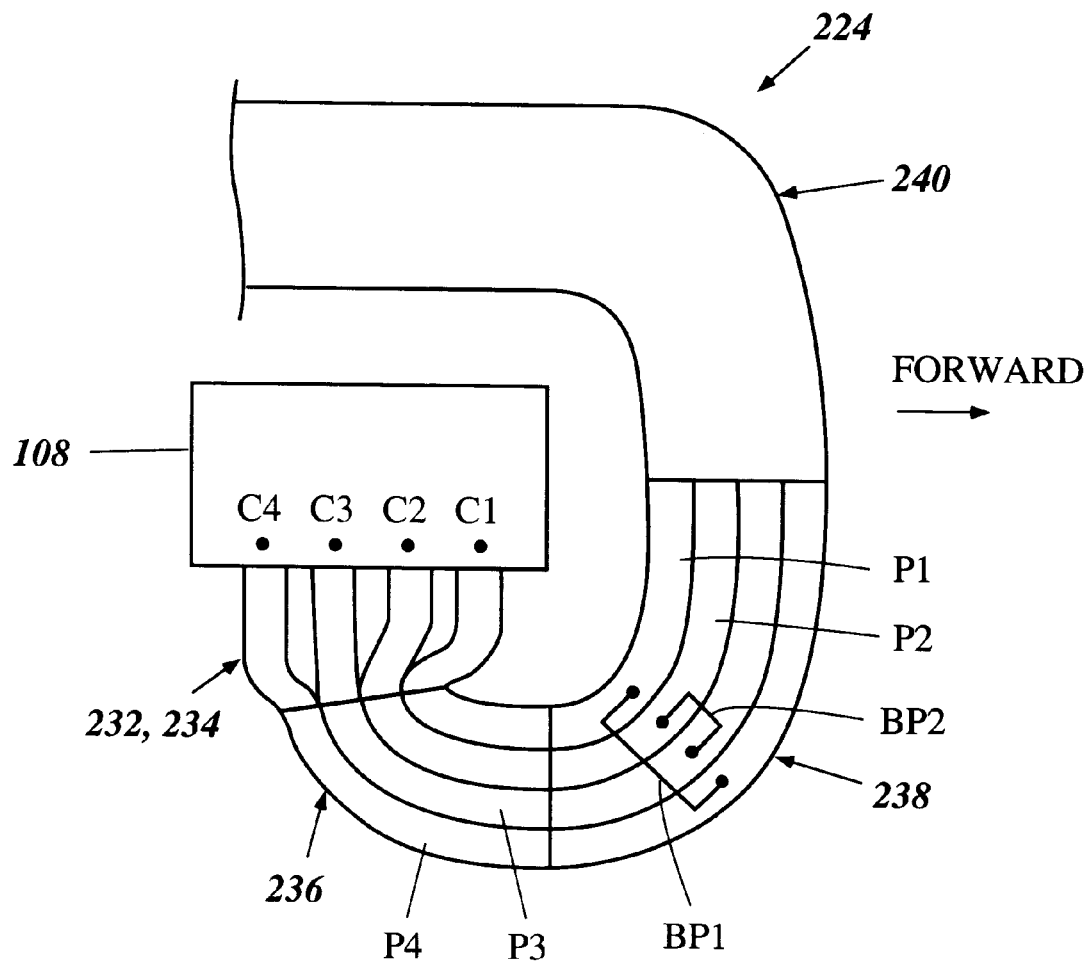
FIG. 47 is a schematic top plan view showing a further modification of the arrangement of the exhaust system shown in FIG. 45.

FIG. 47 illustrates a further arrangement for the same purpose.

In this arrangement, the exhaust passage P1 communicates with the exhaust passage P4 through a first bypass passage BP1, while the exhaust passage P2 communicates with the exhaust passage P3 through a second bypass passage BP2. According to this arrangement, the exhaust pressure in each of the exhaust passages P1, P4 is exposed to the other and the exhaust pressure in each of the exhaust passages P2, P3 is exposed to the other. Because of the mutual actions, all the exhaust passages P1–P4 can perform as if they were the same length and the respective cylinders C1–C4 can provide substantially the same performance also.

Preferred positions of the bypass passages BP1, BP2 and combinations of the exhaust passages P1, P4 are selected to meet various purposes, firing orders of the ignition system and relationships of respective passage lengths. The illustrated arrangement is aimed to obtain high torque at a relatively high engine speed. The spark plug of the cylinder C1 is fired first and then the spark plugs of the cylinders C2, C4 and C3 are fired in this order. The respective inner diameters of the exhaust passages C1–C4 can be either equal or different with one another.

The foregoing three arrangements can be applied either separately or in combination with any other arrangements.

Although the exhaust passages P1–P4 extend forwardly to be coupled with the single exhaust passage in the exhaust pipe, they can of course extend rearwardly without surrounding the engine body.

Of course, the foregoing description is that of preferred embodiments of the present invention, and various changes and modifications may be made without departing from the spirit and scope of the invention, as defined by the appended claims.

What is claimed is:

1. A water vehicle comprising a hull defining an engine compartment, an internal combustion engine disposed within the engine compartment, a propulsion device driven by the engine, the engine including a plurality of exhaust ports, an exhaust system configured to guide exhaust from the exhaust ports to the atmosphere, the exhaust system comprising an exhaust conduit extending from the exhaust ports to an exhaust discharge, the exhaust conduit comprising an exhaust manifold communicating with the exhaust ports, and a first exhaust passage assembly connecting the exhaust manifold with the discharge, the exhaust manifold comprising a first exhaust runner assembly including a plurality of individual exhaust runners, each exhaust runner communicating with a respective exhaust port, and a second exhaust runner assembly formed separately from the first exhaust runner assembly, and the first and second exhaust runner assemblies configured to nest with each other.

2. The water vehicle according to claim 1, wherein the second exhaust runner assembly comprises a plurality of individual exhaust runners.

3. The water vehicle according to claim 1, wherein the exhaust ports are arranged in a substantially linear arrangement, the second exhaust runner assembly communicating with at least one exhaust port disposed between at least two of the exhaust ports.

4. The water vehicle according to claim 3, wherein the first exhaust runner assembly communicates with the at least two exhaust ports.

5. The water vehicle according to claim 1, wherein the first exhaust passage assembly comprises a plurality of individual exhaust passages connected to the individual exhaust runners, respectively.

6. The water vehicle according to claim 5, wherein the engine includes an engine body having longitudinal ends and a crankshaft journaled for rotation about a crankshaft axis, the crankshaft extending between the longitudinal ends of the engine body, the exhaust ports being arranged substantially parallel to the crankshaft axis along a first side of the engine body defined on a first side of a vertical plane containing the crankshaft axis, the individual exhaust passages extending along the first side of the engine body and terminating in a vicinity of one of the longitudinal ends of the engine body.

7. A water vehicle comprising a hull defining an engine compartment, an internal combustion engine disposed within the engine compartment, a propulsion device driven by the engine, the engine including a plurality of exhaust ports, and engine body having longitudinal ends and a crankshaft journaled for rotation about a crankshaft axis, the crankshaft extending between the longitudinal ends of the engine body, the exhaust ports being arranged substantially parallel to the crankshaft axis along a first side of the engine body defined on a first side of a vertical plane containing the crankshaft axis, an exhaust system configured to guide exhaust from the exhaust ports to the atmosphere, the exhaust system comprising an exhaust conduit extending from the exhaust ports to an exhaust discharge, the exhaust conduit comprising an exhaust manifold communicating with the exhaust ports, and a first exhaust passage assembly connecting the exhaust manifold with the discharge, the exhaust manifold comprising a first exhaust runner assembly including a plurality of exhaust runners, each exhaust runner communicating with a respective exhaust port, and a second exhaust runner assembly, the first and second exhaust runner assemblies configured to nest with each other, the first exhaust passage assembly comprising a plurality of individual exhaust passages connected to the exhaust runners, respectively, the individual exhaust passages extending along the first side of the engine body and terminating in a vicinity of one of the longitudinal ends of the engine body, and the individual exhaust passages extending transverse to the vertical plane and terminating on a second side of the vertical plane, opposite the first side of the vertical plane.

8. The water vehicle according to claim 1, wherein the first and second exhaust runner assemblies are V-shaped.

9. The water vehicle according to claim 1 additionally comprising first and second coolant jackets disposed in thermal communication with the first and second exhaust runner assemblies, respectively.

10. The water vehicle according to claim 9 additionally comprising a third coolant jacket disposed in thermal communication with the first exhaust passage, the first and second coolant jackets being configured to discharge coolant therefrom into the third coolant jacket.

11. The water vehicle according to claim 1, wherein the plurality of exhaust runners included in the first exhaust runner assembly are shaped symmetrically.

12. A water vehicle comprising a hull defining an engine compartment, an internal combustion engine disposed within the engine compartment, a propulsion device driven by the engine, the engine including a plurality of exhaust ports, an exhaust system configured to guide exhaust from the exhaust ports to the atmosphere, the exhaust system comprising an exhaust conduit extending from the exhaust ports to an exhaust discharge, the exhaust conduit comprising an exhaust manifold communicating with the exhaust ports, and a first exhaust passage assembly connecting the exhaust manifold with the discharge, the exhaust manifold comprising a first exhaust runner assembly including a plurality of exhaust runners, each exhaust runner communicating with a respective exhaust port, and a second exhaust runner assembly, the first and second exhaust runner assemblies configured to nest with each other, the first exhaust passage extending from a discharge of the exhaust manifold to a first elevation and from the first elevation to a second elevation, the first elevation being a high point in the first passage when the watercraft is inverted, and the second elevation being the high point in the first passage when the watercraft is upright.

13. The water vehicle according to claim 12, wherein the exhaust conduit further comprises a watertrap device, the first passage connecting the manifold with the watertrap device.

14. The water vehicle according to claim 13 additionally comprising a second exhaust passage connecting the watertrap device with the discharge.

15. A water vehicle comprising a hull defining an engine compartment, an internal combustion engine having an engine body and disposed within the engine compartment, the engine body defining a longitudinal axis, a propulsion device driven by the engine, the engine including a plurality of exhaust ports arranged along a first side of the engine body, an exhaust system configured to guide exhaust from the exhaust ports to the atmosphere, the exhaust system comprising an exhaust conduit extending from the exhaust ports to an exhaust discharge, the exhaust conduit comprising a plurality of individual exhaust passages communicating with the plurality of exhaust ports, respectively, the individual exhaust passages extending outwardly from the exhaust ports and extending along the first side of the engine body and terminating in the vicinity of a longitudinal end of the engine body, the individual exhaust passages extending away from a first side of a vertical plane passing through the engine body and generally parallel to the longitudinal axis, and the individual exhaust passages terminating on a second side of the vertical plane, opposite the first side of the vertical plane.

16. A water vehicle comprising a hull defining an engine compartment, an internal combustion engine having an engine body and disposed within the engine compartment, a propulsion device driven by the engine, the engine including a plurality of exhaust ports arranged along a first side of the engine body, an exhaust system configured to guide exhaust from the exhaust ports to the atmosphere, the exhaust system comprising an exhaust conduit extending from the exhaust ports to an exhaust discharge, the exhaust conduit comprising a plurality of individual exhaust passages communicating with the plurality of exhaust ports, respectively, the individual exhaust passages extending along the first side of the engine body and terminating in the vicinity of a longitudinal end of the engine body, the longitudinal end being a forward end of the engine body, and the individual exhaust passages extending from the side of the engine body towards the forward end and terminating forwardly of the forward end.

17. The water vehicle according to claim 15 additionally comprising a crankshaft journaled for rotation at least partially within the engine body about a crankshaft axis, the vertical plane containing the crankshaft axis.

18. The water vehicle according to claim 15, wherein the individual exhaust passages terminate at outlets, the outlets being connected to a second exhaust passage defining a common exhaust gas passage.

19. A water vehicle comprising a hull defining an engine compartment, an internal combustion engine having an engine body and disposed within the engine compartment, a propulsion device driven by the engine, the engine including a plurality of exhaust ports arranged along a first side of the engine body, an exhaust system configured to guide exhaust from the exhaust ports to the atmosphere, the exhaust system comprising an exhaust conduit extending from the exhaust ports to an exhaust discharge, the exhaust conduit comprising a plurality of individual exhaust passages communicating with the plurality of exhaust ports, respectively, the individual exhaust passages extending along the first side of the engine body and terminating at outlets in the vicinity of a longitudinal end of the engine body, the outlets being connected to a second exhaust passage defining a common exhaust gas passage, the common exhaust gas passage including an end distal from the outlets of the individual exhaust gas passages and a coolant injection port configured to inject coolant into the common exhaust gas passage.

20. The water vehicle according to claim 19 additionally comprising a coolant jacket defined around the common exhaust gas passage, the coolant injection port configured to inject the coolant from the coolant jacket into the common exhaust gas passage.

21. A water vehicle comprising a hull defining an engine compartment, an internal combustion engine disposed in the engine compartment, the engine having an engine body defining a plurality of exhaust ports arranged on a first side of the engine body, an exhaust system comprising an exhaust conduit extending from the exhaust ports to an exhaust discharge for discharging exhaust gases to the atmosphere, the exhaust conduit comprising an exhaust manifold connected to the exhaust ports, and a first exhaust passage extending from the exhaust manifold through a high point defining a highest elevation in the first exhaust passage, the first exhaust passage comprising a plurality of individual exhaust passages extending from the exhaust ports, respectively, the individual exhaust passages extending to the high point.

22. The water vehicle according to claim 21, wherein the first exhaust passage extends through a low point defining a highest elevation in the exhaust system when the watercraft is inverted.

23. The water vehicle according to claim 22, wherein the low point is upstream of the high point.

24. The water vehicle according to claim 21, wherein all of the individual exhaust passages terminate substantially in a plane.

25. The water vehicle according to claim 21, wherein the exhaust conduit comprises an exhaust manifold formed of at least two separate pieces.

26. The water vehicle according to claim 25, wherein the two separate pieces nest with each other.

27. The water vehicle according to claim 21 additionally comprising a watertrap device connected to the first passage, and a second exhaust passage connecting the watertrap device with the discharge.

28. The water vehicle according to claim 27, wherein the second passage is configured to extend upwardly over a hull tunnel of a jet propelled watercraft.

29. A water vehicle comprising a hull defining an engine compartment, an internal combustion engine disposed in the engine compartment, the engine having an engine body defining a plurality of exhaust ports arranged on a first side of the engine body, an exhaust system comprising an exhaust conduit extending from the exhaust ports to an exhaust discharge for discharging exhaust gases to the atmosphere, the exhaust conduit comprising an exhaust manifold connected to the exhaust ports, the exhaust manifold comprising a plurality of individual exhaust runners communicating with the exhaust ports, respectively, the individual exhaust passages terminating downstream from a point where the first exhaust passage extends through the second elevation, and a watertrap device connected to a downstream end of the first exhaust passage, the first elevation being lower than the exhaust ports, the second elevation being at least as high as the exhaust ports.

30. The water vehicle according to claim 29, wherein the first elevation defines a high point in the first exhaust passage when the water vehicle is inverted, the second elevation defining a high point in the first exhaust passage when the water vehicle is upright.

31. A water vehicle comprising a hull defining an engine compartment, an internal combustion engine disposed in the engine compartment, the engine having an engine body defining a plurality of exhaust ports, an exhaust system comprising an exhaust manifold including a plurality of exhaust runners connected to the exhaust ports respectively, a first exhaust conduit extending from the exhaust manifold, the first exhaust conduit comprising a plurality of individual exhaust passages connected to the exhaust runners, respectively, a watertrap device connected to the first exhaust conduit, a second exhaust conduit connecting the watertrap device with an exhaust gas discharge, the first exhaust conduit extending to a first elevation defining a high point in the first exhaust conduit when the watercraft is inverted, the first exhaust conduit extending to a second elevation defining a high point in the first exhaust conduit when the watercraft is upright, the first and second elevations in the first exhaust conduit being disposed upstream from the watertrap device.

32. The water vehicle according to claim 31, wherein the plurality of individual exhaust passages terminate downstream from the second elevation.

33. The water vehicle according to claim 31, wherein the exhaust conduit extends downwardly from the second elevation to the watertrap device.

34. The water vehicle according to claim 31, wherein the first and second elevations in the first exhaust conduit are disposed downstream from the exhaust manifold.

35. A water vehicle comprising a hull defining an engine compartment, an internal combustion engine disposed in the engine compartment and having an engine body defining a plurality of exhaust ports, an exhaust system comprising an exhaust manifold defining a plurality of exhaust runners communicating with the exhaust ports, respectively, a first cooling jacket member defining a cooling jacket around an exterior of the exhaust runners, a first exhaust conduit assembly having a plurality of individual exhaust gas conduits communicating with the plurality of exhaust runners, respectively, the individual exhaust gas conduits being connected to each other and having first and second ends, and a flexible cooling jacket member defining a cooling jacket around an exterior of the first exhaust conduit assembly, the flexible cooling jacket member having a first end attached to the first end of the first exhaust conduit assembly, the second end of the flexible cooling jacket member not directly attached to the second end of the first exhaust conduit assembly.

36. The water vehicle according to claim 35, wherein the first end of the first exhaust conduit assembly defines an inlet end thereof, the second end defining an outlet end thereof.

37. The water vehicle according to claim 35, wherein the cooling jacket member is constructed of a rubber material.

38. The water vehicle according to claim 37, wherein the first exhaust conduit assembly is constructed of a metal material.

39. The water vehicle according to claim 35 additionally comprising a coolant discharge disposed in the vicinity of the second end of the flexible cooling jacket member.

40. A water vehicle comprising a hull defining an engine compartment, an internal combustion engine disposed within the engine compartment and driving a propulsion device, the engine having an engine body defining at least first and second exhaust ports, an exhaust system comprising at least first and second exhaust passages having inlet ends communicating with the first and second exhaust ports, respectively, a downstream exhaust gas conduit having an inlet, the first and second exhaust passages having outlet ends connected to the inlet of the downstream exhaust gas conduit, the first and second exhaust passages having first and second lengths, respectively, the first and second exhaust passages having first and second diameters, respectively, the first length being greater than the second length, the first diameter being greater than the second diameter.

41. The water vehicle according to claim 40 additionally comprising third and fourth exhaust passages having third and fourth lengths, respectively, and third and fourth diameters, respectively, the third and fourth lengths being greater than the second length and less than the first length, the third and fourth diameters being greater than the second diameter and less than the first diameter.

42. The water vehicle according to claim 40, wherein the first and second lengths and the first and second diameters are configured such that exhaust gas pulses traverse the first and second exhaust passages in substantially the same amount of time.

43. The water vehicle according to claim 40 additionally comprising at least a first restriction disposed at the terminal end of the first exhaust gas passage.

44. The water vehicle according to claim 43, wherein the first restriction and the first length are configured such that an exhaust pulse reflected by the first restriction towards the first exhaust port reaches the first exhaust port with a magnitude that is substantially equal to a magnitude of an exhaust pulse reaching the second exhaust port, which has been reflected back into the second exhaust passage toward the second exhaust port.

45. The water vehicle according to claim 44 additionally comprising a second restriction disposed at the outlet end of the second exhaust passage.

46. A water vehicle comprising a hull defining an engine compartment, an internal combustion engine disposed within the engine compartment and driving a propulsion device, the engine having an engine body defining at least first and second exhaust ports, an exhaust system comprising at least first and second exhaust passages having inlet ends communicating with the first and second exhaust ports, respectively, a downstream exhaust gas conduit having an inlet end, the first and second passages having outlet ends connected to the inlet end of the downstream exhaust gas conduit and defining first and second lengths, and a first restriction disposed at the outlet end of the first exhaust passage, the first length being greater than the second length.

47. The water vehicle according to claim 46 additionally comprising third and fourth exhaust passages having third and fourth lengths, respectively, and third and fourth restrictions, respectively, the third and fourth lengths being greater than the second length and less than the first length, the third and fourth restrictions being larger than the first restriction.

48. The water vehicle according to claim 46, wherein the first and second lengths and the first restriction are configured such that an exhaust gas pulse reflected back to the first exhaust port through the first exhaust passage by the first restriction has substantially a same magnitude as an exhaust gas pulse reaching the second exhaust port which has been reflected back to the second exhaust port through the second exhaust passage.

49. The water vehicle according to claim 46 additionally comprising a second restriction disposed at the outlet end of the second exhaust gas passage, the second restriction being larger than the first restriction.

50. The water vehicle according to claim 46, wherein the first and second exhaust gas passages have first and second diameters, respectively, the first diameter being greater than the second diameter.

51. The water vehicle according to claim 46, wherein the second exhaust passage has no restriction at its outlet end.

52. A water vehicle comprising a hull defining an engine compartment, an internal combustion engine disposed within the engine compartment and driving a propulsion device, the engine having an engine body defining at least first and second exhaust ports, an exhaust system comprising at least first and second exhaust passages having inlet ends communicating with the first and second exhaust ports, respectively, a downstream exhaust gas conduit having an inlet, the first and second exhaust passages having outlet ends connected to the inlet of the downstream exhaust gas conduit, each of the first and second exhaust passages including a balance passage aperture defined between the inlet and outlet ends thereof, a cooling jacket in thermal communication with at least the first and second exhaust passages, and a balance passage connecting the balance passage apertures of the each of the first and second exhaust passages, at least a portion of the cooling jacket being upstream of the balance passage.

53. The water vehicle according to claim 52, wherein the first and second exhaust passages have at least one of different lengths, different diameters, and differently sized restrictions at their respective outlet ends.

54. The water vehicle according to claim 52 additionally comprising third and fourth exhaust passages each having inlet and outlet ends and a balance passage aperture defined between the inlet in outlet ends, the third and fourth exhaust passages having at least one of different lengths, different diameters, and differently sized restrictions at their respective outlet ends, and a second balance passage connecting the balance passage apertures defined on the third and fourth exhaust passages.

55. The water vehicle according to claim 54, wherein the second and third exhaust passages have at least one of a same length, a same diameter, and a same sized restriction at their respective ends.

* * * * *